US005550994A

United States Patent [19]
Tashiro et al.

[11] Patent Number: 5,550,994
[45] Date of Patent: Aug. 27, 1996

[54] CONDITION DECISION CIRCUIT FOR A MICROCOMPUTER

[75] Inventors: Tetsu Tashiro; Yoshiki Cho, both of Itami, Japan

[73] Assignee: Mitsubishi Denki Kabushiki Kaisha, Tokyo, Japan

[21] Appl. No.: 247,836

[22] Filed: May 23, 1994

[30] Foreign Application Priority Data

Jun. 14, 1993 [JP] Japan .................................. 5-142028
Jan. 31, 1994 [JP] Japan .................................. 6-009123

[51] Int. Cl.⁶ .................................................. G06F 9/40
[52] U.S. Cl. .................. 395/375; 364/947.4; 364/938.1; 364/261.4; 364/259.7
[58] Field of Search .................. 395/375, 775, 395/800

[56] References Cited

U.S. PATENT DOCUMENTS 5,287,467  2/1994  Blaner et al. .................. 395/375
5,418,917  5/1995  Hiraoka .......................... 395/375

OTHER PUBLICATIONS

"Computer Architecture, Design and Performance", Wilkinson, Barry, Prentice Hall, 1991, pp. 3–10 and 148–160.

Primary Examiner—David Y. Eng
Attorney, Agent, or Firm—Lowe, Price, LeBlanc & Becker

[57] ABSTRACT

A high-speed microcomputer having a condition decision circuit in which a signal output indicating whether or not a branch condition is satisfied is always active by taking out only a necessary bit by a mask register value after comparing a register value and a compare register value for every bit.

5 Claims, 73 Drawing Sheets

FIG. 2

| INSTRUCTION NUMBER | CLOCK NUMBER | | | | | | | | |
|---|---|---|---|---|---|---|---|---|---|
| | 1 | 2 | 3 | 4 | 5 | 6 | 7 | 8 | 9 |
| i | IF | ID | EX | MEM | WB | | | | |
| i+1 | | IF | ID | EX | MEM | WB | | | |
| i+2 | | | IF | ID | EX | MEM | WB | | |
| i+3 | | | | IF | ID | EX | MEM | WB | |
| i+4 | | | | | IF | ID | EX | MEM | WB |

IF : INSTRUCTION FETCH
ID : INSTRUCTION DECODING
     AND REG. FETCH
EX : INSTRUCTION EXECUTION AND
     EFFECTIVE ADD. CALCULATION
MEM : MEMORY ACCESS
WB : WRITE BACK

FIG. 14

| MNEMONIC | FUNCTION | OP.CODE (MSB) | (LSB) |
|---|---|---|---|
| BRK | jump to break vector | 0001 1100 | 0000 0010 |
| RTB | return from break | 0001 1100 | 0000 0110 |
| INT | interrupt | 0001 1100 | 00ss s010 |
| RES | reset | 0001 1100 | 0011 1110 |
| TES | test reset | 0001 1100 | 0011 1010 |

*sss0 SPECIFIES REGISTER WHICH STORES INTERRUPT VECTOR

FIG. 15A

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| set | SET reg, data | W | 1 | 0 | dest reg | | | | | immediate data | | | | | | | |
| | SET reg, data | B | 1 | 0 | dest reg | | | | | immediate data | | | | | | | |
| | SET reg, data | Temp | 1 | 0 | dest reg | | | | | immediate data | | | | | | | |
| | STW reg, data | with temp H | 1 | 1 | 1 | dest reg | | | | immediate data | | | | | | | |
| | future expandability | | | | | | | | | | | | | | | | | |
| bit set | SEB bit, reg | | 1 | 0 | 0 | dest reg | | | | 1 bit | | | | 1 | 1 | 1 | 0 |
| | CLB bit, reg | | 1 | 1 | 0 | dest reg | | | | 1 bit | | | | 0 | 0 | 1 | 0 |
| | future expandability | | | | | | | | | | | | | | | | | |
| test | STM reg, date | set mask & test reg | 0 | 1 | 0 | selected reg | | | | immediate data | | | | | | | |
| | BMS bit, reg | bit set mask & test"1"re | 1 | 1 | 1 | selected reg | | | | 1 bit | | | | 1 | 1 | 1 | 0 |
| | BMC bit, reg | bit set mask & test"0"re | 1 | 1 | 1 | selected reg | | | | 1 bit | | | | 0 | 0 | 1 | 0 |
| move | MOV reg1 to reg2 | W to W, W to B | 1 | 1 | dest reg | | | | | 1 | source reg | | | | 1 | 1 | 1 |
| | | B to B, B to W, B to Tmp | 1 | 1 | dest reg | | | | | 0 | source reg | | | | 1 | 1 | 1 |
| | | Tmp to H | 1 | 1 | dest reg | | | | | 1 | 1 | 1 | 1 | 1 | 1 | 1 | 1 |
| | MVW reg1 to reg2 | with temp H | 1 | 1 | 1 | dest reg | | | | 0 | source reg | | | | 1 | 1 | 1 | 0 |

FIG. 15B

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| calculate (Wora) | ADC W | add with carry | 1 | 1 | 0 | 0 | 1 | 0 | 1 | 0 | 1 | source reg | | | | | 0 | 1 |
| | ADD | add without carry | 1 | 1 | 0 | 0 | 1 | 0 | 0 | 0 | 1 | source reg | | | | | 0 | 1 |
| | SBB | sub with borrow | 1 | 1 | 0 | 0 | 1 | 0 | 1 | 1 | 1 | source reg | | | | | 0 | 1 |
| | SUB | sub without borrow | 1 | 1 | 0 | 0 | 1 | 0 | 0 | 1 | 1 | source reg | | | | | 0 | 1 |
| | CMP | compare | 1 | 1 | 0 | 0 | 1 | 1 | 0 | 1 | 1 | source reg | | | | | 0 | 1 |
| | AND | AND | 1 | 1 | 0 | 0 | 0 | 1 | 1 | 1 | 1 | source reg | | | | | 0 | 1 |
| | OR | OR | 1 | 1 | 0 | 0 | 0 | 1 | 1 | 0 | 1 | source reg | | | | | 0 | 1 |
| | EXOR | EXOR | 1 | 1 | 0 | 0 | 0 | 1 | 0 | 1 | 1 | source reg | | | | | 0 | 1 |
| | INV | NOT | 1 | 1 | 0 | 0 | 0 | 0 | 0 | 0 | 1 | source reg | | | | | 0 | 1 |
| | DEC | decrement | 1 | 1 | 0 | 1 | 0 | 0 | 0 | 1 | 1 | source reg | | | | | 0 | 1 |
| | INC | increment | 1 | 1 | 0 | 1 | 0 | 0 | 0 | 0 | 1 | source reg | | | | | 0 | 1 |
| | SHL | shift left | 1 | 1 | 0 | 1 | 1 | 0 | 1 | 0 | 1 | source reg | | | | | 0 | 1 |
| | SHR | shift right | 1 | 1 | 0 | 1 | 1 | 1 | 1 | 0 | 1 | source reg | | | | | 0 | 1 |
| | ROL | arithmetic shift left | 1 | 1 | 0 | 1 | 1 | 0 | 0 | 1 | 1 | source reg | | | | | 0 | 1 |
| | ROR | arithmetic shift left | 1 | 1 | 0 | 1 | 1 | 1 | 1 | 0 | 1 | source reg | | | | | 0 | 1 |
| | | | | | | | | | | | | | | | | | | |

FIG. 15C

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| calculate (Byte) | | | | | | culculate type | | | | | | | | | | | | |
| | ADC B | add with carry | 1 | 1 | 0 | 0 | 0 | 0 | 0 | 0 | 0 | source reg | | | | | 0 | 1 |
| | ADD | add without carry | 1 | 1 | 0 | 0 | 1 | 0 | 0 | 1 | 0 | source reg | | | | | 0 | 1 |
| | SBB | sub with borrow | 1 | 1 | 0 | 0 | 1 | 0 | 1 | 1 | 0 | source reg | | | | | 0 | 1 |
| | SUB | sub without borrow | 1 | 1 | 0 | 0 | 1 | 0 | 0 | 1 | 0 | source reg | | | | | 0 | 1 |
| | CMP | compare | 1 | 1 | 0 | 0 | 1 | 1 | 0 | 1 | 0 | source reg | | | | | 0 | 1 |
| | AND | AND | 1 | 1 | 0 | 0 | 0 | 1 | 1 | 1 | 0 | source reg | | | | | 0 | 1 |
| | OR | OR | 1 | 1 | 0 | 0 | 0 | 1 | 1 | 0 | 0 | source reg | | | | | 0 | 1 |
| | EXOR | EXOR | 1 | 1 | 0 | 0 | 0 | 0 | 0 | 1 | 0 | source reg | | | | | 0 | 1 |
| | INV | NOT | 1 | 1 | 0 | 0 | 0 | 1 | 0 | 0 | 0 | source reg | | | | | 0 | 1 |
| | DEC | decrement | 1 | 1 | 0 | 0 | 0 | 0 | 0 | 1 | 0 | source reg | | | | | 0 | 1 |
| | INC | increment | 1 | 1 | 0 | 0 | 0 | 0 | 0 | 0 | 0 | source reg | | | | | 0 | 1 |
| | SHL | shift left | 1 | 1 | 0 | 1 | 1 | 1 | 0 | 0 | 0 | source reg | | | | | 0 | 1 |
| | SHR | shift right | 1 | 1 | 0 | 1 | 1 | 0 | 1 | 0 | 0 | source reg | | | | | 0 | 1 |
| | ROL | arithmetic shift left | 1 | 1 | 0 | 1 | 1 | 0 | 1 | 0 | 0 | source reg | | | | | 0 | 1 |
| | ROR | arithmetic shift left | 1 | 1 | 0 | 1 | 1 | 1 | 1 | 0 | 0 | source reg | | | | | 0 | 1 |

FIG. 15D

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| ext. data | | future expandability | 0 | 0 | 0 | 1 | ext2 | 0 | 0 | 0 | immediate data | | | | | | | |
| | SET ext2,data | 2nd cycle | | | | | | | | | | | | | | | | |
| | STW ext2,data | with temp H | 0 | 0 | 0 | 1 | ext2 | 0 | 1 | 0 | immediate data | | | | | | | |
| | | 2nd cycle | | | | | | | | | | | | | | | | |
| | MOV reg,ext2 | W to W, W to B | 1 | 1 | 1 | 0 | ext2 | 0 | 0 | 0 | 1 | source reg | | | | | 0 | 0 |
| | | 2nd cycle | | | | | | | | | | | | | | | | |
| | | B to W, B to B | 1 | 1 | 1 | 0 | ext2 | 0 | 0 | 0 | 0 | source reg | | | | | 0 | 0 |
| | | 2nd cycle | | | | | | | | | | | | | | | | |
| | | Imp to R | 1 | 1 | 1 | 0 | ext2 | 0 | 0 | 0 | 1 | 1 | 1 | 1 | 1 | 1 | 0 | 0 |
| | | 2nd cycle | | | | | | | | | | | | | | | | |
| | MVM reg,ext2 | with temp H | 1 | 1 | 1 | 0 | ext2 | 0 | 1 | 0 | source reg | | | | | | 0 | 0 |
| | | 2nd cycle | | | | | | | | | | | | | | | | |

FIG. 15E

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| ext.data | MOV ext1,reg | W to W, W to B | 1 | 1 | 1 | 1 | 0 | 0 | B/W | ext1 | dest reg | | | | | | 0 | 0 |
| | | 2nd cycle | | | | | | | | | | | | | | | | |
| | | B to B, B to Tmp | 1 | 1 | 1 | 1 | 0 | 0 | B/W | ext1 | dest reg | | | | | | 0 | 0 |
| | | 2nd cycle | | | | | | | | | | | | | | | | |
| | MVM ext1,reg | with temp R | 1 | 1 | 1 | 1 | 1 | 0 | B/W | ext1 | dest reg | | | | | | 0 | 0 |
| | | 2nd cycle | | | | | | | | | | | | | | | | |
| | MOV ext1,ext2 | W to W, W to B | 1 | 1 | 1 | 0 | ext2 | 1 | B/W | ext1 | 0 | 0 | 0 | 0 | 0 | 0 | 0 | 0 |
| | | 2nd cycle | | | | | | | | | | | | | | | | |
| | | 3rd cycle | | | | | | | | | | | | | | | | |
| | | B to W, B to B | 1 | 1 | 1 | 0 | ext2 | 1 | B/W | ext1 | 0 | 0 | 0 | 0 | 0 | 0 | 0 | 0 |
| | | 2nd cycle | | | | | | | | | | | | | | | | |
| | | 3rd cycle | | | | | | | | | | | | | | | | |
| | MVM ext1,ext2 | with temp H | 1 | 1 | 1 | 0 | ext2 | 1 | B/W | ext1 | 0 | 0 | 0 | 0 | 0 | 0 | 0 | 0 |
| | | 2nd cycle | | | | | | | | | | | | | | | | |
| | | 3rd cycle | | | | | | | | | | | | | | | | |

FIG. 15F

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| ext. data | calculate ext | Word size | 1 | 1 | 1 | 1 | 0 | 1 | B/W | ext1 | 0 | calculate type | | | | | 0 | 0 |
| | | 2nd cycle | | | | | | | | | | | | | | | | |
| | | 3rd cycle | | | | | | | | | | | | | | | | |
| | | Byte size | 1 | 1 | 1 | 1 | 0 | 1 | B/W | ext1 | 0 | calculate type | | | | | 0 | 0 |
| | | 2nd cycle | | | | | | | | | | | | | | | | |
| | | 3rd cycle | | | | | | | | | | | | | | | | |
| cal reg im | CAL reg, imm | Word size | 1 | 1 | 1 | 1 | calculate type | | | | 1 | source reg | | | | | 0 | 1 |
| | | 2nd cycle | | | | | | | | | | | | | | | | |
| | | 3rd cycle | | | | | | | | | | | | | | | | |
| | | Byte size | 1 | 1 | 1 | 1 | calculate type | | | | 0 | source reg | | | | | 0 | 1 |
| | | 2nd cycle | | | | | | | | | | | | | | | | |
| | | 3rd cycle | | | | | | | | | | | | | | | | |
| | | | | | | | bit 11 indicate cycle count | | | | | | | | | | | |

FIG. 15G

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| branch | BRA always | (always) | 0 | 0 | 0 | 0 | 1 | page | | branch address "L" | | | | | | | | |
| | BRC | (on condition) | 0 | 0 | 0 | 0 | 0 | page | | branch address "L" | | | | | | | | |
| | BRTT stack, F st | (toggle branch) | 0 | 0 | 0 | 1 | A/C | 1 | FROM stack | | | | TO stack | | | | 1 | 1 |
| | BRST stack | (branch to stack) | 0 | 0 | 0 | 1 | A/C | 1 | FROM stack | | | | TO stack | | | | 1 | 1 |
| break | BRK | hardware 0 cycle | 0 | 0 | 0 | 0 | 1 | | | | 0 | 0 | 0 | 0 | 0 | 0 | 1 | 0 |
| | | jump to break vector | | | | | 1 | | | | | | | | | | | |
| return | RTB | hardware 0 cycle | 0 | 0 | 0 | 1 | A/C | 1 | 0 | 0 | 0 | 0 | 0 | 0 | 0 | 1 | 1 | 0 |
| | | return from break | | | | | 1 | | | | | | | | | | | |
| interrupt | interrupt | hardware 0 cycle | 0 | 0 | 0 | 1 | A/C | 1 | 0 | 0 | 0 | 0 | TO stac | | | 0 | 1 | 0 |
| | | 1 cycle | | | | | | | | | | | | | | | | |

FIG. 15H

| operation | mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|
| jump | JSR | (jump sub on condition) | 0 | 0 | 1 | subroutine octat adrs | | | | | | | | | | FROM stac | | |
| reset | RES | hardware 0 cycle | | | | | 1 | | | | | | | | | | | |
| | | jump to resel vector | 0 | 0 | 0 | 1 | 1 | 1 | 0 | 0 | 0 | 0 | 1 | 1 | 1 | 1 | 1 | 0 |
| test | TES | hardware 0 cycle | | | | | 1 | | | | | | | | | | | |
| | | jump to test vector | 0 | 0 | 0 | 1 | 1 | 1 | 0 | 0 | 0 | 0 | 1 | 1 | 1 | 0 | 1 | 0 |
| stop | STP | stop bus block source ck | 0 | 0 | 0 | 1 | 1 | 1 | 1 | 0 | 0 | 0 | 0 | 0 | 0 | 0 | 1 | 0 |
| nop | NOP | no operation | 0 | 0 | 0 | 1 | 0 | 1 | 1 | 0 | 0 | 0 | 0 | 0 | 0 | 0 | 1 | 0 |
| interrupt | INE | set/clear interrupt contro | 1 | 1 | 0 | use return stack | | | | | 0 | enable bit | | | | | 1 | 0 |

FIG. 15I

| operation | mnemonic | | | control signal output of Decoder | | | | | | comment |
|---|---|---|---|---|---|---|---|---|---|---|
| set | SET reg, data | e22 | | | | e03B | | | | |
| | SET reg, data | e22 | | | e02 | e03B | | | e23 | e61 |
| | SET reg, data | e22 | | | e02 | e03B | | | e23 | e61 |
| | STW reg, data | e22 | e01 | | | e03B | | | e23 | e61 |
| | future expandability | | | | | | | | | |
| bit set | SEB bit, reg | | | | | | | e41B | e23 | e61 |
| | CLB bit, reg | | | | e02 | e03B | | e41B | e23 | e61 |
| | future expandability | | | | | | | | | |
| test | STM reg, date | e22 | e44B | | | e03B | e69 | | | |
| | BMS bit, reg | | e44 | | e02 | e03 e04 | e69 | e41 | e23 | e61 |
| | BMC bit, reg | | e44 | | e02 | e03B | e69 | e41 | e23 | e61 |
| move | MOV reg1 to reg2 | e21 | | | | | | e70 | e23 | e61 |
| | | | | e00 | e01 | | | e70 | e23 | e61 |
| | MVW reg1 to reg2 | e21 | e01 | | e02 | e03B | | | e23 | e61 |

FIG. 15J

| operation | mnemonic | control signal output of Decoder | | | | | | | | | | | comment |
|---|---|---|---|---|---|---|---|---|---|---|---|---|---|
| calculate (Word) | ADC W | e21 | e00 | e01 | e45 | e0DB | | e0C | e0E | e23 | e61 | |
| | ADD | e21 | e00 | e01 | e45B | | | e0C | e0E | e23 | e61 | |
| | SBB | e21 | e00 | e01 | e45 | e0D | e04 | e0C | e0E | e23 | e61 | |
| | SUB | e21 | e00 | e01 | e45 | e05 | e04 | e0C | e0E | e23 | e61 | |
| | CMP | e21 | e00 | e01 | e45 | e09 | e04 | e0C | e0E | e23 | e61 | e05 |
| | AND | e21 | e00 | e01 | e45B | | e07 | e06 | e0E | e23 | e61 | |
| | OR | e21 | e00 | e01 | e45B | | e08 | e06 | e0E | e23 | e61 | |
| | EXOR | e21 | e00 | e01 | e45B | | e04 | e06 | e0E | e23 | e61 | |
| | INV | e21 | | | e45B | | | e0C | e0E | e23 | e61 | |
| | DEC | e21 | | | e45B | e05 | e0F | e0C | e0E | e23 | e61 | |
| | INC | e21 | | | e45 | e05 | | e0C | e0E | e23 | e61 | |
| | SHL | e21 | e0A | | e45B | | | e0C | e0E | e23 | e61 | |
| | SHR | e21 | e0A | | e45B | e0DB | e09 | e0C | e0E | e23 | e61 | |
| | ROL | e21 | e0A | | e45 | e0D | | e0C | e0E | e23 | e61 | |
| | ROR | e21 | e0A | | e45 | e0D | e09 | e0C | e0E | e23 | e61 | |

FIG. 15K

| operation | mnemonic | | | | | control signal output of Decoder | | | | | | comment |
|---|---|---|---|---|---|---|---|---|---|---|---|---|
| calculate (Wora) | ADC B | e21 | e00 | | e45 | e0DB | | e03 | e0C | e0E | e23 | e61 | |
| | ADD | e21 | e00 | | e45B | | | e03 | e0C | e0E | e23 | e61 | |
| | SBB | e21 | e00 | | e45 | e0D | e04 | e03 | e0C | e0E | e23 | e61 | |
| | SUB | e21 | e00 | | e45 | e05 | e04 | e03 | e0C | e0E | e23 | e61 | |
| | CMP | e21 | e00 | | e45 | e09 | e04 | e03 | e0C | e0E | e23 | e61 | e05 |
| | AND | e21 | e00 | | e45B | | e07 | e03 | e06 | e0E | e23 | e61 | |
| | OR | e21 | e00 | | e45B | | e08 | e03 | e06 | e0E | e23 | e61 | |
| | EXOR | e21 | | | e45B | | e04 | e03 | e06 | e0E | e23 | e61 | e0F |
| | INV | e21 | | | e45B | | | e03 | e06 | e0E | e23 | e61 | e0F |
| | DEC | e21 | | | e45B | | e04 | e03 | e0C | e0E | e23 | e61 | |
| | INC | e21 | | | e45 | e05 | | e03 | e0C | e0E | e23 | e61 | |
| | SHL | e21 | | e0A | e45B | | | e03 | e0C | e0E | e23 | e61 | |
| | SHR | e21 | | e0A | e45B | | e09 | e03 | e0C | e0E | e23 | e61 | |
| | ROL | e21 | | e0A | e45 | e0DB | | e03 | e0C | e0E | e23 | e61 | |
| | ROR | e21 | | e0A | e45 | e0D | e09 | e03 | e0C | e0E | e23 | e61 | |
| | | | | | | | | | | | | | |
| | | | | | | | | | | | | | |

FIG. 15L

| operation | mnemonic | control signal output of Decoder | | | | | | | | | | comment |
|---|---|---|---|---|---|---|---|---|---|---|---|---|
| ext. data | | | | | | | | | | | | |
| | SET ext2 data | e22 | | e52 | | | | e03 | e23 | e42 | e65 | 2cycle |
| | | | e13 | e10B | | | | | | e81 | | |
| | STW ext2 data | e22 | | e52 | e01 | | | e03 | e23 | e42 | e65 | 2cycle |
| | | | e13 | e10B | | | | | | e81 | | |
| | MOV reg, ext2 | e21 | | e52 | | | | | e23 | e42 | e65 | 2cycle |
| | | | e13 | e10B | | | e81 | | | | | |
| | | e21 | | e52 | e00 | e01 | e02 | e03 | e23 | e42 | e65 | 2cycle |
| | | | e13 | e10B | | | e81 | | | | | |
| | MVM reg, ext2 | e21 | | e52 | e01 | | | e03 | e23 | e42 | e65 | 2cycle |
| | | | e13 | e10B | | | e81 | | | | | |

FIG. 15M

| operation ext.data | mnemonic | control signal output of Decoder | | | | | | | | | | comment |
|---|---|---|---|---|---|---|---|---|---|---|---|---|
|  | MOV ext1,reg | e22 | e13 | e10B | e51 | e45B | e61 |  |  |  | e42 | e65 | 2cycle |
|  |  |  |  |  |  |  |  |  |  |  |  |  |  |
|  | MVM ext1,reg | e22 | e13 | e10B | e51 | e45B |  |  | e23 |  | e42 | e65 | 2cycle |
|  |  |  | e13 | e10B |  |  | e61 | e03 | e23 |  |  |  |  |
|  | MOV ext1,ext2 | e22 | e13 | e10B | e51 | e45 | e61 | e03 | e23 |  | e42 | e65 | 2cycle |
|  |  |  |  |  |  |  |  |  |  |  |  |  |  |
|  |  |  | e13 |  | e51 |  |  |  |  | e81 |  |  | 3cycle |
|  |  | e22 | e13 | e10 | e52 |  |  |  |  |  | e42 | e65 |  |
|  |  |  | e13 | e10B |  |  |  |  | e23 |  | e42 | e65 |  |
|  | MVM ext1,ext2 | e22 | e13 | e10 | e52 | e45 | e01 |  |  |  | e42 | e65 | 3cycle |
|  |  |  | e13 | e10B |  |  |  | e03 | e23 |  | e42 | e65 |  |
|  |  |  | e13 |  | e51 |  |  |  |  | e81 |  |  | 3cycle |
|  |  | e22 | e13 | e10 | e52 |  | e01 |  |  |  | e42 | e65 |  |
|  |  |  | e13 | e10B |  |  |  | e03 | e23 |  | e42 | e65 |  |
|  |  |  |  |  |  |  |  |  |  | e81 |  |  |  |

FIG. 15N

| operation | mnemonic | control signal output of Decoder | | | | | | | | | comment |
|---|---|---|---|---|---|---|---|---|---|---|---|
| ext.data | calculate ext | | | | | | | | e42 | e65 | 3cycle |
| | | e22 | e13 | e10 | e51 | e18B | | | e42 | e65 | |
| | | | e13 | e10B | | | e81 | e23 | e42 | e65 | 3cycle |
| | | | | | e51 | | ** | | | | |
| | | e22 | e13 | e10 | e51 | e18B | ** | e03 | e23 | e42 | e65 |
| | | | e13 | e10B | | | e81 | | | | |
| | | | | | | | | | | | |
| cal reg.im | CAL reg.imm | | | | | | | | | | 3cycle |
| | | e22 | e13 | e10B | | e46 | e61 | | e23 | | save Temp |
| | | e21 | | ** | e45B | | e61 | | e23 | | |
| | | | | | | | | | | | 3cycle |
| | | e22 | e13 | e10B | | e46 | e61 | e03 | e23 | | save Temp |
| | | e21 | | ** | e45B | | e61 | e03 | e23 | | |
| | | **depend on each calculate type | | | | | | | | | |

FIG. 150

| operation | mnemonic | control signal output of Decoder | | | | | | | | comment |
|---|---|---|---|---|---|---|---|---|---|---|
| branch | BRA always | e42 | e43 | e47 | e63 | | | | | |
| | BRC | e42 | e43 | e47 | e63 | | | | | e65, e66 =0, if BRAV=0 |
| | BRTT stack, F st | e42 | e43B | e65 | e66 | | | | | e65 =0, if BRAV=0 |
| | BRST stack | e42 | e43B | e65 | | | | | | |
| break | BRK | | e12 | e73 | e84 | e85 | e87B | | | e27=1 on any condition |
| | | e42 | e43B | e65 | e66 | | e50 | e27 | (e86) | e65, e66=0, if BRAV=0 |
| return | RTB | | | e65 | | | e87B | | e86 | (e86)=0, if BRAV=1 |
| | | e42 | e43B | e65 | | e85 | e87B | | | e65, e86=0, if BRAV=1 |
| interrupt | interrupt | | e12 | e73 | e66 | | e50 | e53B | e68 | |
| | | e42B | | e65 | e66 | | | | | e65, e66=0, if BRAV=1 |
| | | | | | | | | | | |

FIG. 15P

| operation | mnemonic | control signal output of Decoder | | | | | | | comment |
|---|---|---|---|---|---|---|---|---|---|
| jump | JSR | e42B | | e64 | e66 | e49 | | | |
| reset | RES | | e42 e43B | e71 | | | e87B | e68 | |
| test | TES | | e42 e43B | e71 | | | e87B e26 | e68 | |
| stop | STP | e67 | | | | | | | |
| nop | NOP | nothing | | | | | | | |
| interrupt | INE | e62 | | | | | | | |

FIG. 16

| mnemonic | comment | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|
| JSR | branch | 0 | 0 | 1 | | | | | | | | | | | | | |
| BHA,BRC | branch | 0 | 0 | 0 | 0 | | | | | | | | | | | | |
| BRT,BRS | branch | 0 | 0 | 0 | 1 | | 1 | 0 | 0 | 0 | 0 | 0 | 0 | 0 | | 1 | 1 |
| BHK,RTB | branch | 0 | 0 | 0 | 1 | | 1 | 0 | 0 | 0 | 0 | 1 | 1 | 1 | | 1 | 0 |
| RES,TES | branch | 0 | 0 | 0 | 1 | | 1 | 1 | 0 | 0 | 0 | 0 | 0 | 0 | | 1 | 0 |
| interrupt | branch | 0 | 0 | 0 | 1 | | 1 | 1 | 0 | 0 | 0 | | | | | | 0 |
| STP,NOP | others | 0 | 0 | 0 | 1 | | 0 | | 0 | | | | | | | | |
| SET ex12,data | ext access | 0 | 0 | | | | | | | | | | | | | | |
| STW reg,data | move or set | 0 | 1 | 1 | | | | | | | | | | | | | |
| STM reg | move or set | 0 | 1 | 0 | | | | | | | | | | | | | |
| SET reg,data | move or set | 1 | 0 | | | | | | | | | | | | | | |
| MOV reg,ex12 | ext access | 1 | 1 | 1 | 0 | | 0 | | | | | | | | | 0 | 0 |
| MOV ext1,reg | ext access | 1 | 1 | 1 | 1 | | 0 | | | | | | | | | 0 | 0 |
| MOV ext1,ext2 | ext access | 1 | 1 | 1 | 0 | | 1 | | | | | | | | | 0 | 0 |
| CAL ext | ext access | 1 | 1 | 1 | 1 | 0 | 1 | | | | | | | | | 0 | 0 |
| CAL reg | move or set | 1 | 1 | 0 | 1 | | | | | | | | | | | 0 | |
| CAL reg,imm | 2words inst | 1 | 1 | 1 | | | | | | | | | | | | 0 | |
| INE | others | 1 | 1 | 0 | 1 | | | | | 0 | | | | | | 1 | 0 |
| SEB,CLB bit,reg | move or set | 1 | 1 | 0 | 1 | | | | | 1 | | | | | | 1 | 0 |
| MVW reg1,reg2 | move or set | 1 | 1 | 1 | | | | | | 0 | | | | | | 1 | 0 |
| BMS,BMC bit,reg | move or set | 1 | 1 | 1 | | | | | | 1 | | | | | | 1 | 0 |
| MOV reg1,reg2 | move or set | 1 | 1 | | | | | | | | | | | | | 1 | 1 |

FIG. 17A

| | |
|---|---|
| SET | Store 8 bits immediate in specified register. In the case where specified register is word lengh, higher 8 bits become "0". |
| STW | Assign immediate operand in lower 8 bits of word length register. To higer 8 bit, higher portion value of temp. register is set. |
| SEB | Set specified bit of specified register. |
| CLB | Clear specified bit of specified register. |
| STM | Specify object register of condition judging circuit, and simultaneously store 8 bits immediate in mask register. |
| BMS | Specify object register of condition judging circuit, and simultaneously set specified bit of mask register in "H", and assign all "H" in compair register. |
| BMC | Specify object register of condition judging circuit, and simultaneously set specified bit of mask register in "H", and assign all "L" in compair register. |
| MOV | Move (transfer) value form specified reg. to another specified reg. |

FIG. 17B

| | |
|---|---|
| MVW | Transfer lower 8 bits from specified reg. to specified word length reg. To higer 8 bits, higher portion of temp. reg. is set. |
| CAL | This is instructio for operation. "0" is store in higher 8 bits when source reg. is specified as word length. |
| ADC | Add values of specified reg. and temp. reg. and stoer result in reg. Operation with carry. |
| ADD | Addtion without carry. |
| SBC | Subtract value of temp. reg. from specified reg. and stoer result in reg. Operation with borrow. |
| SUB | Subtraction without borrow. |
| CMP | Subtract value of temp. reg. from specified reg. and set carry flag and zero flag. Result is not stored in reg. Operation with carry. |
| AND | Logical product. |
| OR | Logical summ. |

FIG. 17C

| EXOR | Exclusive logical sum. |
|---|---|
| INV | Not. |
| DEC | -1 from value of specified reg. and store in the reg. |
| INC | +1 to value of specified reg. and store in the reg. |
| SHL | Left shift without carry. "0" addition. |
| SHR | Right shift without carry. "0" addition. |
| ROL | Left shift with carry. |
| ROR | Right shift with carry. |
| BRA | Unconditional branch. Lower 9 bits use immediate specified by operand and higher 4 bits is based on page being executed, and jump is executed to +1/0/-1/absolute 0 page. |
| BRC | Conditional branch. Calculation of branch add. is as same as BRA. |

FIG. 17D

| | |
|---|---|
| BRT | Conditional branch. Execute branch by making specified stack reg. as jump targert, and saving return add. in another specified stack reg. this instruction can be used as one kind of subroutin call. |
| BRS | Conditional branch. As same as BRT, make specified stack reg. be jump target, but do not save return add. |
| BRK | Break interrupt. There are hardware interrupt by add. coincide detection circuit, and software interrupt. In both, stack reg. 0 become jump target add. and return add. is saved in stack reg. 1. At executing break, timer count source timer is stopped not to make laps of count value at debugging. |
| RTB | Return from break routine. Return to add. saved in stack reg. 1 and releace timer starting. There are hardware starting and software starting. count source to make counter be able to count. |
| INT | Interrupt. Defined by various functional blocks. Interrupt is made by interrupt factor previously wired. Software interrupt is not used in prinsiple. When interrup is generated, branch is executed by making value stored in specified stack reg. be start add. of interrupt routine. At the same time, add. being executed is saved in corresponding stack reg. so that sequence can return to original add. after finishing interrupt routine. BRS instruction can be used in return form interrupt. |

FIG. 17E

| | |
|---|---|
| JSR | Subroutine call. Branch to subroutine of specified add. The add. is specified by operand of bit 12 to 3, and lower 3 bits are replaced by "0". Return add. is stored in specified stack reg. BRS instruction can be used in return form subroutine. |
| RES | Reset instruction. Start program from add. "0", and reset each reg. of CPU. Not only hardware reset from outside but software reset can be executed. |
| TES | Test reset instruction. CPU start instruction from add. specified from outside. Register in each portion of CPU is not reset. Hardware test start controlled from outside can be executed. |
| STP | Stop control of system clock. |
| NOP | No Operation. |
| INE | Used for storing value in interrupt control reg. |

FIG. 18

| | | |
|---|---|---|
| imm | Immediate. Operand value is directly used by instruction. |
| ext 1 | Showing memory active state. Memory add. is specified by External Address Pointeer 1 reg. |
| ext 2 | Showing memory active state. Memory add. is specified by External Address Pointeer 2 reg. |
| selecter reg | Specify object reg. by condition judging circuit. |
| B/W | Descriminate reg. handling in word lengh or byte lengh. |
| A/C | Descriminate conditional or unconditional branch. |
| FROM_stack | Used for specifing storing stack reg. of return add. |
| To_stack | Used for specifing stack reg. of jump target add. |
| page | Used for branch page at branch instructon. |

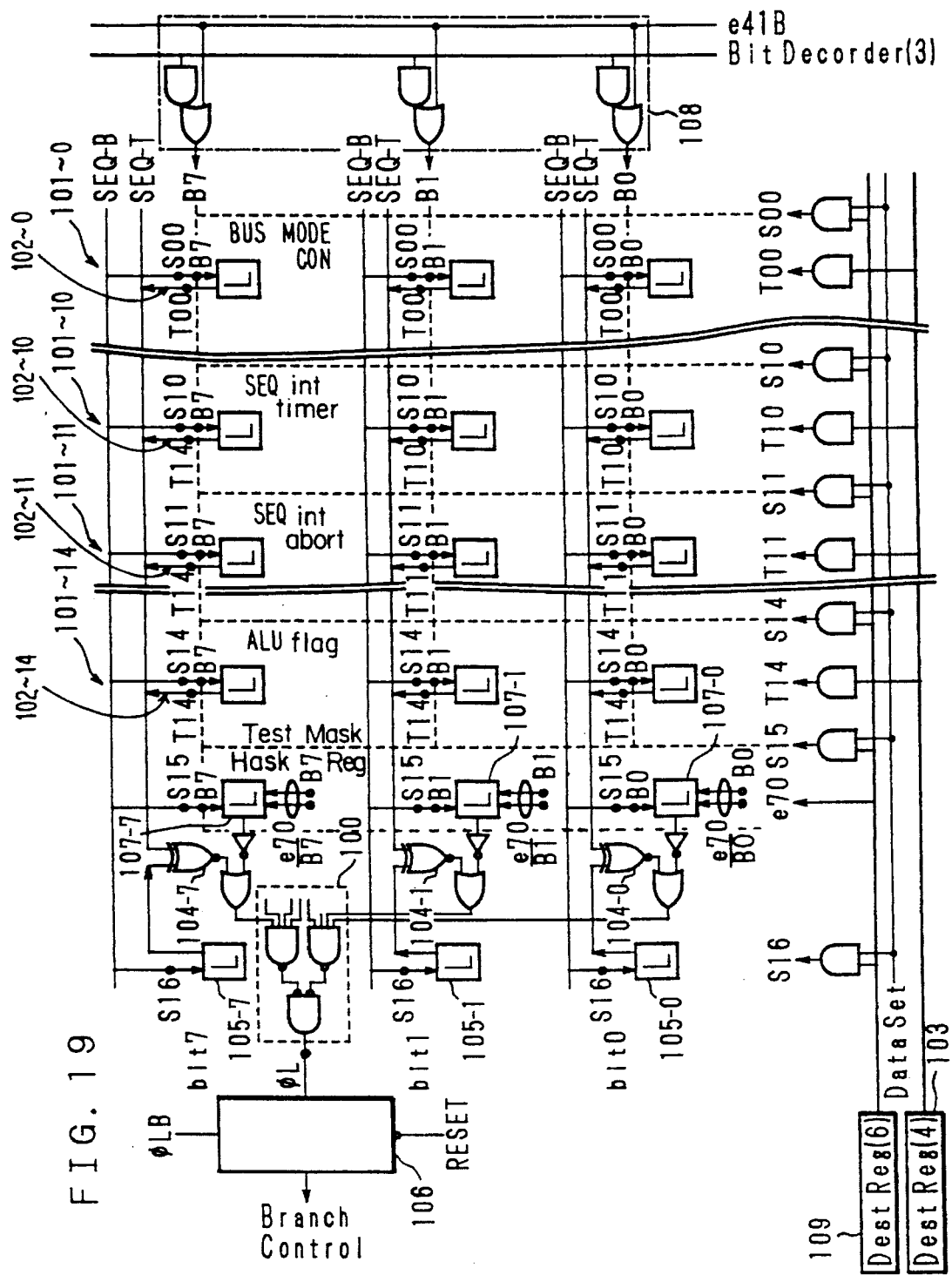

FIG. 20A

| loctn | type | SEQ adrs | CPU adrs | local adrs | reg. name | type | comment |
|---|---|---|---|---|---|---|---|
| 1 | | hidden | 002F | — | BUS INT EI | 1 | |
| 2 | | hidden | 0030 | — | local pointer | 2 | |
| 19 | bit.S | 00 | hidden | — | test mask | | bit setable |
| 4 | bit.S | 01 | 002A | — | BUS MODE CON | | bit setable |
| 5 | bit.S | 02 | 002B | — | TXD CON&STS | | bit setable |
| 6 | bit.S | 03 | 002C | — | TXD STS | | bit setable |
| 7 | bit.S | 04 | 002D | — | RXD CON&STS | | bit setable |
| 8 | bit.S | 05 | 002E | — | RXD STS | | bit setable |
| 9 | bit.S | 06 | hidden | — | RXD filter clock select | | bit setable |
| 10 | bit.S | 07 | hidden | — | work reg1 | | bit setable |
| 11 | bit.S | 08 | hidden | — | TXD block | | bit setable |
| 12 | bit.S | 09 | hidden | — | RXD block | | bit setable |
| 13 | bit.S | 0A | hidden | — | SEQ int req | | bit setable |
| 14 | bit.S | 0B | hidden | — | SEQ int enable | | bit setable |
| 15 | bit.S | 0C | hidden | — | future expandability | | bit setable |
| 16 | bit.S | 0D | hidden | — | future expandability | | bit setable |
| 17 | bit.S | 0E | hidden | — | ALU flag | | bit setable |
| 18 | bit.S | 0F | hidden | — | work reg2 | | bit setable |
| 20 | byte | 10 | hidden | — | compare reg | 3 | special latch |

FIG. 20B

| loctn | type | SEQ adrs | CPU adrs | local adrs | reg. name | type | comment |
|---|---|---|---|---|---|---|---|
| 3 | byte | 11 | 0032 | — | TXD RXD FIFO | 4,5 | pass box(FIFO) |
| 21 | byte | 12 | 0031 | 0A | TXD length | 6 | pass box(c→s) |
| 22 | byte | 13 | 0031 | 0B | RXD length | 7 | pass box(s→c) |
| 23 | byte | 14 | 0031 | 0C | (TXD control) | 6 | pass box(c→s) |
| 24 | byte | 15 | 0031 | 0D | (RXD control) | 7 | pass box(s→c) |
| 70 | byte | 16 | hidden | — | TXD counter | 8 | simple latch |
| 71 | byte | 17 | hidden | — | RXD counter | 8 | simple latch |
| 72 | byte | 18 | hidden | — | Retry counter | 8 | simple latch |
| 73 | byte | 19 | hidden | — | work reg3 | 8 | simple latch |
| 74 | byte | 1A | hidden | — | TXD data | 9 | functional |
| 75 | byte | 1B | hidden | — | RXD data | 10 | functional |
| 76 | byte | 1C | hidden | — | TXD bit pointer(3) | 11 | functional |
| 77 | byte | 1D | hidden | — | RXD bit pointer(3) | 11 | functional |
| 38 | byte | 1E | hidden | — | high to temp low | 12 | special latch |
| 39 | byte | 1F | hidden | — | low to temp high | 13 | special latch |
| 35 | byte | hidden | 0031 | 10 | break comp adrs L | 14 | test&debug circuit |
| 36 | byte | hidden | 0031 | 11 | break comp adrs H | 14 | test&debug circuit |
| 37 | byte | hidden | 0031 | 12 | break counter | 15 | test&debug circuit |

FIG. 20C

| loctn | type | SEQ adrs | CPU adrs | local adrs | reg. name | type | comment |
|---|---|---|---|---|---|---|---|
| 25 | pair | hidden | 0031 | | | | * |
| 26 | pair | hidden | 0031 | | | | * |
| 27 | pair | hidden | 0031 | | | | |
| 28 | pair | hidden | 0031 | | | | |
| 29 | pair | 20 | 0031 | 14 | test start adrs L | | |
| 30 | pair | | 0031 | 15 | test start adrs H | | |
| 31 | pair | 21 | 0031 | | | | |
| 32 | pair | | 0031 | | | | |
| 33 | pair | 22 | 0031 | 00 | ID ADRS L | 6 | pass box(c→s) |
| 34 | pair | | 0031 | 01 | ID ADRS H | 6 | pass box(c→s) |
| 40 | pair | 23 | 0031 | 04 | TXD S ADRS L | 6 | pass box(c→s) |
| 41 | pair | | 0031 | 05 | TXD S ADRS H | 6 | pass box(c→s) |
| 42 | pair | 24 | 0031 | 06 | RXD M ADRS L | 7 | pass box(s→c) |
| 43 | pair | | 0031 | 07 | RXD M ADRS H | 7 | pass box(s→c) |
| 44 | pair | 25 | 0031 | 08 | RXD S ADRS L | 7 | pass box(s→c) |
| 45 | pair | | 0031 | 09 | RXD S ADRS H | 7 | pass box(s→c) |
| | pair | 26 | hidden | — | work reg4 L | 8 | simple latch |
| | pair | | hidden | — | work reg4 H | 8 | simple latch |
| | pair | 27 | hidden | — | work reg5 L | 8 | simple latch |
| | pair | | hidden | — | work reg5 H | 8 | simple latch |
| | pair | | hidden | — | work reg6 L | 8 | simple latch |
| | pair | | hidden | — | work reg6 H | 8 | simple latch |

FIG. 20D

| loctn | type | SEQ adrs | CPU adrs | local adrs | reg. name | type | comment |
|---|---|---|---|---|---|---|---|
| | pair | | hidden | — | future expandability | | |
| | pair | | hidden | — | future expandability | | |
| | pair | 28 | hidden | — | future expandability | | |
| | pair | | hidden | — | future expandability | | |
| 46 | pair | 29 | hidden | — | timer1 L | 16 | functional |
| 47 | pair | 2A | hidden | — | timer1 H | 16 | functional |
| 48 | pair | 2B | hidden | — | timer2 L | 16 | functional |
| 49 | pair | | hidden | — | timer2 H | 16 | functional |
| | pair | 2C | hidden | — | future expandability | | |
| | pair | 2D | hidden | — | future expandability | | |
| | pair | 2E | hidden | — | future expandability | | |
| | pair | 2F | hidden | — | future expandability | | |
| | pair | | hidden | — | future expandability | | |
| | pair | 30 | hidden | — | future expandability | | |
| 50 | pair | | hidden | — | stack1 L | 17 | break vector |
| 51 | pair | 31 | hidden | — | stack1 H | 17 | |
| 52 | pair | | hidden | — | stack2 L | 17 | break return |
| 53 | pair | | hidden | — | stack2 H | 17 | |

FIG. 20E

| loctn | type | SEQ adrs | CPU adrs | local adrs | reg. name | type | comment |
|---|---|---|---|---|---|---|---|
| 54 | pair | 32 | hidden | — | stack3 L | 17 | int timer vector |
| 55 | pair |    | hidden | — | stack3 H | 17 | int timer return |
| 56 | pair | 33 | hidden | — | stack4 L | 17 | int timer return |
| 57 | pair |    | hidden | — | stack4 H | 17 | int abort vector |
| 58 | pair | 34 | hidden | — | stack5 L | 17 | int abort vector |
| 59 | pair |    | hidden | — | stack5 H | 17 | int abort return |
| 60 | pair | 35 | hidden | — | stack6 L | 17 | int abort return |
| 61 | pair |    | hidden | — | stack6 H | 17 | general use |
| 62 | pair | 36 | hidden | — | stack7 L | 17 | general use |
| 63 | pair |    | hidden | — | stack7 H | 17 |  |
| 64 | pair | 37 | hidden | — | stack8 L | 17 |  |
| 65 | pair |    | hidden | — | stack8 H | 17 |  |
|  | pair | 38 | hidden | — | future expandability |  |  |
|  | pair |    | hidden | — | future expandability |  |  |
|  | pair | 39 | hidden | — | future expandability |  |  |
|  | pair |    | hidden | — | future expandability |  |  |
|  | pair | 3A | hidden | — | future expandability |  |  |
|  | pair |    | hidden | — | future expandability |  |  |
|  | pair | 3B | hidden | — | future expandability |  |  |
|  | pair |    | hidden | — | future expandability |  |  |

FIG. 20F

| loctn | type | SEQ adrs | CPU adrs | local adrs | reg. name | type | comment |
|---|---|---|---|---|---|---|---|
| 66 | pair | 3C | hidden | — | external address pointer1 L | 17 | * |
| 67 | pair | | hidden | — | external address pointer1 H | 17 | * |
| 68 | pair | 3D | hidden | — | external address pointer2 L | 17 | * |
| 69 | pair | | hidden | — | external address pointer2 H | 17 | * |
| | pair | 3E | hidden | — | future expandability | | |
| | pair | | hidden | — | future expandability | | |
| 38 | pair | 3F | — | — | temp L | 12 | tempolary reg |
| 39 | pair | | — | — | temp H | 13 | tempolary reg |

FIG. 21A

| original reg | control bit | bit | bit size | SEQ soft | SEQ INT | SEQ hard |
|---|---|---|---|---|---|---|
| BUS INT EI | TXD START EI | 0 | 1 | – | | INT rsp |
| | TXD END EI | 1 | 1 | – | | INT rsp |
| This reg. Is not | TXD FIFO NOT FULL EI | 2 | 1 | – | | INT rsp |
| Bit-Setable | TXD FIFO WRITE EI | 3 | 1 | – | | INT rsp |
| | RXD START EI | 4 | 1 | – | | INT rsp |
| | RXD END EI | 5 | 1 | – | | INT rsp |
| | RXD FIFO 8OVER EI | 6 | 1 | – | | INT rsp |
| test mask | test mask bit | 7to0 | 8 | set | | condition |
| BUS MODE CO | MODE INTIAL | 0 | 1 | – | | rest |
| | TXD COM MOD | 1 | 1 | read | | – |
| | COM RATE | 2,3 | 2 | read | | – |
| | RXD COM MOD | 4,5 | 2 | set | | – |
| | test mode | 6,7 | 2 | read | | test mode |

FIG. 21B

| original reg | control bit | bit | bit size | SEQ soft | SEQ INT | SEQ hard |
|---|---|---|---|---|---|---|
| TXD CON&STS | TXD START (master request) | 0 | 1 | read/clear | — | — |
| | TXD ABORT | 1 | 1 | read | int | — |
| | SEQ I/O enable | 2 | 1 | set | — | P7 rsp |
| | TXD BREAK CHAR | 3 | 1 | read | int | TXD rsp |
| | TXD FIFO CLEAR | 4 | 1 | set | — | FIFO rsp |
| | TXD FIFO EMPTY | 5 | 1 | read | — | FIFO set |
| | TXD FIFO lastone | 6 | 1 | read | — | FIFO set |
| | TXD MONITOR | 7 | 1 | set | — | — |
| TXD STS | TXD CON FIELD ERROR | 0 | 1 | set | — | — |
| | TXD DATA FIELD ERROR | 1 | 1 | set | — | — |
| | TXD START REQ | 2 | 1 | set | — | — |
| | TXD END REQ | 3 | 1 | set | — | — |
| | TXD FIFO FULL | 4 | 1 | read | — | FIFO set |
| | TXD FIFO LACK ABORT | 5 | 1 | set | — | — |
| | TXD FIFO ILLEGAL ACCESS | 6 | 1 | read | — | FIFO set |
| | TXD FIFO WRITE REQ | 7 | 1 | set | — | — |

FIG. 21C

| original reg | control bit | bit | bit size | SEQ soft | SEQ INT | SEQ hard |
|---|---|---|---|---|---|---|
| RXD CON&STS | RXD ENABLE | 0 | 1 | read | | — |
| | RXD ABORT | 1 | 1 | read/set | int | — |
| | | 2 | | | | |
| | RXD FIFO CLEAR | 3 | 1 | set | | FIFO rsp |
| | RXD FIFO EMPTY | 4 | 1 | read | | FIFO set |
| | RXD FIFO half | 5 | 1 | read | | FIFO set |
| | RXD FIFO full | 6 | 1 | read | | FIFO set |
| | RXD MONITOR | 7 | 1 | set | | — |
| RXD STS | RXD CON FIELD READ END | 0 | 1 | set | | REG clear |
| | RXD CON FIELD OVERWRITE | 1 | 1 | set | | — |
| | RXD DATA FIELD ERROR | 2 | 1 | set | | — |
| | RXD START REQ | 3 | 1 | set | | — |
| | RXD END REQ | 4 | 1 | set | | — |
| | RXD FIFO OVERRUN | 5 | 1 | set | | — |
| | RXD FIFO ILLEGAL ACCESS | 6 | 1 | read | | FIFO set |
| | RXD FIFO 8OVER REQ | 7 | 1 | set | | — |

FIG. 21D

| original reg | control bit | bit | bit size | SEQ soft | SEQ INT | SEQ hard |
|---|---|---|---|---|---|---|
| filter clock select | | 2 to 0 | 3 | set | | |
| | | | | | | |
| | | | | | | |
| | | | | | | |
| | | | | | | |
| | | | | | | |
| work reg1 | work reg1 | 7 to 0 | 8 | set | | — |
| TXD block | TXD parity | 0 | 1 | read/set | | TXD |
| | TXD truck | 1 | 1 | set | | TXD rsp |
| | TXD data enable | 2 | 1 | set | | TXD rsp |
| | TXD shift trigger | 3 | 1 | set/auto c | | TXD rsp |
| | TXD MSB/LSB first | 4 | 1 | set | | TXD rsp |
| | TXD parity output enable | 5 | 1 | set | | TXD rsp |
| | TXD last data | 6 | 1 | read | | TXD set |
| | read TXD parameter | 7 | 1 | set/auto c | | pass box |

FIG. 21E

| original reg | control bit | bit | bit size | SEQ soft | SEQ INT | SEQ hard |
|---|---|---|---|---|---|---|
| RXD block | RXD parity | 0 | 1 | read/set | | RXD set |
| | RXD direct read(busin)/DATA c | 1 | 1 | read/set | int | RXD |
| | RXD data change | 2 | 1 | read/hold | | RXD rsp |
| | RXD shift trigger | 3 | 1 | read/auto c | | RXD rsp |
| | RXD MSB/LSB first | 4 | 1 | set | | RXD rsp |
| | RXD last data | 5 | | read | | RXD set |
| | | 6 | | | | |
| | write RXD paremeter | 7 | 1 | read/auto c | | pass box |
| SEQ Int req | TIM1 overflow req | 0 | 1 | read/clear | | TIM set |
| | TIM2 overflow req | 1 | 1 | read/clear | | TIM set |
| | RXD data fall req | 2 | 1 | read/clear | | RXD set |
| | RXD data rise req | 3 | 1 | read/clear | | RXD set |
| | TXD ABORT req | 4 | 1 | read/clear | | CPU set |
| | TXD BREAK CHAR req | 5 | 1 | read/clear | | CPU set |
| | RXD ABORT req | 6 | 1 | read/clear | | CPU set |
| | | 7 | 1 | | | |

FIG. 21F

| original reg | control bit | bit | bit size | SEQ soft | SEQ INT | SEQ hard |
|---|---|---|---|---|---|---|
| SEQ Int enable | TIM1 overflow enable | 0 | 1 | set | | |
| | TIM2 overflow enable | 1 | 1 | set | | |
| | RXD data fall enable | 2 | 1 | set | | |
| | RXD data rise enable | 3 | 1 | set | | |
| | TXD ABORT enable | 4 | 1 | set | | |
| | TXD BREAK CHAR enable | 5 | 1 | set | | |
| | RXD ABORT enable | 6 | 1 | set | | |
| | | 7 | 1 | | | |
| ALU flag | ALU zero | 0 | 1 | | | ALU set |
| | carry/borrow | 1 | 1 | set | | ALU set |
| | | 2 | 1 | | | |
| | | 3 | 1 | | | |
| | | 4 | 1 | | | |
| | | 5 | 1 | | | |
| | TIM1 start/stop | 6 | 1 | set | | TIM rsp |
| | TIM2 start/stop | 7 | 1 | set | | TIM rsp |
| work reg2 | work reg2 | 7 to 0 | 8 | set | | — |

FIG. 21G

| original reg | control bit | pulse | trans.c | CPU soft | INT req | type | tms,tlm |
|---|---|---|---|---|---|---|---|
| BUS INT EI | TXD START EI | – | – | set | enable | | |
| | TXD END EI | – | – | set | enable | | |
| This reg. Is not | TXD FIFO NOT FULL EI | – | – | set | enable | | |
| Bit-Setable | TXD FIFO WRITE EI | – | – | set | enable | | |
| | RXD START EI | – | – | set | enable | | |
| | RXD END EI | – | – | set | enable | | |
| | RXD FIFO 8OVER EI | – | – | set | enable | | |
| test mask | test mask bit | | | | | | |
| | | pulse | – | – | – | M2 | |
| BUS MODE CO | MODE INTIAL | – | c→s | set | – | G | VGM |
| | TXD COM MOD | – | c→s | set | – | B | WRX |
| | COM RATE | – | init p | set | – | B | WRX |
| | RXD COM MOD | – | s→c | read | – | H | GRD |
| | test mode | – | init p | set | – | B | RSTMOD |

FIG. 21H

| original reg | control bit | pulse | trans.c | CPU soft | INT req | type | tms,tlm |
|---|---|---|---|---|---|---|---|
| TXD CON&STS | TXD START(master request) | — | c→s | set | — | D | GWR |
| | TXD ABORT | — | c→s | set | — | E | GWR |
| | SEQ I/O enable | — | s→c | read | — | H2 | GRD |
| | TXD BREAK CHAR | — | c→s | set | — | C | GWR |
| | TXD FIFO CLEAR | pulse | c→s | set | — | F | M3V |
| | TXD FIFO EMPTY | — | s→c | read | — | T | GRD |
| | TXD FIFO lastone | — | s→c | read | — | T | GRD |
| | TXD MONITOR | — | s→c | read | — | H | GRD |
| | | | | | | | |
| TXD STS | TXD CON FIELD ERROR | — | s→c | clear | — | J | GRD |
| | TXD DATA FIELD ERROR | — | s→c | clear | — | J | GRD |
| | TXD START REQ | — | s→c | clear | request | K | GRD |
| | TXD END REQ | — | s→c | clear | request | K | GRD |
| | TXD FIFO FULL | — | s→c | clear | — | T | GRD |
| | TXD FIFO LACK ABORT | — | s→c | clear | — | J | GRD |
| | TXD FIFO ILLEGAL ACCESS | pulse | s→c | clear | — | S | GRD |
| | TXD FIFO WRITE REQ | — | s→c | clear | request | K | GRD |

FIG. 21I

| original reg | control bit | pulse | trans.c | CPU soft | INT req | type | tms,t|m |
|---|---|---|---|---|---|---|---|
| RXD CON&STS | RXD ENABLE | – | c→s | set | – | A | GWR |
| | RXD ABORT | – | c→s | set | – | E | GWR |
| | RXD FIFO CLEAR | pulse | c→s | set | – | F | M3V |
| | RXD FIFO EMPTY | – | s→c | read | – | T | GWR |
| | RXD FIFO half | – | s→c | – | – | T | GRD |
| | RXD FIFO full | – | s→c | – | – | T | GRD |
| | RXD MONITOR | – | s→c | read | – | H | GRD |
| RXD STS | RXD CON FIELD READ END | – | s→c | read | – | H | GRD |
| | RXD CON FIELD OVERWRITE | – | s→c | clear | – | J | GRD |
| | RXD DATA FIELD ERROR | – | s→c | clear | – | J | GRD |
| | RXD START REQ | – | s→c | clear | request | K | GRD |
| | RXD END REQ | – | s→c | clear | request | K | GRD |
| | RXD FIFO OVERRUN | – | s→c | clear | – | J | GRD |
| | RXD FIFO ILLEGAL ACCESS | pulse | s→c | clear | – | S | GRD |
| | RXD FIFO 8OVER REQ | – | s→c | clear | request | K | GRD |

FIG. 21J

| original reg | control bit | pulse | trans.c | CPU soft | INT req | type | tms.t|m |
|---|---|---|---|---|---|---|---|
| filter clock select | | | | | | | |
| | | | | | | | |
| | | | | | | | |
| | | | | | | | |
| | | | | | | | |
| | | | | | | | |
| work reg1 | work reg1 | – | – | – | – | M3 | |
| | | | | | | | |
| TXD clock | TXD parity | (pulse) | – | – | – | N | |
| | TXD truck | – | – | – | – | M5 | |
| | TXD data enable | – | – | – | – | M | |
| | TXD shift trigger | pulse | – | – | – | L | |
| | TXD MSB/LSB first | – | – | – | – | M | |
| | TXD parity output enable | – | – | – | – | M | |
| | TXD last data | – | – | – | – | N2 | |
| | read TXD parameter | pulse | – | – | – | L | |

FIG. 21K

| original reg | control bit | pulse | trans.c | CPU soft | INT req | type | tms.tlm |
|---|---|---|---|---|---|---|---|
| RXD block | RXD parity | (pulse) | – | – | – | N | |
| | RXD direct read(busin)/DATA c | – | – | – | – | N | |
| | RXD data change | (pulse) | – | – | – | P | |
| | RXD shift trigger | pulse | – | – | – | L | |
| | RXD MSB/LSB first | pulse | – | – | – | M | |
| | RXD last data | – | – | – | – | N2 | |
| | write RXD paremeter | pulse | – | – | – | L | |
| SEQ Int req | TIM1 overflow req | – | – | – | – | R | |
| | TIM2 overflow req | – | – | – | – | R | |
| | RXD data fall req | – | – | – | – | R | |
| | RXD data rise req | – | – | – | – | R | |
| | TXD ABORT req | – | – | – | – | R | |
| | TXD BREAK CHAR req | – | – | – | – | R | |
| | RXD ABORT req | – | – | – | – | R | |

FIG. 21L

| original reg | control bit | pulse trans.c | CPU soft | INT req | type | tms,tlm |
|---|---|---|---|---|---|---|
| SEQ Int enable | TIM1 overflow enable | – | | – | M | |
| | TIM2 overflow enable | – | | – | M | |
| | RXD data fall enable | – | | – | M | |
| | RXD data rise enable | – | | – | M | |
| | TXD ABORT enable | – | | – | M | |
| | TXD BREAK CHAR enable | – | | – | M | |
| | RXD ABORT enable | – | | – | M | |
| | | | | | | |
| ALU flag | ALU zero | – | | – | Q | |
| | carry/borrow | – | | – | Q | |
| | | | | | | |
| | | | | | | |
| | TIM1 start/stop | BRK clear & RTB set this bit | | – | M | |
| | TIM2 start/stop | BRK clear & RTB set this bit | | – | M | |
| | | | | | | |
| work reg2 | work reg2 | – | – | – | M3 | |

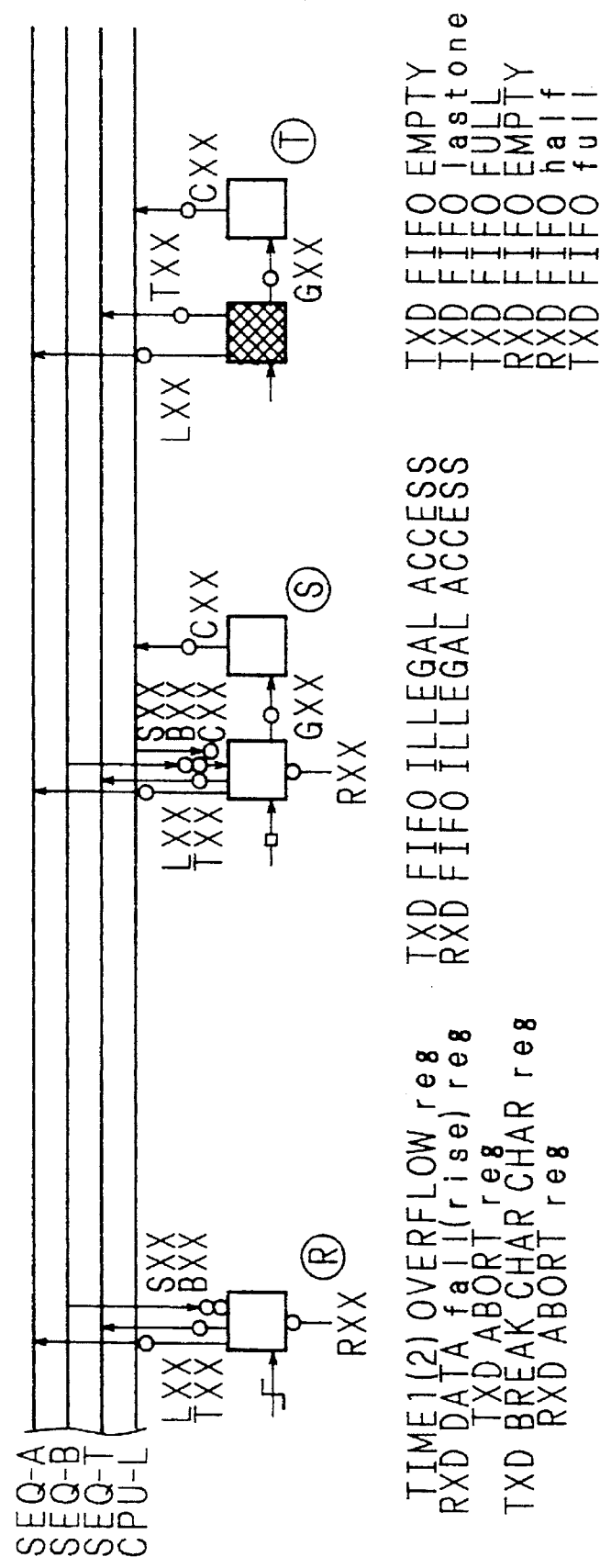

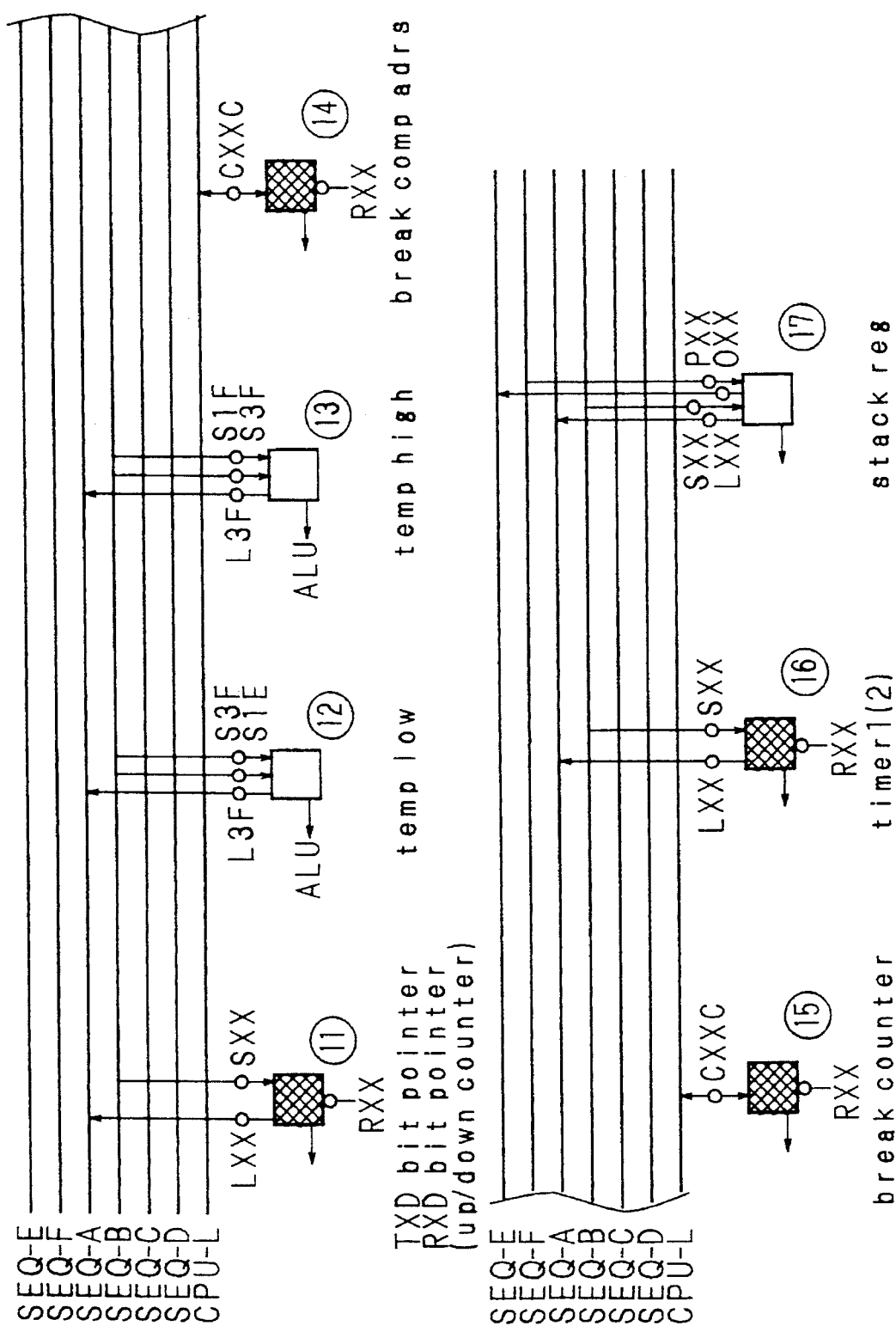

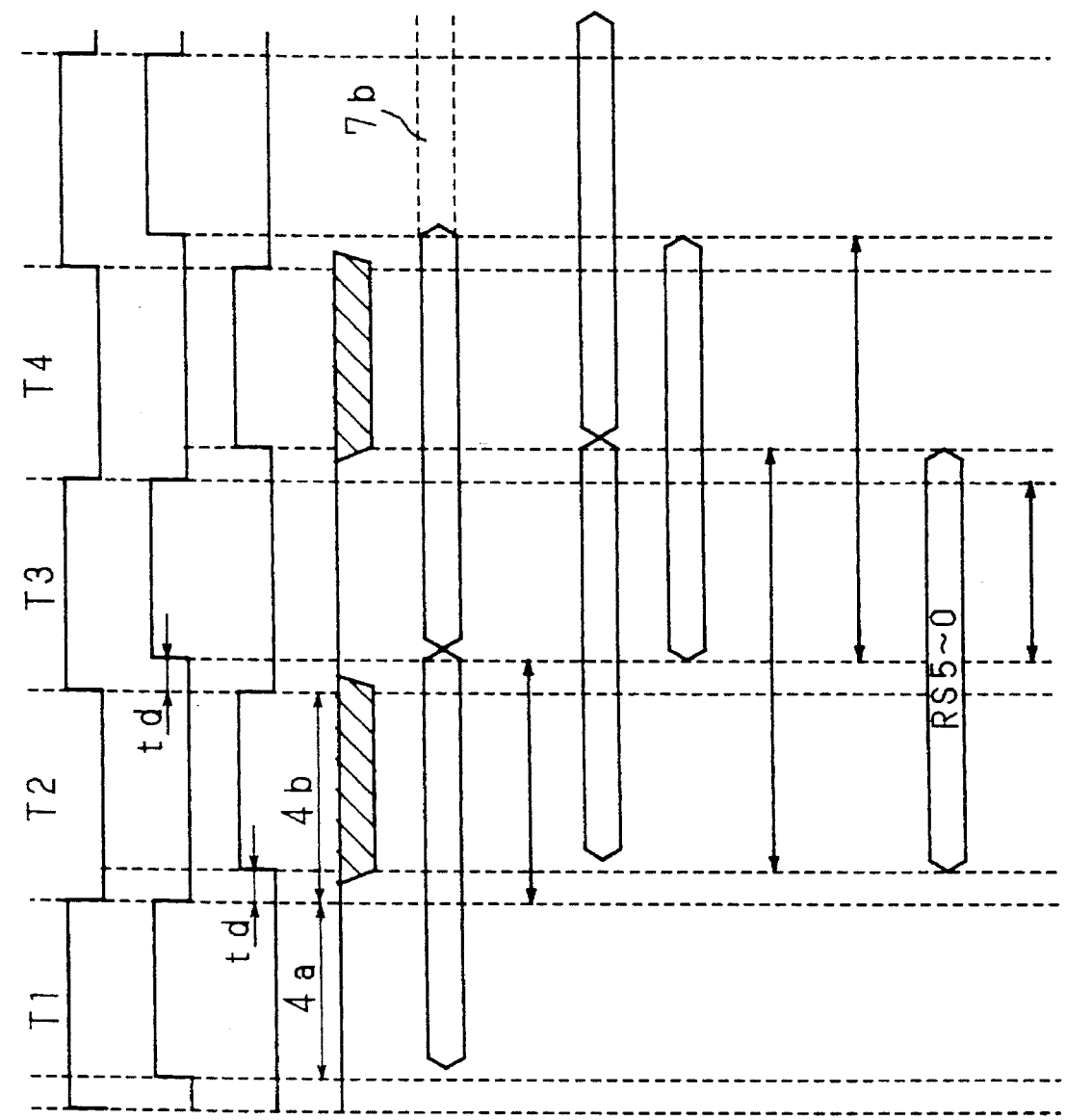

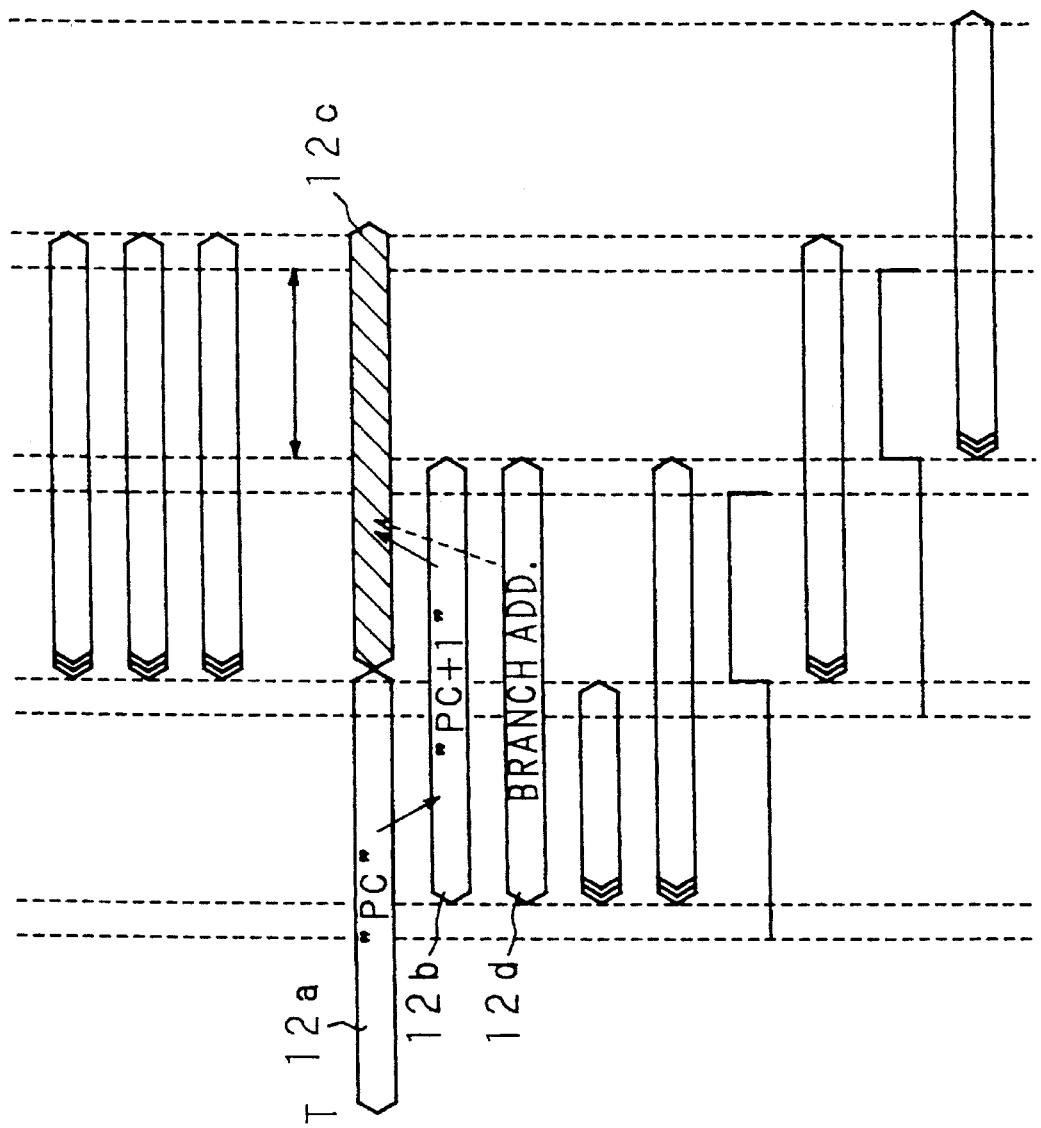

5,550,994

CONDITION DECISION CIRCUIT FOR A MICROCOMPUTER

BACKGROUND OF THE INVENTION

1. Field of the Invention

The present invention relates to a microcomputer, and particularly to a microcomputer, whereby execution of instructions by its CPU is sped up and a high speed operation is made possible at the time of processings such as resetting, interrupting and so on.

2. Description of the Related Art

FIG. 1 is a timing chart for explaining an example of basic instruction cycles, that is, a timing for executing a basic instruction of a conventional microcomputer.

In this conventional example, an input clock frequency is 40 MHz, in other words, a 25 ns cycle, and two basic clocks BCLK 1 and BCLK 2, obtained by further dividing the cycle into two to shift the phases of them, are used. A basic cycle for accessing a memory connected to the microcomputer corresponds to 100 ns which is two cycles of the basic clock (a machine cycle). Thus, an address signal (A) is that, a 100 ns period is basically treated as one cycle. In a read cycle shown in a left half side of FIG. 1, a data signal D becomes significant at 50 ns of a first half of the one basic cycle. In a write cycle shown in a right half side of FIG. 1, the data signal D is outputted from a CPU at 75 ns of the first half.

In general, basically a program memory is read by the same operation as the example shown in FIG. 1, and an instruction fetch is executed at a time (100 ns) of 4 cycles when based on the input clock.

FIG. 2 is a schematic view for explaining a principle of pipeline processing adopted in many microcomputers in recent years.

Based on the one machine cycle, processings in respective stages of an instruction fetch (IF), an instruction decoding (ID), an instruction execution and effective address calculation (EX), a memory access (MEM) and a write back (WB) are executed sequentially. Since instruction decodings are executed successively for every cycle, and continuously the instructions are processed respectively in parallel in respective stages, five instructions seem to be processed simultaneously in parallel as a whole. By such pipeline processing, complicated processings seem to be executed as if at one instruction per one machine cycle.

FIG. 3 is a schematic view showing an example of notes to be taken in the pipeline processings as described above. Specifically, mechanisms required when executing an instruction string consisting of the instructions ADD, SUB, AND, OR and XOR as shown in FIG. 3 are shown.

In FIG. 3, a symbol R immediately after each instruction specifies a destination register, and two Rs thereafter specify source registers holding operands.

That is, though the add instruction (ADD) which is a first instruction adds contents of a register R2 and a register R3 and stores (writes back) the result in a register R1, since a value stored in the register R1 is used in the second to fourth instructions, in respective execution cycles, before the result of the addition by the first add instruction is stored in the register R1, a bypass circuit which makes it usable is required in the CPU. And in the XOR instruction which is a fifth instruction, a value which is usually written back to the register R1 can be used finally.

As described above, in the conventional microcomputer, the one machine cycle itself is constituted by a plurality of clocks, causing a substantially long instruction execution cycle. This is a method employed for enhancing reliability in response to some problems on a board design such as a delay time, breaking of bus lines and so on in the board computer age.

Though the pipeline processing is a very effective designing method for executing the complicated instruction rapidly, as is also shown in the above-mentioned example, since particular circuits corresponding to some exceptional processings must be added, complicated circuits result.

Also, the CPU in the conventional microcomputer requires several cycles for processing the instruction fetch, decoding and execution, restricting improvement of the execution speed. However, since there is a limit to increase a clock frequency, it is necessary to consider how many processings can be executed in one cycle.

Furth rmore, in a highly functional microcomputer, though a method of executing a plurality of instructions in one cycle to enhance the processing capability such as a super scaler technique and the like is adopted at present, in a field of cost oriented micro-controller, a product having a high processing speed and a simple configuration leading to cost cut of chips is greatly desired. Particularly, in a real-time control field in which a response speed of several µs is required as represented by an applicable field of motor control and the like, a simple and high-speed CPU is wanted rather than a CISC configuration including complex highly functional instructions.

SUMMARY OF THE INVENTION

The present invention has been devised to solve such problems, therefore, it is an object thereof to provide a microcomputer capable of executing instructions for every input clock cycle by simplifying the processing itself.

A microcomputer of the invention includes, a condition decision circuit, in which a signal output indicating whether or not the branch condition is satisfied is always active by taking out only a necessary bit by a mask register value, after comparing a register value specified by a software beforehand and a compare register value for every bit, with respect to the configuration for executing the conditional branch instruction.

In the microcomputer of the invention, specifying of the register to be compared and the bits being compared and discrimination of the high level/low level can be performed by one instruction. A circuit configuration of a decision register, circuit configurations of a mask data register and a compared data register and an instruction execution sequence necessary for this purpose are also provided.

In the microcomputer of the invention, status bits for finding out various states such as a timer overflow, interruption from an external terminal input and a status flag of FIFO are allocated to realize the configuration capable of deciding the state instantaneously without the operational decision via the ALU.

The microcomputer of the invention includes, means for synchronizing with the basic instruction timing at the time of realizing the condition decision circuit.

In the microcomputer of the invention, an unconditional branch is executed by inputting a 1-bit control code in the instruction operation code to the condition decision circuit directly from the operation code latch, at the time of realizing the condition decision circuit.

In the microcomputer of the invention, the conditional branch instruction is executed in a state where decision of the branch condition has been already obtained at the time of executing the branch instruction. Specifically, the branch condition has been already decided in the period T2, and the actual branch is executed in the later period T3 by outputting the new address. The branch destination address operation can be executed by, simply drawing itself out from the instruction code, or shifting a specific register value to the program counter during the period T3, or providing an exclusive address operation circuit in the program counter and operating an operand value included in the instruction code directly to calculate a relative address.

In the microcomputer of the invention, the instruction for executing the conditional branch more effectively by a minimum necessary instruction without sparing an unnecessary time during the preparation in using the branch instruction is supported.

In the microcomputer of the invention, since a status register and the like in the functional block can be used directly as a condition decision target of the conditional branch, when necessary, by specifying a specific bit beforehand, the bit state is monitored in respective cycles and when there is any change in the state, it is recognized immediately and it becomes possible to branch to a new routine.

In the microcomputer of the invention, a circuit for executing the above-mentioned conditional branch instruction is realized effectively.

The above and further objects and features of the invention will more fully be apparent from the following detailed description with accompanying drawings.

BRIEF DESCRIPTION OF THE DRAWINGS

FIG. 2 is a schematic view for explaining a principle of pipeline processing generally effected in a recent microcomputer, FIG. 14 is a table showing exclusive codes in a first embodiment of a microcomputer according to the present invention, FIG. 15A is a portion of table showing control signals for every instruction in a first embodiment of a microcomputer according to the present invention, FIG. 15B is a portion of table showing control signals for every instruction in a first embodiment of a microcomputer according to tile present invention, FIG. 15C is a portion of table showing control signals for every instruction in a first embodiment of a microcomputer according to the present invention, FIG. 15D is a portion of table showing control signals for every instruction in a first embodiment of a microcomputer according to the present invention, FIG. 15E is a portion of table showing control signals for every instruction in a first embodiment of a microcomputer according to the present invention, FIG. 15F is a portion of table showing control signals for every instruction in a first embodiment of a microcomputer according to the present invention, FIG. 15G is a portion of table showing control signals for every instruction in a first embodiment of a microcomputer according to the present invention, FIG. 15H is a portion of table showing control signals for every instruction in a first embodiment of a microcomputer according to the present invention, FIG. 15I is a portion of table showing control signals for every instruction in a first embodiment of a microcomputer according to the present invention, FIG. 15J is a portion of table showing control signals for every instruction in a first embodiment of a microcomputer according to the present invention, FIG. 15K is a portion of table showing control signals for every instruction in a first embodiment of a microcomputer according to the present invention, FIG. 15L is a portion of table showing control signals for every instruction in a first embodiment of a microcomputer according to the present invention, FIG. 15M is a portion of table showing control signals for every instruction in a first embodiment of a microcomputer according to the present invention, FIG. 15N is a portion of table showing control signals for every instruction in a first embodiment of a microcomputer according to the present invention, FIG. 15O is a portion of table showing control signals for every instruction in a first embodiment of a microcomputer according to the present invention, FIG. 15P is a portion of table showing control signals for every instruction in a first embodiment of a microcomputer according to the present invention, FIG. 16 is a table showing control signals for every instruction in a first embodiment of a microcomputer according to the present invention, FIG. 17A is a portion of table explaining the content of each instruction of a first embodiment of a microcomputer according to the present invention, FIG. 17B is a portion of table explaining the content of each instruction of a first embodiment of a microcomputer according to the present invention, FIG. 17C is a portion of table explaining the content of each instruction of a first embodiment of a microcomputer according to the present invention, FIG. 17D is a portion of table explaining the content of each instruction of a first embodiment of a microcomputer according to the present invention, FIG. 17E is a portion of table explaining the content of each instruction of a first embodiment of a microcomputer according to the present invention, FIG. 18 is a view explaining the content of each instruction of a first embodiment of a microcomputer according to the present invention, FIG. 19 is a block diagram showing an example of configuration including a condition decision circuit as another embodiment of a first embodiment of a microcomputer of the present invention, FIG. 20A is a portion of table showing a register set of a first embodiment of a microcomputer according to the present invention, FIG. 20B is a portion of table showing a register set of a first embodiment of a microcomputer according to the present invention, FIG. 20C is a portion of table showing a register set of a first embodiment of a microcomputer according to the present invention, FIG. 20D is a portion of table showing a register set of a first embodiment of a microcomputer according to the present invention, FIG. 20E is a portion of table showing a register set of a first embodiment of a microcomputer according to the present invention, FIG. 20F is a portion of table showing a register set of a first embodiment of a microcomputer according to the present invention, FIG. 21A is a portion of table showing each function for every bit of each register of a first embodiment of a microcomputer according to the present invention, FIG. 21B is a portion of table showing each function for every bit of each register of a first embodiment of a microcomputer according to the present invention, FIG. 21C is a portion of table showing each function for every bit of each register of a first embodiment of a microcomputer according to the present invention, FIG. 21D is a portion of table showing each function for every bit of each register of a first embodiment of a microcomputer according to the present invention, FIG. 21E is a portion of table showing each function for every bit of each register of a first embodiment of a microcomputer according to the present invention, FIG. 21F is a portion of table showing each function for every bit of each register of a first embodiment of a microcomputer according to the present invention, FIG. 21G is a portion of table showing each function for every bit of each register of a first embodiment of a microcomputer according to the present invention, FIG. 21H is a portion of table showing each function for every bit of each register of a first embodiment of a microcomputer according to the present invention, FIG. 21I is a portion of table showing each function for every bit of each register of a first embodiment of a microcomputer according to the present invention, FIG. 21J is a portion of table showing each function for every bit of each register of a first embodiment of a microcomputer according to the present invention, FIG. 21K is a portion of table showing each function for every bit of each register of a first embodiment of a microcomputer according to the present invention, FIG. 21L is a portion of table showing each function for every bit of each register of a first embodiment, of a microcomputer according to the present invention, FIG. 26D is a schematic view showing an example of cell functions of various control bits for facilitating ASIC expansion as still another embodiment of a first embodiment of a microcomputer according to the present invention, FIG. 27B is a schematic view showing an example of cell functions of various control bits for facilitating ASIC expansion as still another embodiment of a first embodiment of a microcomputer according to the present invention, FIG. 31A is a portion of timing chart showing a basic cycle of an instruction execution sequence of a CPU of a second embodiment of a microcomputer according to the present invention, FIG. 31B is a portion of timing chart showing a basic cycle of an instruction execution sequence of a CPU of a second embodiment of a microcomputer according to the present invention.

DESCRIPTION OF THE PREFERRED EMBODIMENTS

In the following, the present invention is particularly described on the basis of the drawings showing its embodiments.

Figure 1:
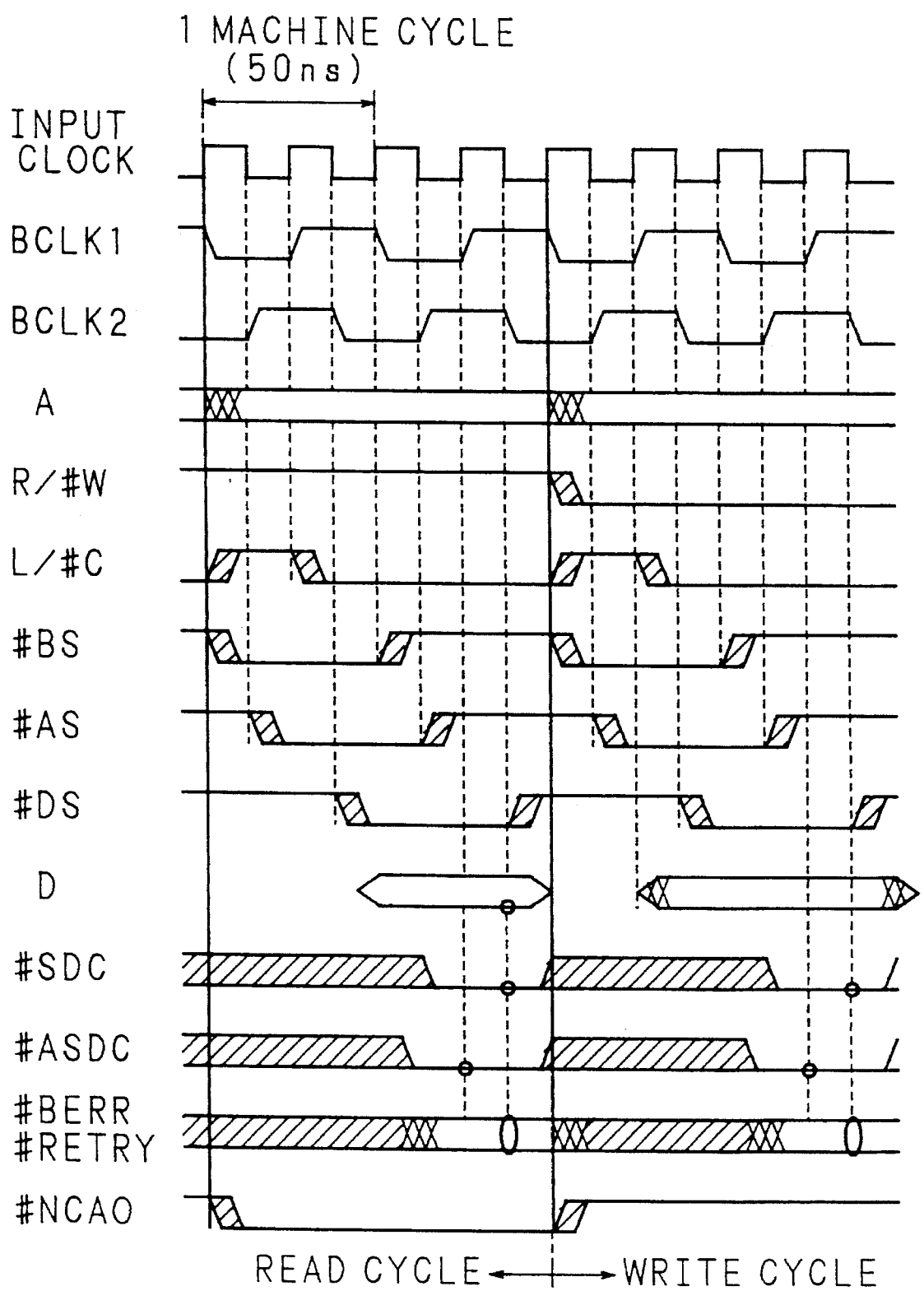
FIG. 1 is a timing chart for explaining a basic instruction cycle of a conventional microcomputer.
Figure 3:
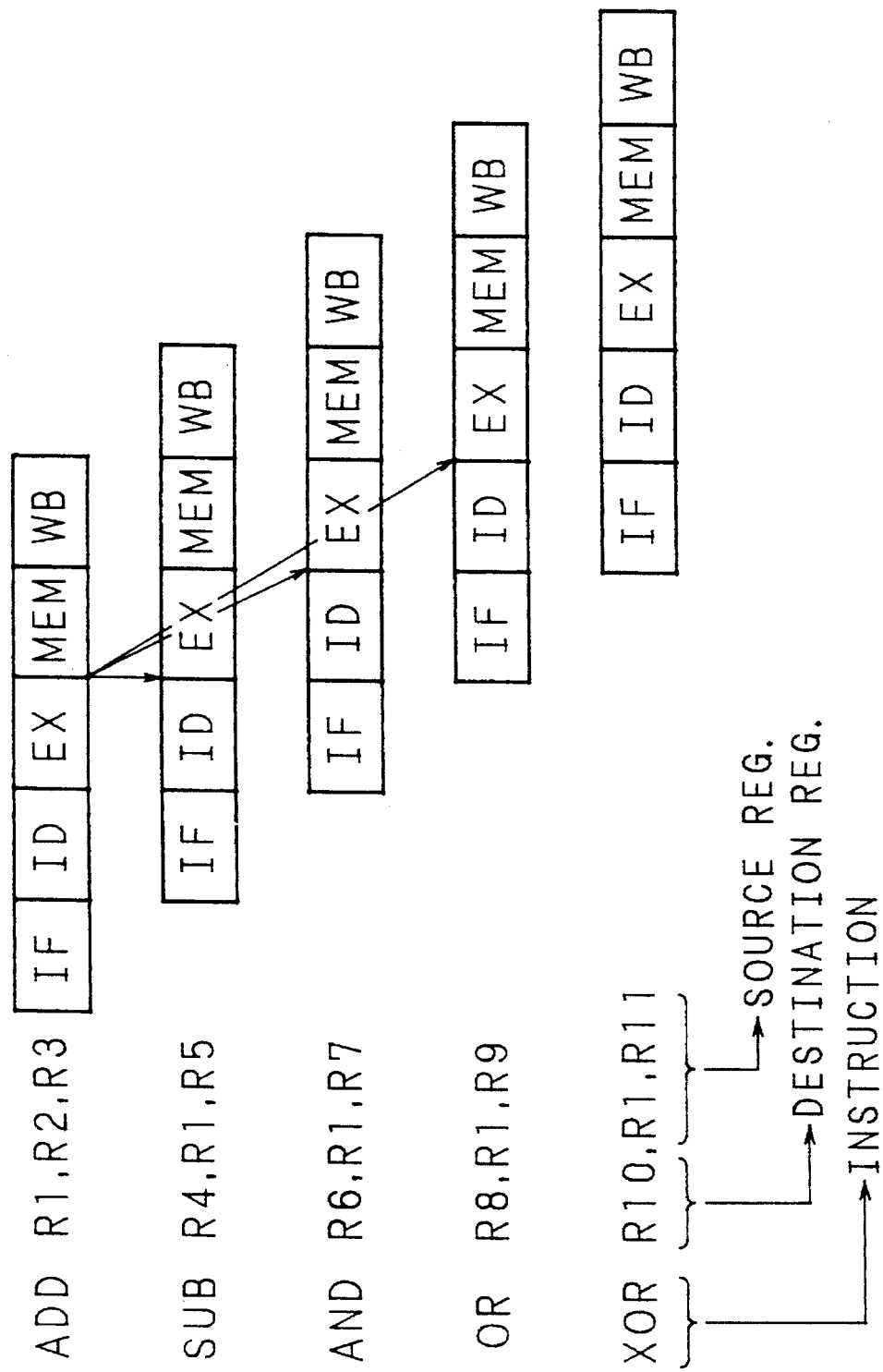
FIG. 3 is a schematic view showing notes to be taken in the pipeline processing.
Figure 4:
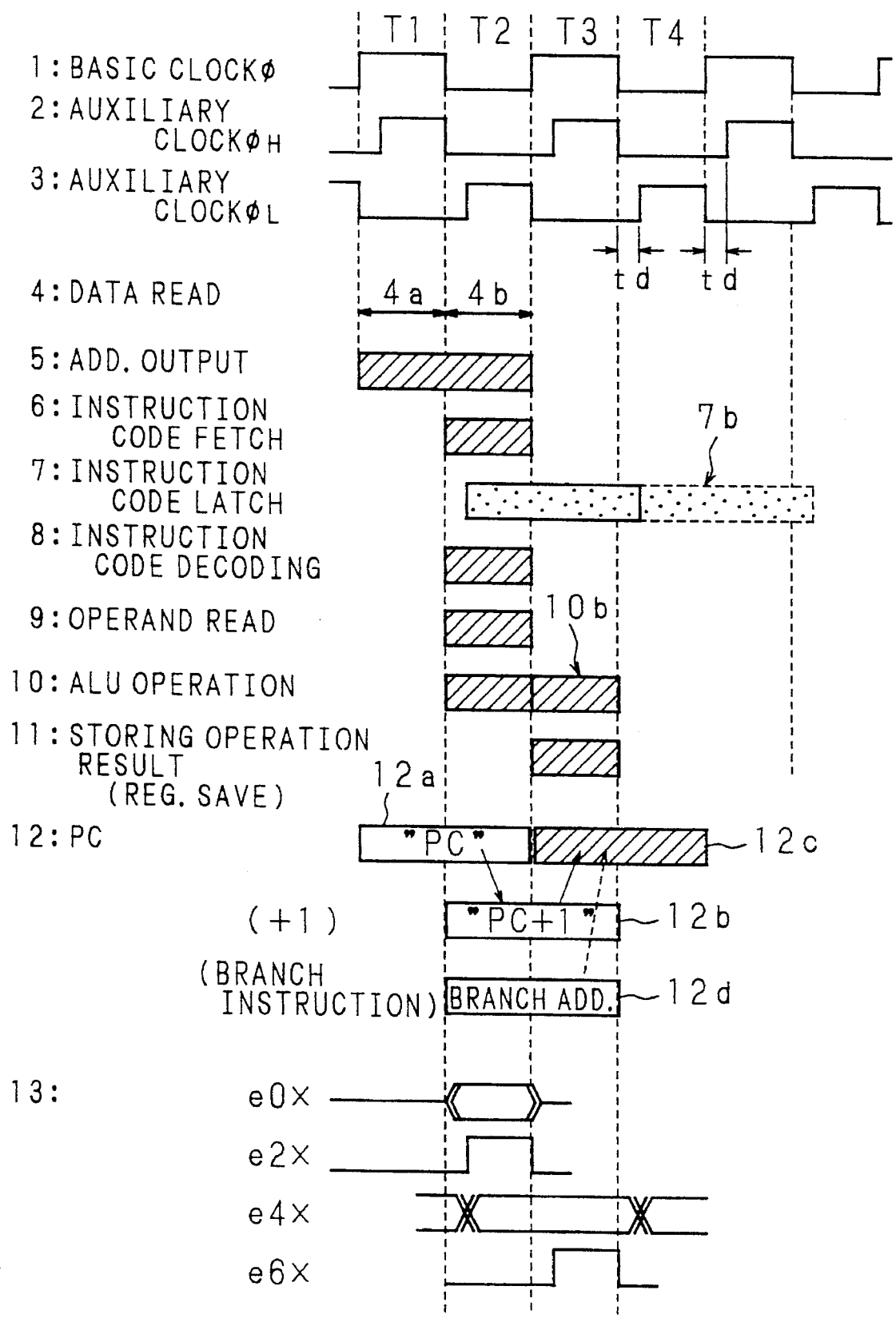
FIG. 4 is a timing chart showing a basic cycle of an instruction execution sequence of a CPU of a first embodiment of a microcomputer of the present invention.

FIG. 4 is a timing chart showing a basic cycle of an instruction execution sequence by a CPU of a first embodiment of a microcomputer according to the present invention.

Figure 5:
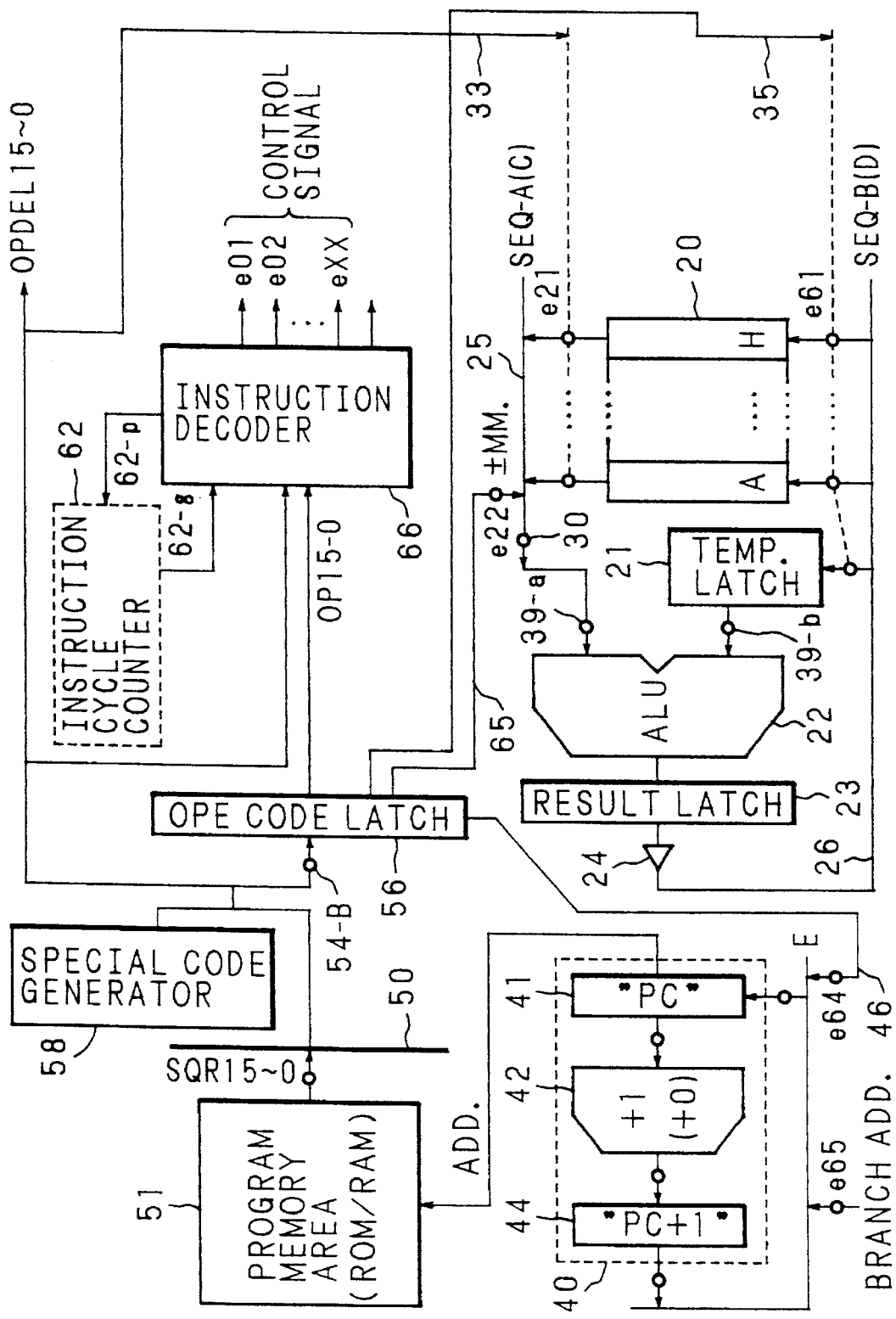
FIG. 5 is a block diagram showing an example of specific configuration of a first embodiment of a microcomputer according to the present invention.

In the following, the instruction execution sequence of the first embodiment of the microcomputer of the present invention is described in order with reference to a block diagram of FIG. 5 showing an example of specific configuration of the CPU.

In FIG. 4, numeral 1 designates a waveform of a basic clock φ. In the aforementioned conventional example, though a clock generated by an oscillator built in the microcomputer is divided into two for use as the basic cock φ, in the microcomputer of the present invention, the clock itself generated by the built-in oscillator is used. Specifically, for example, when an oscillation frequency of the built-in oscillator is 6 MHz, a cycle of the basic clock φ is 167 ns.

A high-level section of a first cycle in the two cycles of the basic clock φ is designated as a period T1, a low-level section thereof as a period T2, a high-level section of a second cycle as a period T3 and a low-level section thereof as a period T4.

Numeral 2 designates a waveform of a first auxiliary clock φH. The auxiliary clock φH is that, in the periods T1 and T3 which are the high-level (hereinafter, referred to as "H") sections of the basic clock φ, the timing is set such that, a rising delays by a time "td" from that of the basic clock φ, and a falling synchronizes with that of the basic clock φ.

Similarly, numeral 3 designates a waveform of a second auxiliary clock φL. The auxiliary clock φL is that, in the periods T2 and T4 which are the low-level (hereinafter referred to as "L") sections of the basic clock φ, the timing is set such that, the rising delays by the time td from the falling of the basic clock φ, and the falling synchronizes with the rising of the basic clock φ.

The auxiliary clocks φH, φL play important role to prevent racing as to be described later.

Numeral 4 designates a timing of reading data from a program memory area 51 such as a ROM or RAM, EPROM, EEPROM and so on. Specifically, bit lines of the program memory area 51 are pre-charged at a timing in the period T1 designated by numeral 4a, and target data is taken out at a timing in the period T2 designated by numeral 4b. However, since the read out timing delays after all when reading data in the period T2, there is a period where the data is not defined for certain time from the falling of the basic clock φ in the period T2. For compensating this, the aforementioned delay time td is set in the auxiliary clocks φH and φL so that control signal is not outputted by mistake in the uncertain period of data in a control signal generating circuit of the CPU to be described later. The undefined period of data is usually 15 to 30 ns.

Numeral 5 designates a timing of outputting address during execution of the program, which extends over the periods T1, T2. In case of accessing data in the program memory area 51 of a memory, the address is outputted at this timing. Though the access address is generated and outputted by a program counter 40, its specific timing is designated by numeral 12.

Numeral 6 designates a timing of reading a program (instruction) code stored in the address designated by the timing 5 from the program memory area 51, and transferring it to the CPU (fetched by the CPU). Simultaneously with the instruction code fetched by the CPU, it is decoded in an instruction decoder 66 at a timing designated by numeral 8.

The code is read out from the program memory area 51 and decoded only in the half-cycle period T2 of the basic clock φ. The code read out from the program memory area 51 is latched in an operation code latch 56 at a timing designated by numeral 7. With respect to the instruction which requires the execution time of two cycles or more of the basic clock φ, as designated by numeral 7b, the instruction code is continuously latched in the operation code latch 56 until the instruction has been executed.

Numeral 9 designates a read out timing from a source register holding an operand. That is, the operand handled by the instruction decoded in a above-mentioned manner is read out from the source register holding it in a register set 20, and loaded to an ALU 22.

Numeral 10 designates an operation timing by the ALU 22. That is, operation for the operand loaded to the ALU 22 from the source register at the above-mentioned timing 9 is executed by the ALU 22, and the result is stored in a result latch 23 at a timing 10.

Finally, at a timing of the period T3 designated by numeral 11, the operation result by the ALU 22 is stored in a target register (register saving) in the register set 20 to complete a series of instruction executions.

Numeral 12 designates an operation timing of the program counter 40. Though described particularly later, the program counter 40 is constituted by, a latch 41 which holds a count value PC and outputs it to the program memory area 51 through the address bus and incrementer 42 which increments the PC value by "+1" at a time and a register 44 which holds the PC value incremented by the incrementer 42 so as to be latched by the latch 41.

Assuming that the PC value of the program counter 40 at a timing 12a extending over the periods T1, T2 is "PC", it is incremented to "PC+1" at a timing extending over the half-cycle delayed periods T2, T3 in the incrementer 42. By storing this new incremented PC value "PC+1" again in the latch 41 of the program counter 40 at a timing 12c extending over the periods T3, T4, the "PC+1" value proceeded by one address is outputted to the address bus as a value of the program counter 40. At the time of executing the branch instruction, a new branch destination address is operated at a timing 12d which is the same period as the timing 12b, and stored in the latch 41 of the program counter at the timing 12c.

Numeral 13 designates a basic timing of a control signal group generated by decoding the instruction code by the instruction decoder 68 of the microcomputer of the present invention, and roughly divided into five kinds.

A group of signals of e0X is the control signals which are outputted directly from a static combination circuit in the instruction decoder 66, simultaneously with fetching the instruction.

A group of signals e2X is the control signals which form the timing of the signal e0X at the timing of the auxiliary clock φL, for example, a register load control signal is this example.

A group of signals e4X are the control signals generated directly in the static combination circuit in the instruction decoder 66 from the instruction code latched at the timing 7, and a signal e6X is the control signal which forms the timing of the signal e4X at the timing of the auxiliary clock φH.

Basically, though the CPU is controlled by the combination of the above four kinds of timings, an exceptional timing signal is partly used additionally.

Figure 6:
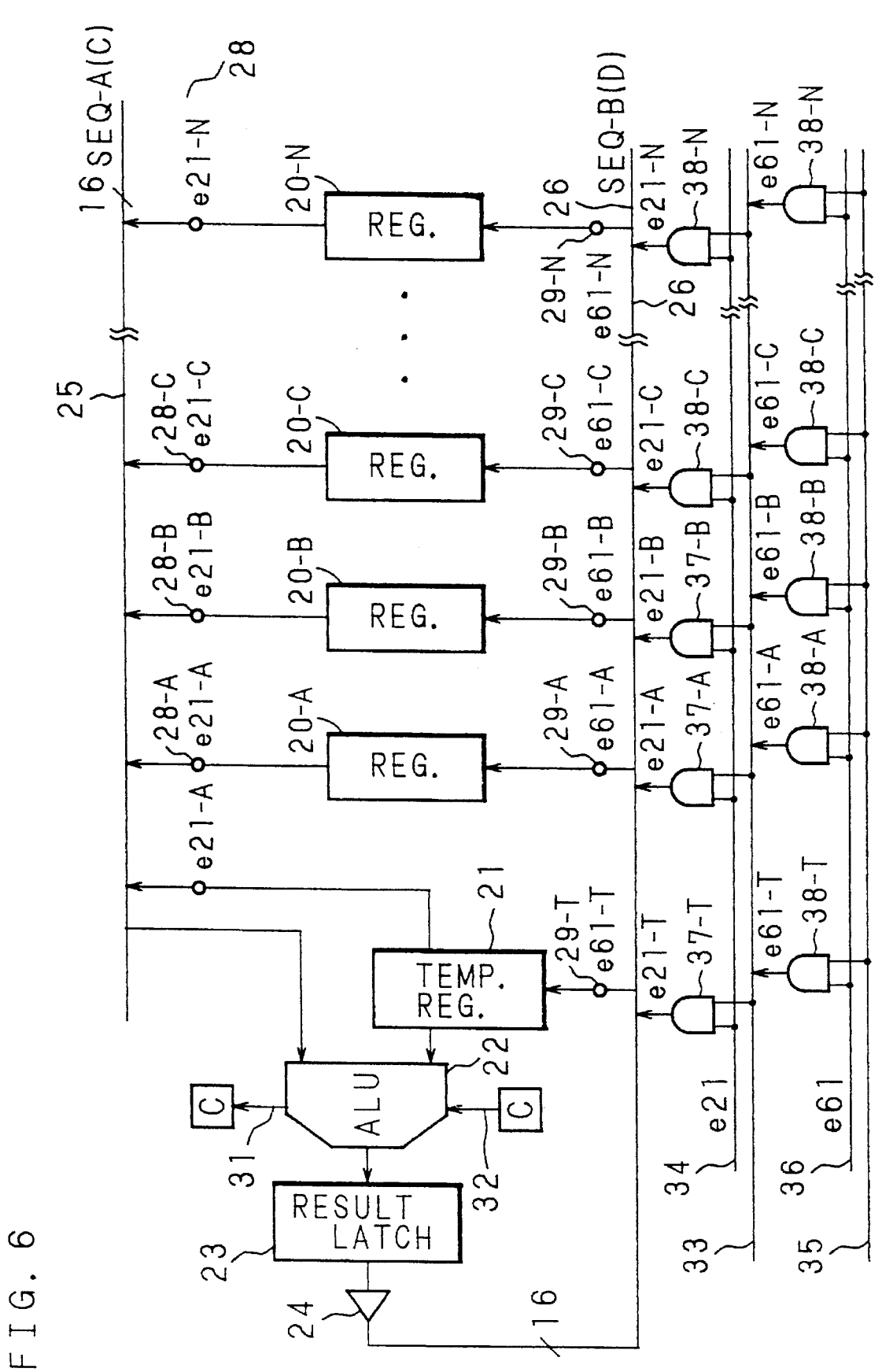
FIG. 6 is a block diagram showing an example of configuration of a register bus of a CPU of a first embodiment of a microcomputer according to the present invention.

FIG. 6 is a block diagram showing a configuration of register buses and registers 20-A, 20-B . . . 20-N, ALU 22 and so on connected thereto of a CPU of a first embodiment of the microcomputer of the present invention.

In FIG. 6, numerals 20-A, 20-B . . . 20-N designate internal register of the CPU, which constitute a register set 20 as a whole. Register addre s buses A, B . . . N are allocated to the registers 20-A, 20-B . . . 20-N respectively. The registers 20-A, 20-B . . . 20-N are connected to a reading register bus SEQ-A (C) 25 via switches 28-A, 28-B . . . 28-N.

The switches 28-A, 28-B . . . 28-N are respectively controlled by control signals e21-A, e21-B . . . e21-N. The signals e21-A, e21-B . . . e21-N are obtained by decoding a 5-bit source register speci ying signal 33 which specifies the source register and a register read control timing signal e21 designated by numeral 34 respectively by decoding circuits 37-A, 37-B . . . 37-N.

Numeral 21 designates a temporary register, one output of which is connected directly to an input of the ALU 22, and another output thereof is connected to the register bus SEQ-A (C) 25 as same as the other registers.

The ALU 22 executes the numerical ope ation, logical operation, shift operation and so on using data sent from the register bus SEQ-A (C) 25 and a value held in the temporary register 21 as operands. The operation result by the ALU 22 is held in a result latch 23 and drives the register bus SEQ-B (D) 28 via a bus buffer 24.

Figure 7:
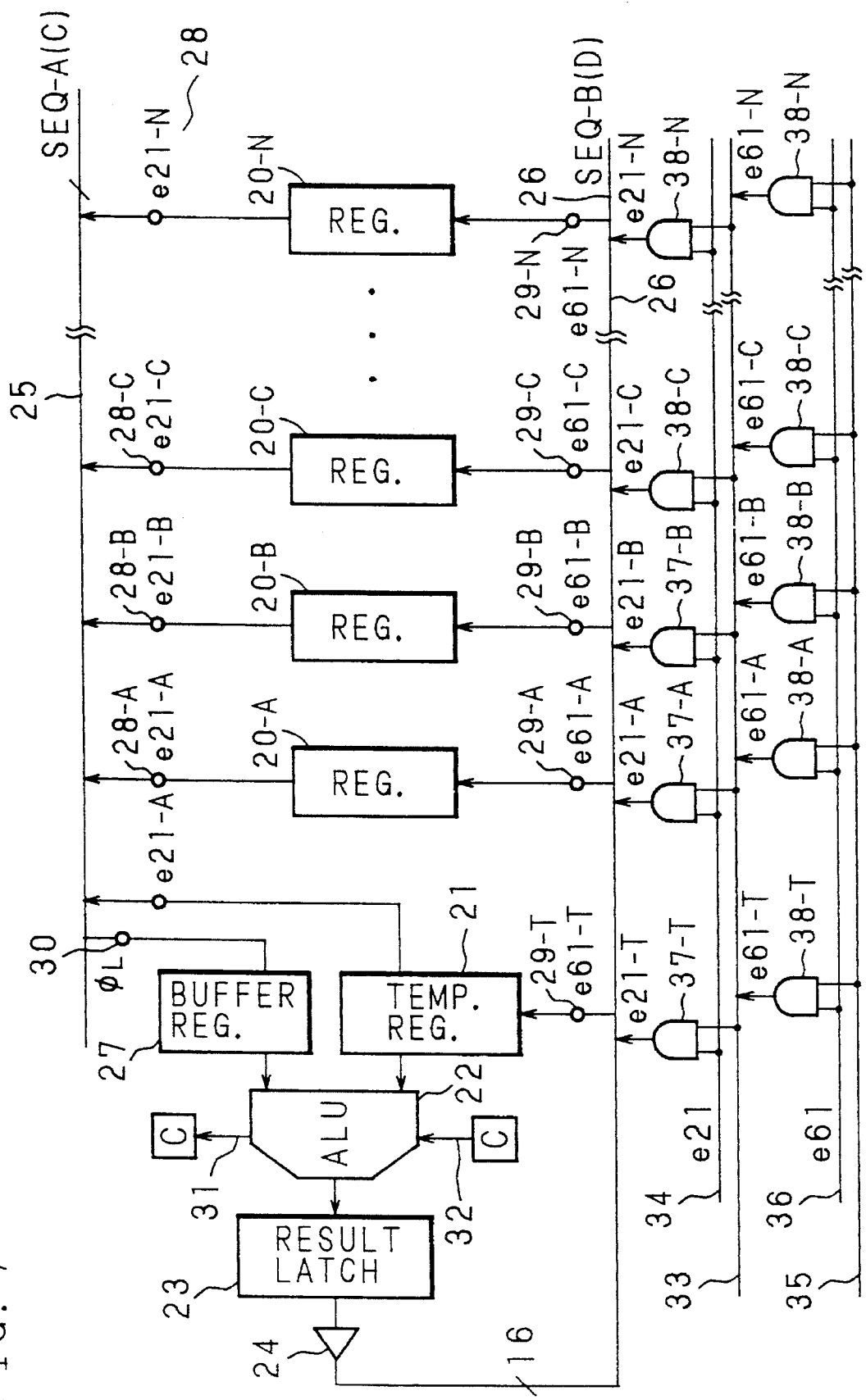
FIG. 7 is a block diagram showing an example of another configuration of a register of a CPU of a first embodiment of a microcomputer according to the present invention.

Now, as a modified example of the embodiment shown in FIG. 6, a configuration of the invention according to claim 13 shown in FIG. 7 is available. That is, a configuration including a buffer reg ster 27 which holds data read out from the register bus SEQ-A (C) 25 temporarily is also available. In case of adopting such a configuration, a sufficient timing design described in the timing 10b shown in FIG. 4 is possible. In FIG. 7, data inputted to the buffer register 27 is controlled by a switch 80 which is turned on when the auxiliary clock φL is in a high level.

In such a configuration including a latch circuit which holds the value read out from the register before supplying to the ALU 22, since the operation by the ALU 22 is executed over one cycle of the periods T2 and T3 as shown by numeral 10b, an execution speed margin of the ALU 22 is gained. In any case, the operation result by the ALU 22 is held in the result latch 23 over the periods T2, T3 to drive the register bus SEQ-B (D) 26 on the writing side.

In the original embodiment shown in FIG. 6, however, the buffer register 27 and the control switch 30 do not exist, and the register bus SEQ-A (C) 25 is connected directly to the input of the ALU 22. Also, a carry is inputted to the ALU 22 via a path 32, and a carry output is stored in a carry bit via a path 31.

The register bus SEQ-B (D) 26 serves to return the operation result of the ALU 22 to the register, and is connected to the registers 20-A, 20-B . . . 20-N via switches 29-A, 29-B . . . 29-N for storing data in the registers, and to the temporary register 21 via a switch 29-T. The switches 29-A, 29-B . . . 29-N and 29-T are controlled by control signals e61-A, e61-B . . . e61-N and 29-T. The control signals e61-A, e61-B . . . e61-N and 29-T are obtained by decoding a 5-bit destination register specifying signal 35 which specifies a destination register, and a register write control timing signal e61 designated by numeral 36 by decoding circuits 38-A, 38-B . . . 38-N.

The above-mentioned switches are shown by marks ○ in FIG. 6 and FIG. 7, and are turned on and off by the signals indicated nearby. As a specific method of realizing these switches, for example, the method of constituting by a transmission gate, and the method of combining two N-channel transistors into which a control signal is inputted from two signal lines, TRUE and BAR, are available.

Figure 8:
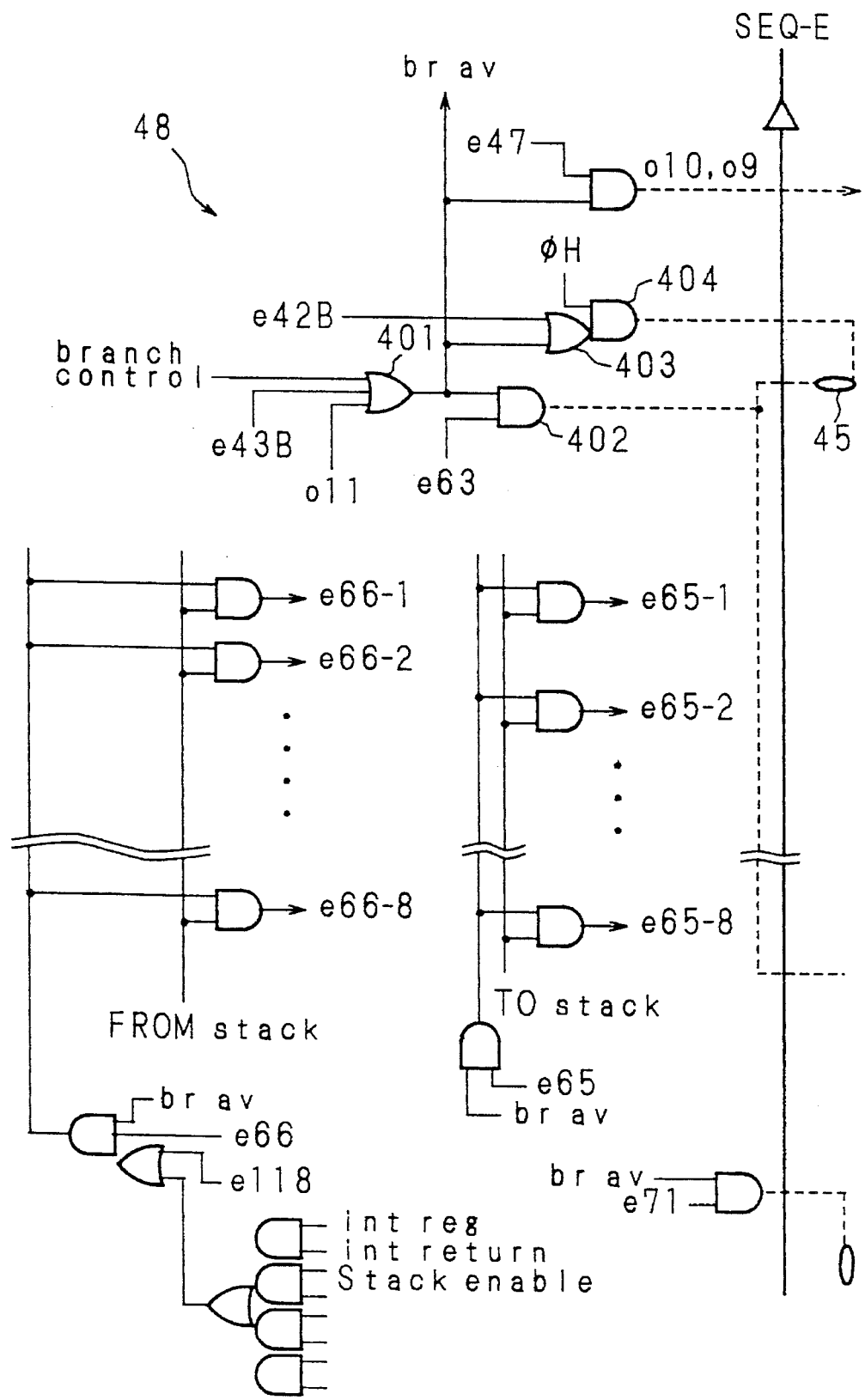
FIG. 8 is a block diagram showing mainly a configuration of a main body in a program counter configuration of a first embodiment of a microcomputer according to the present invention.
Figure 9:
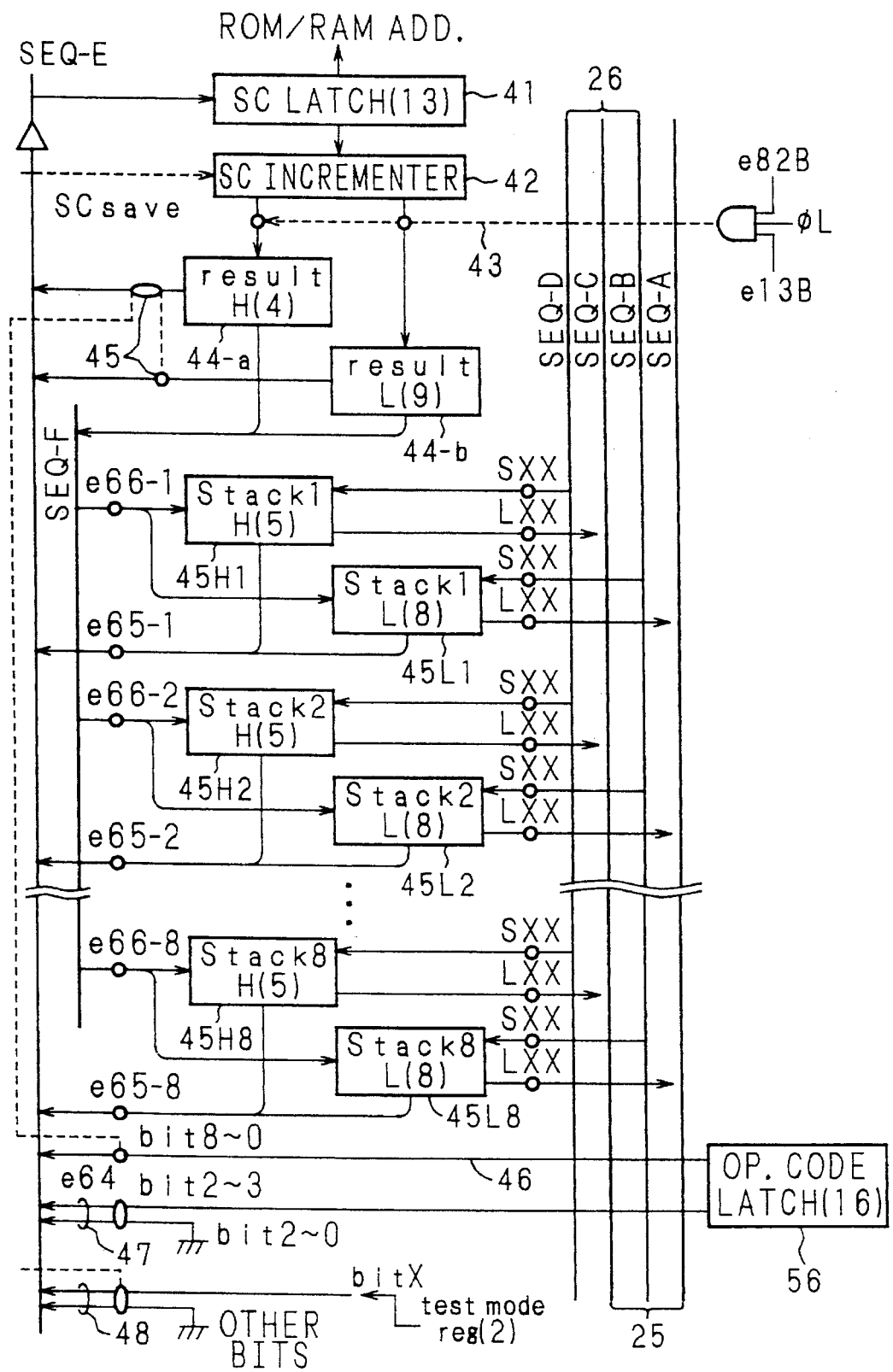
FIG. 9 is a block diagram showing mainly a configuration of a control circuit in a program counter configuration of a first embodiment of a microcomputer according to the present invention.

FIG. 8 and FIG. 9 are block diagrams showing a configuration of a program counter of a first embodiment of a microcomputer of the present invention. FIG. 8 mainly shows the configuration of a main body of the program counter, and FIG. 9 mainly shows the configuration of a control circuit.

In FIG. 9, numeral 41 designates a 13-bit SC latch which holds a count value (PC value) of the program counter. The SC latch 41 outputs address signals of a ROM and a RAM via an address bus buffer.

Numeral 42 designates an incrementer (SC incrementer) of the program counter. The SC incrementer 42 increments a value of the SC latch 41 by "+1" when an increment control input 43 is "H", and supplies the higher 4 bits of the result to a result H register 44-a, and the lower 9 bits to a result L register 44-b. A result register 44 is constituted by the result H register 44-a and result L register 44-b.

Usually, outputs of the registers 44-a and 44-b are supplied to an SEQ-E bus which is a register bus in an address operation block via the switch 45, and are constituted so as to set a new value in the SC latch 41. A control signal which controls the on/off timing of the switch 45 is an SC save signal.

While, outputs of the result H register 44-a and result L register 44-b are also connected to an SEQ-F bus to form a path for storing an execution source address in a stack register to be described hereinbelow, when interruption or subroutine call occurs.

In the following description, a characteristic configuration of the microcomputer of the present invention is shown.

In the figure, symbols 45H1, 45H2 . . . 45H8 designate 5-bit higher stacks, and symbols 45L1, 45L2 . . . 45L8 designate 8-bit lower stacks. These stacks constitute each one stack register by the higher stack 45H1 and the lower stack 45L1, by the higher stack 45H2 and the lower stack 45L2 . . . and by the higher stack 45H8 and the lower stack 45L8.

The higher stacks 45H1, 45H2 . . . 45H8 have, as input paths, both a path fetching data from the aforementioned SEQ-F bus and a path fetching the operation result of the ALU 22 via the SEQ-D bus. The lower stacks 45L1, 45L2 . . . 45L8 have, as input paths, both a path fetching data from the aforementioned SEQ-F bus, and a path fetching the operation result of the ALU 22 via the SEQ-B bus.

Furthermore, as output paths of the higher stacks 45H1, 45H2 . . . 45H8, there are a path connected to the SEQ-E bus supplying data to the SC latch 41, and a path connected to a SEQ-C bus supplying data to an operation input of the ALU 22. As output paths of the lower stacks 45L1, 45L2 . . . 45L8, there are a path connected to the SEQ-E bus supplying data to the SC latch 41, and a path connected to the SEQ-A bus supplying data to the operation input of the ALU 22.

By the stacks 45H1, 45H2 . . . 45H8 and 45L1, 45L2 . . . 45L8, means for supplying the operation result of the ALU 22 to the SC latch 41 of the program counter as the address of the instruction to be executed next is constituted.

Besides, to the SEQ-E bus, a path 46 which receives a branch destination address directly from an operation code latch 56 of 16-bit configuration, a path 47 supplying a reset vector as a fixed address by using a hardware at the time of resetting a system, and a path 48 supplying the reset vector from a test reset vector circuit by using a software are connected.

In FIG. 9, a circuit designated by numeral 48 on the left side of the SEQ-E bus is a control circuit for controlling the operation of the program counter. The control circuit 48 inputs a following plurality of control signals to generate the control signals such as SC save and so on.

Though the program counter 40 shown in FIG. 8 and FIG. 9 is basically saved at the timing of the auxiliary clock φH, there are some factors to reject this. At first, a PC value "SC+1" at the time of executing the 2-cycle instruction is rejected by a signal e42B which makes the SC save signal meaningless via an OR gate 403 and an AND gate 404. Though a "br av" (branch available) signal indicates that the branch is effective at the time of executing the branch instruction, it is realized as an output of an OR gate 401, only when either of a branch control signal which is an output of a condition decision circuit to be described later, an signal e43B (branch condition:conditional branch instruction control signal) and a 1-bit o11 value of the operation code latch 56 at that time point becomes "H".

The bit o11 is the bit which controls the unconditional branch. When the bit o11 is "L", it indicates the conditional branch, and when the bit o11 is "H", it indicates the unconditional branch.

A signal e82B is the control signal which rejects to increment the PC value for securing a return address at the time of interruption or break interruption.

The conditional branch instruction execution of the microcomputer of the present invention is characteristic, and adopts a method, whereby the lower 9 bits (bit 8 to bit 0) of the branch destination address are supplied directly from the instruction operand held by the operation code latch 56 via the path 46, and the higher 4 bits are that, 1/+0/−1 and an absolute zero page specifying can be selected from a page being executed at present. Thus, by making an output of an AND gate 402 effective by a signal e63 (branch SC save signal) at the time of executing the branch instruction, the lower 9 bits of the branch destination address are supplied to the SC latch 41 from the operation code latch 56 via the path 46 and the SEQ-E bus, and the higher 4 bits are that, by making the page operation effective by a signal e47 (page signal), a page specifying circuit is made active by 2-bits of bit o10 and o9 of the operation code.

At the time of subroutine call, the bit o12 to o3 of the operand in the instruction code held in the operation code latch 56 as a 10-bit address, are supplied directly to the SC latch 41 by a control signal e64 via the path 47 and the SEQ-E bus. In case of subroutine call, in this embodiment, the lower 3 bits (bit 2 to bit 0) are supplied by the control signal e64 always at a fixed value of "000" in the same way as described above.

Generation of an interruption vector of the microcomputer of the present invention is also characteristic, data held by the stack register allocated beforehand responsive to interruption factors serves intact as a jump destination address of the interruption routine. Thus, in case of using the interruption, it is necessary to write the interruption vector in the stacks 45H1, 45H2 . . . 45H8 and 45L1, 45L2 . . . 45L8 beforehand by the programs. Data are given and received between the program counter and the stacks 45H1, 45H2 . . . 45H8 and 45L1, 45L2 . . . 45L8 by control signals e65-1, e65-2 . . . e65-8 and e66-1, e66-2 . . . e66-8 of switches connected to the SEQ-E bus.

There is also a method of executing the branch instruc-destination address is calculated by the program and stored in any of the stacks 45H1, 45H2 . . . 45H8 and 45L1, 45L2 . . . 45L8 beforehand, by executing the special branch instruction, it is possible to branch in all address spaces. In the microcomputer of the present invention, the instruction are called a BRT (branch toggle) and a BSR (branch with stack). When executing these instruction, data are given and received between the program counter and the stacks 45H1, 45H2 . . . 45H8 and 45L1, 45L2 . . . 45L8 by the abovementioned control signals e65-1, e65-2 . . . e65-8 and e66-1, e66-2 . . . e66-8.

Finally, in this address operation block, for data accessing in the memory space, the stack registers are also used. That is, when it is necessary to operate data in the memory space usually used as the program memory area directly, though not shown in FIG. 9, by using two sets of external address pointers 45P1, 45P2 having the same configuration as the stack registers constituted by combining the stacks 45H1, 45H2 . . . 45H8 and 45L1, 45L2 . . . 45L8 respectively to specify by the bit 11 of the instruction code, two kinds of addresses set by the program can be accessed. Also in this case, the data is given and received between the program counter and the stacks 45H1, 45H2 . . . 45H8 and 45L1, 45L2 . . . 45L8 by the control signals e65-1, e65-2 . . . e65-8.

Figure 10:
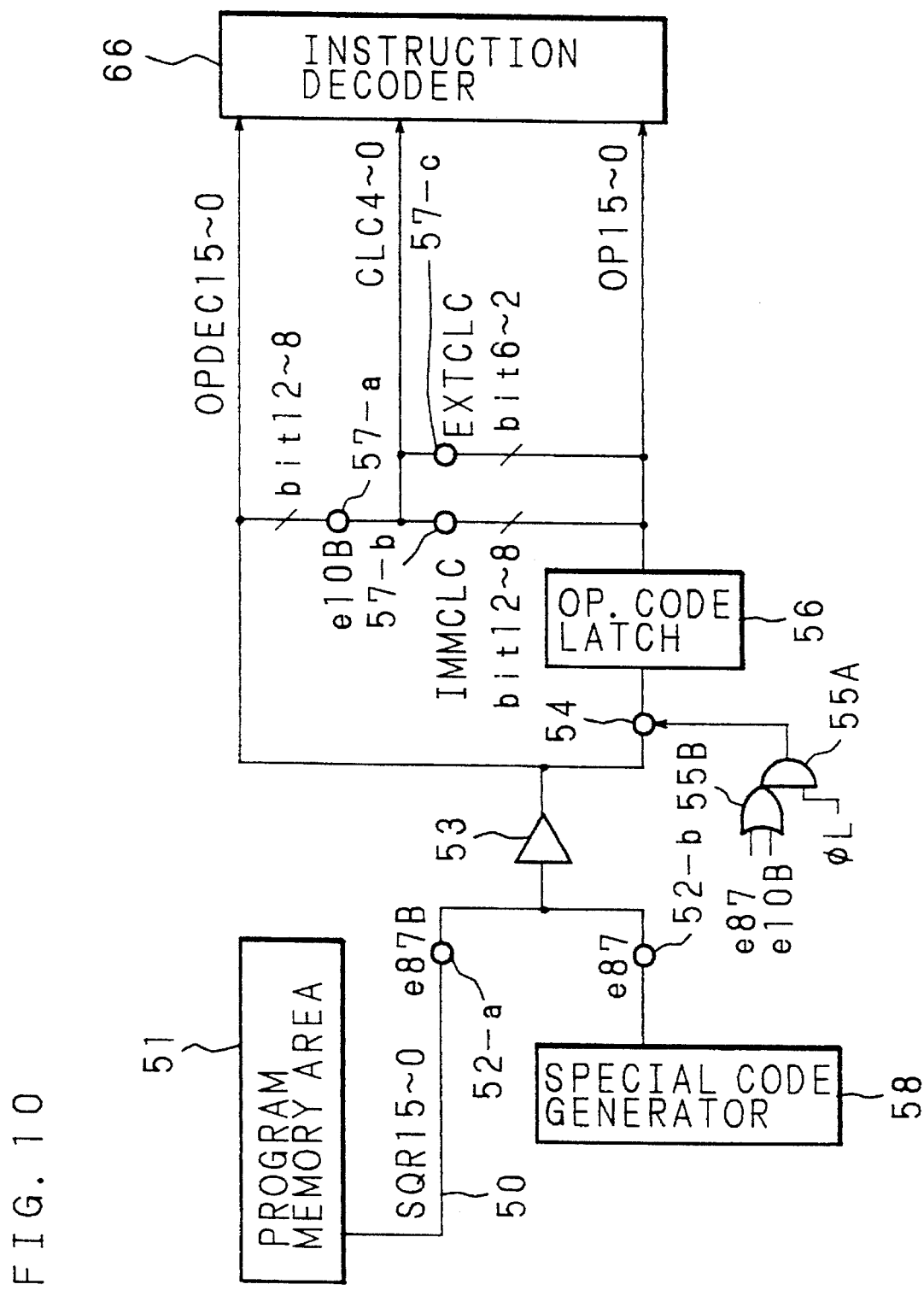
FIG. 10 is a block diagram showing an example of circuit configuration of an instruction decoder of a first embodiment of a microcomputer according to the present invention.
Figure 11:
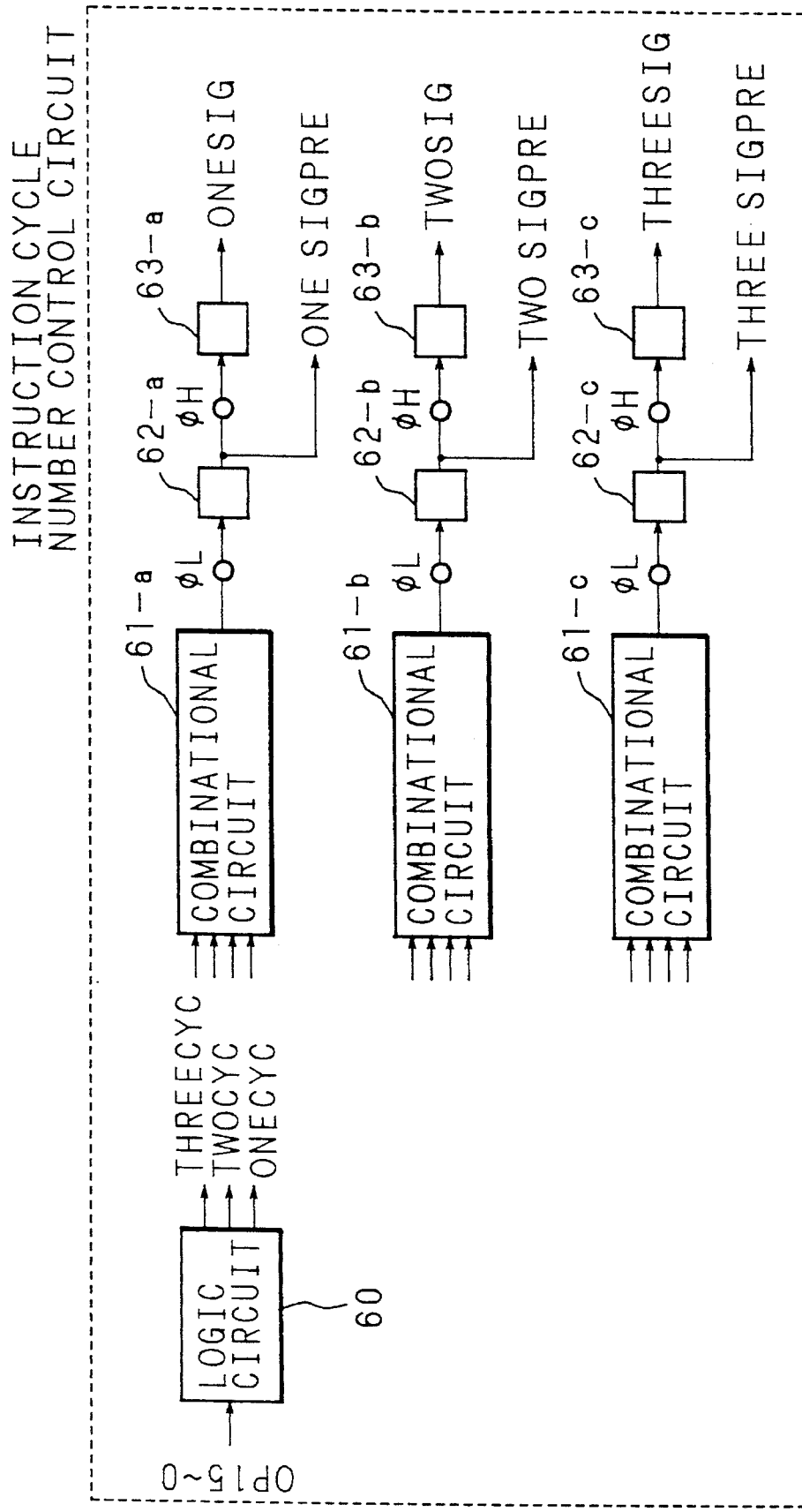
FIG. 11 is a block diagram showing an example of circuit configuration of an instruction decoder of a first embodiment of a microcomputer according to the present invention.
Figure 12A:
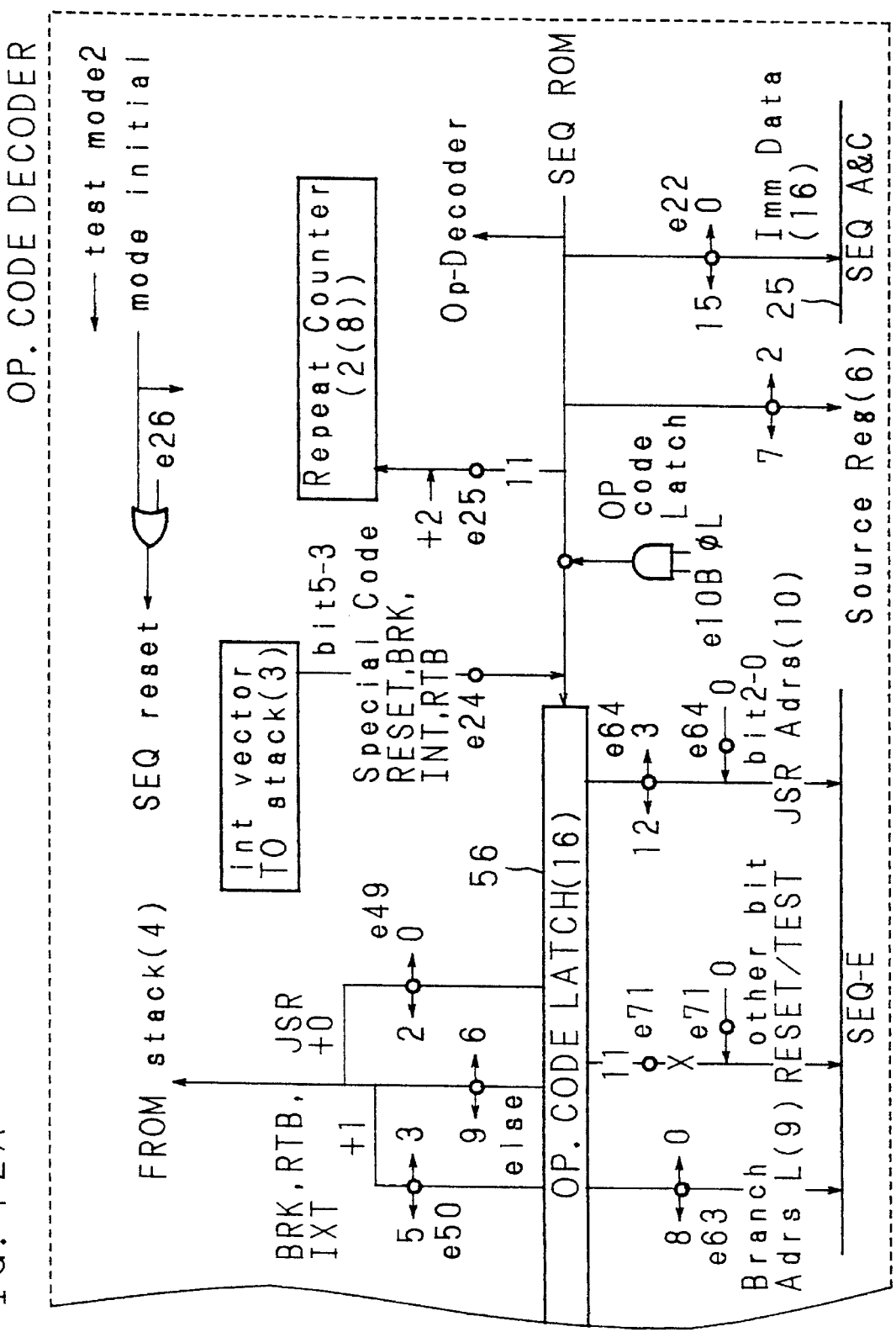
FIG. 12A is a block diagram showing an example of circuit configuration of an instruction decoder of a first embodiment of a microcomputer according to the present invention.
Figure 12B:
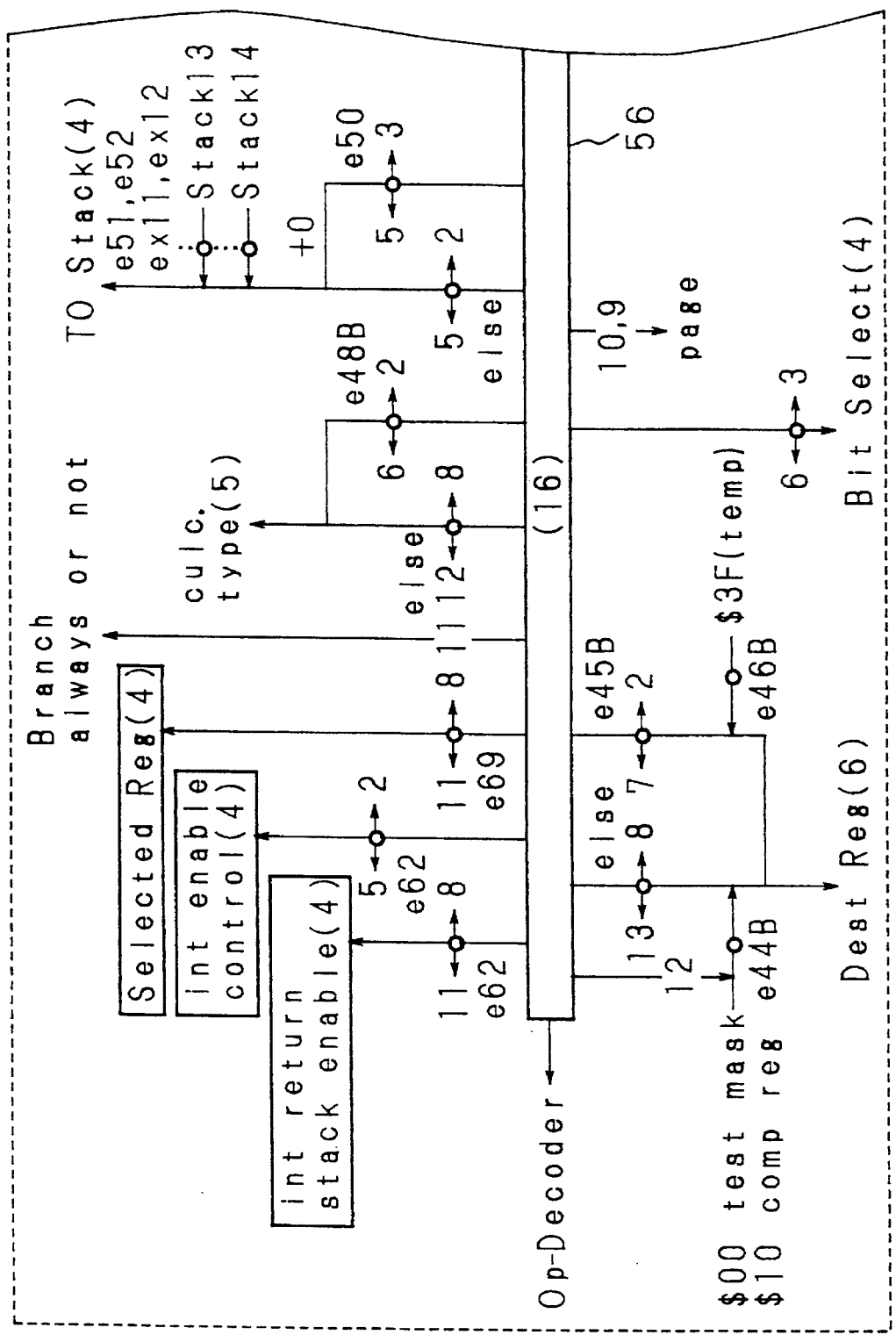
FIG. 12B is a block diagram showing an example of circuit configuration of an instruction decoder of a first embodiment of a microcomputer according to the present invention.
Figure 13:
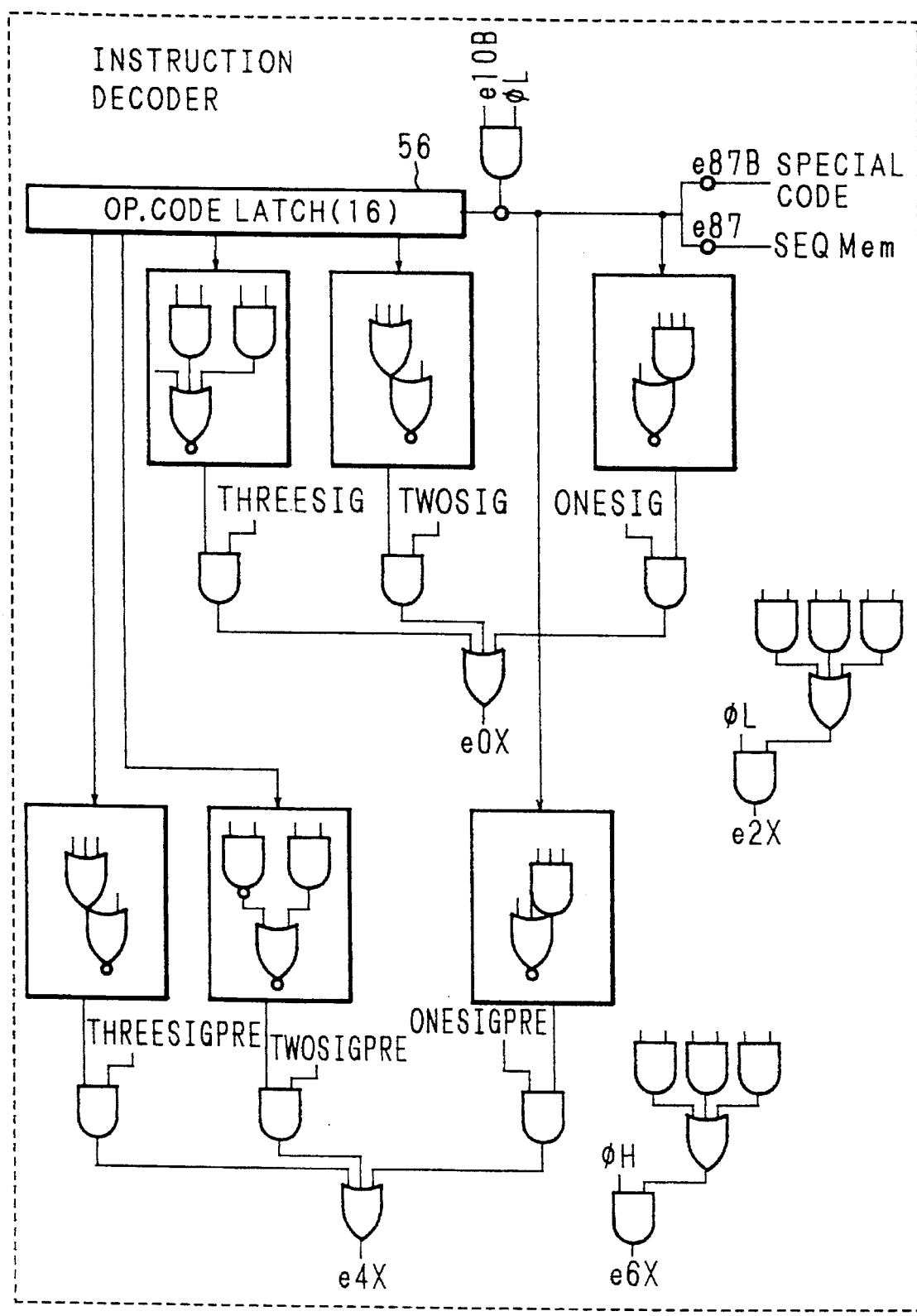
FIG. 13 is a block diagram showing an example of circuit configuration of an instruction decoder of a first embodiment of a microcomputer according to the present invention.

FIG. 10 to FIG. 13 are block diagrams showing an example of circuit configuration of an instruction decoder of a first embodiment of a microcomputer of the present invention. FIG. 10 is the block diagram showing a configuration of an operation code latch 56, FIG. 11 is the block diagram showing a configuration of an instruction cycle control circuit, FIG. 12A and FIG. 12B are the block diagrams showing a configuration of an instruction decoding circuit, and FIG. 13 is the block diagram showing configuration of a circuit for generating a control signal eXX which controls respective portions of the CPU.

In FIG. 10, numeral 51 designates a program memory area of the memory. Receiving data outputted from the program memory area 51 to a data bus SQR (15 to 0) 50, instruction code data is supplied as a signal OPDEC 15 to 0 and directly as one input OPDEC 15 to 0 of an instruction decoder 66 via a switch 52a and a buffer 53. Output of the buffer 53 is inputted to the operation code latch 56 via a switch 54. Manipulations to hold the instruction code in the operation code latch 56 are repeated at every instruction cycle.

Usually, a signal e87 is "L" and a signal e10B is "H". Thus, an output of an OR gate 55B to which these signals are inputted is "H". Since an output of an AND gate 55A into which the auxiliary clock φL and the output of the OR gate 55B are inputted is "H", usually, during the period "H" of the auxiliary clock φL, the switch 54 is turned on, thereby the operation code is stored in the operation code latch 56 in respective cycles. In case of 2-cycle instruction or 3-cycle instruction, since the signal e10B becomes active ("L") and the output of the OR gate 55B becomes "L", the switch 54 is turned off, thereby the operation code latch 56 is inhibited to latch the operation code.

An output of the operation code latch 56 serves as another input OP 15 to 0 of the instruction decoder 66. Also, by turning on any of the switches 57-a, 57-b and 57-c to control operation of the ALU 22, a signal CLC 4 to 0 is generated from a signal OPDEC 12 to 8 and signals OP 12 to 8, 6 to 2.

The CLC signal is consisting of 5 bits and is for discriminating the types of operation. Specifically, in case of register operation, bit 12 to 8 (OPDEC 12 to 8) of the instruction code are used in the period T2, in case of memory operation, bit 6 to 2 (OP 6 to 2) of the instruction code are used in the period T4 of the second cycle, and in case of operation of a 16-bit immediate of the operand which is the 2-word instruction anti the register, bit 12 to 8 of the instruction codes OP 12 to 8 are used in the period T6 of the third cycle. The CLC signal also serves as an input of the instruction decoder 66.

Numeral 58 designates a special code generator which, at the time of exceptional processing caused by external factors other than the programs such as interruption, reset, break and so on, generates the instruction code (special code) corresponding thereto in a hardware circuit to supply it forcibly to the instruction decoder 66.

Usually, though a switch 52-b is turned off and the program memory area 51 is accessed via the data bus SQR (15 to 0) 50 because the signal e87 is "L", when the above-mentioned exceptional processing is started, the signal e87 changes to "H" and the code generated by the special code generator 58 is supplied. At this time, since the switch 54 is tuned on by the OR gate 55B and the AND gate 55A when the signal e87 changes to "H", the code outputted from the special code generator 58 is stored forcibly also in the operation code latch 56.

The exceptional code includes some exclusive codes depending on the factors. In the embodiment of the present invention, the codes shown in a table of FIG. 14 are set.

In FIG. 14, "BRK" is the code which jumps to a break vector, "RTB" is the code which returns from the break, "INT" is the interruption processing code, "RET" is the code which resets a system and "TES" is the code which resets the system for test.

FIG. 11 is a block diagram showing an example of configuration of an instruction cycle counter 62 which controls the number of instruction cycles.

The instruction decoder 66 decodes signals of outputs OP 15 to 0 of the operation code latch 56 by a static logic circuit 60 to generate signals THREECYC (3-cycle instruction), TWOCYC (2-cycle instruction) and ONECYC (1-cycle instruction) which indicate what cycle the instruction is. To generate signals ONESIGPRE, ONESIG, TWOSIGPRE, TWOSIG, THREESIGPRE and THREESIG which indicate what cycle a present state is from these signals, combinational circuits 61-a, 61-b and 61-c are assembled according to transition definitions of the respective states.

Numerals 62-a, 62-b, 62-c and 63-a, 63-b, 63-c designate simple shift registers, the shift registers 62-a, 62-b and 62-c perform the shift operation in synchronism with the auxiliary clock φL, and the shift registers 63-a, 63-b and 63-c perform the shift operation in synchronism with the auxiliary clock φH.

FIG. 12A and FIG. 12B are block diagrams showing a configuration of an operand decoder. In the first embodiment of the microcomputer of the present invention, since the operand of register specifying and the like are included in the 16-bit length instruction code, it is necessary to extract the operand at the time of executing the instruction. The block diagrams of FIG. 12A and FIG. 12B show the configuration of the operand decoder for that purpose.

In case of register to register data transfer instruction, a transfer source register specifying address "Source Reg (6)" is obtained by 6 bits from the bit 7 to 2 obtained from a data signal outputted to the data bus SQR (15 to 0) 50. While, a transfer destination register specifying address "Destination Reg (6)" is obtained from the bit 13 to 8 in an output OP (15 to 0) of the operation code latch 56. In case of storing an immediate in the register, the immediate (16 bits) is supplied to a register bus SEQ-A, -C 25 via a gate on/off controlled by a signal e22. In case of 8-bit data, though it is just enough to supply it to a register bus SEQ-A 25 of lower 8 bits, the configuration of supplying it to a register bus SEQ-C 25 of higher 8 bits simultaneously and controlling it by a logic in the ALU 22 at the time of storing actually in the register is simpler in circuit configuration, because it is treated in the same way as the 6-bit data immediate operation to be described later.

Main signals in the block diagrams of FIG. 12A and FIG. 12B may be described as follows.

A "FROM stack (4)" specifies a storage stack register of a return destination address at the time of interruption, subroutine branch and the like. A "TO stack (4)" specifies a storage stack register of an interruption vector or a stack register storing a branch destination address of a branch instruction using the stack register.

A "culc.type (5)" is a signal specifying the kinds of operation previously described. A "Branch always or not" is a signal distinguishing the conditional branch instruction and the unconditional branch, and is given as a signal o11 to the control circuit 48 of the program counter 40 shown in FIG. 9 previously described. A "Selected Reg (4)" specifies a register to be decided by a branch condition decision circuit, and an "int enable control (4)" and an "int return stack enable (4)" are interruption control registers.

A "Destination Reg (6)" specifies a register address which specifies data transfer and storage destinations. On the contrary, a "Source Reg (6)" specifies register addresses of the data transfer and draw-out sources.

A "Bit Select (4)" is a signal specifying a target bit at the time of bit set and clear instruction execution, and is possible to specify 16 bits in 4-bit width. A "Branch Adrs L (9)" is a signal specifying lower 9 bits of the branch destination address of the branch instruction, and a "JSR Adrs (10)" is a signal specifying a start address of a subroutine of the subroutine branch instruction. An "Imm Data (16)" is a pass used when using an immediate in operation, as previously described.

FIG. 13 is a block diagram showing an example of circuit configuration of the instruction decoder of the microcomputer of the present invention. In FIG. 13, control signals shown in the tables of instruction sets of FIG. 15A through FIG. 15P are generated for every instruction by using the signals described in FIG. 10 to FIG. 12A and FIG. 12B.

Though control signals of the No. e0X mark are basically active in the periods T1 and T2, they allow unnecessary glitches to generate at transition points of the timing caused by generating glitches continuously from the output of the program memory area 51 or operation code latch 56. This is because that, the No. e0X mark control signals are used only in a portion controlling the circuit, which returns finally to the target operation even once operates unnecessarily by the generation of glitches, because there is no problem when the target operation is completed at the timing of a rising edge of the period T2 finally.

Signals of the No. e2x mark are active in the period T2 and are in synchronism with the auxiliary clock φL. The signals are used in the portion controlling a circuit in which the glitch is not allowed. The circuit in which the glitch is not allowed is, for example, the circuit for controlling the loading of register value. In such a circuit, when the glitch is generated at the time of loading the register value, the register bus SEQ-A 25, which is temporarily pre-charged, is discharged to the unnecessary value and takes time to return to a proper value, so that the glitch is not allowed to generate.

Similarly, signals of the No. e6x mark are active in the period T3 and are in synchronism with the auxiliary clock φH. In this signal, for example, like the write signal e61 to the register, since data is written into the wrong register to cause the malfunction when the glitch is generated, the glitch is not allowed to generate absolutely.

Signals of the No. e4x mark are active in the periods T2, T3, and are used for controlling the circuit in which the glitch is allowed in the same way as the No. e0x mark signals.

Besides, signals of the No. e8x mark are used as the control signals generated at the special timing. For example, though the signal e87 generated responsive to the aforementioned interruption and reset is active in the period T2, since it is generated in asynchronous with the program read, it is named differently from those signals.

FIG. 15A through FIG. 15P are tables of instruction sets of the CPU of the first embodiment of the microcomputer of the present invention, showing the instructions and their codes, and control signals which become active when executing respective instructions. FIG. 15A through FIG. 15P are originally a sheet of tables, in which FIG. 15A, FIG. 15C, FIG. 15E, FIG. 15G, FIG. 15I, FIG. 15K, FIG. 15M and FIG. 15O are arranged in order from top to bottom, and FIG. 15B, FIG. 15D, FIG. 15F, FIG. 15H, FIG. 15J, FIG. 15L, FIG. 15N and FIG. 15P are arranged in order from top to bottom, and the former sheets of table are on the left hand side, and the later sheets of table are on the right hand side.

On the sheets of table in odd numbers, the instruction group, mnemonic code, function and 16-bit length instruction code are stated in order from a left side column, and on the sheets of table in even numbers, the instruction group, mnemonic code and control signal eXX are stated in order from a left side column. Schematic contents with respect to respective instructions are shown in FIG. 17A through FIG. 17E and FIG. 18.

STM, BMS and BMC instructions are the instructions for setting up the condition decision circuit by one instruction, and are used when deciding the condition. Symbols shown in FIG. 18 are operand designating symbols used in FIG. 15A through FIG. 15P.

FIG. 16 shows the relationship of instruction code generation intelligibly. In the figure, the codes are grouped in a portion provided with hatching for decoding.

Such instruction set used in the microcomputer of the present invention is constituted according to the following viewpoints, in order to improve the instruction execution speed.

(1) to disuse operand address operation, (2) to disuse relative address operation of the branch instruction, (3) not to perform conditional branch decision in the instruction decoding cycle, and (4) basically, most of the instructions are subjected to one instruction/one word (16 bits), or possible to be fetched in one fetch cycle.

Now, the address operation is to operate memory address to be accessed by an index register or a displacement during execution of the instruction. By disusing the address operation of (1) and (2), the basic cycles of the microcomputer can be omitted by one cycle.

Though an address bit width usually extends, at least, over about 16 bits or 64 bits in some cases, when considering a carry time of the address operation, one cycle is needed therefor, results in a bottle neck in improving the instruction execution speed. Since the programs are subjected to ROM and are fixed in the control programs, by optimizing the necessary address operation beforehand at the time of programming or not assuming too large-scaled programs, the index register and the like are not always necessary.

Specifically, the following instruction is devised with respect to (1) to disuse the operand address operation.

At first, the registers are designed to be specified directly by a physical address of the register. In this embodiment, the registers are arranged in 64 spaces and specified by 6 bits. The reason why the 6-bit width is adopted is that, a maximum bit width, which is possible to accept one instruction bit length in one word of (4), is considered.

In the SET instruction storing the immediate in the register, 8 bits of the 16-bit of the instruction code are occupied when storing the byte-size immediate, so that when 6 bits are used for register address specifying, 2 bits are left for instruction code identification. In the register to register transfer instruction of the MOV instruction, 6 bits are required respectively (12 bits in total) for specifying the source register and the destination register, thus remaining 4 bits are used for identifying the instruction code. In case of register operation instruction such as the ADD instruction, even when 6 bits are used for representing the types of operation, 4 bits are left for instruction code identification. In the instruction sets shown in the tables of FIG. 15A through FIG. 15P, the instructions designated as "source reg", "dest reg", "immediate data", "calculate type" and so on correspond thereto.

Next, it is devised to eliminate the address operation, by using the register indirect addressing using a value storing the memory address to be accessed in a special register also for the memory area access.

In the instruction sets shown in the tables of FIG. 15A through FIG. 15P, a series of instruction groups of "SET ext2", data and so on belonging to the "ext. data operation" group correspond thereto. In this embodiment, two "External Address Pointer" registers (designated by EAP in FIG. 20A through FIG. 20F) are included, whereby indirect address storage register being used is distinguished by one bit of the "ext" bit in the instruction code. As the memory address to be accessed, the value itself stored in the register is used. In the practical circuit, the "External Address Pointer" registers have an equivalent circuit configuration as the stack register 45 shown in FIG. 7, whereby data can be transferred directly to the program counter 41 (in this case, acts as a memory address buffer) via an E bus (SEQ-E) or an F bus (SEQ-F). At the time of executing register indirect addressing, a gate e61-A is opened and values of the EAP registers flow to the SC latch 41 via the E bus.

In this case, an original PC value of the program counter is held in the result register 44 of the program counter. A mechanism of specifying a gate e65-A or e65-B is that, the stack register is specified directly in hard-wired so as to specify a stack 13 or 14 by a signal e51 or e52 by a signal line to the "T0 stack (4)" in a circuit of the instruction decoder 66 shown in FIG. 12A and FIG. 12B. However, in order to access the memory area, one cycle is not enough but plural cycles are required as the execution cycles, because the memory space is as same as the program area 51.

Though it is generally known to use the branch instruction for relative addressing, since it takes time in address operation also in this case, it is not adopted in this embodiment. In place of that, the register indirect branch of the BRT, BRS, RTS instructions using the above-mentioned stack registers, and the BRC, BRA, JSR instructions whose direct branch destination is the operand bit in the instruction code are prepared.

In the BRT, RTS, BRS instructions, the value stored in the specified "Stack" register is substituted directly in the program counter. In case of BRT instruction, the 4 bits of bit 5 to 2 of the instruction latch are connected to the output of the "T0 Stack (4)" shown in FIG. 12A and FIG. 12B, and a signal e65 becomes active to open either of gates e65-1 to e65-8 shown in FIG. 7, thereby the stack register value is stored in the program counter 41 via an E bus. Simultaneously, the 4 bits of bit 9 to 6 of the instruction latch are connected to the output of the "FROM Stack (4)" shown in FIG. 12A and FIG. 12B, and a signal e66 becomes active to open either of gates e66-1 to e66-8 shown in FIG. 7, thereby the PC value being executed hitherto and held in the result register 44 is saved in the separate specified stack register via an F bus.

In such a manner, one kind of register indirect specifying subroutine branch instruction is realized in this embodiment. The other BRS, RTS instructions operate only one decomposed operation of the BRT instruction. In these instructions, it is possible to branch freely into an address of 16-bit width which is a stack register width.

Conditional branch of the BRC, BRA instruction is that, by introducing the absolute address of lower 9 bits and a concept of 512-byte unit pages in place of the relative address operations, four kinds of its own page, before and after pages and absolute zero page are represented by 2-bit control bits (refer to bit 9 and 10 in lines of BRA, BRC in FIG. 15A through FIG. 15P), 1 bit of the conditional branch/unconditional branch control bits (refer to bit 11 in lines of BRA, BRC in FIG. 15A through FIG. 15P) is added thereto to obtain 12-bit operand for use in the instruction identification together with the remaining 4 bits. The relative address may be added or subtracted in a unit of pages, and this increment/decrement operation may be realized by a circuit processing a width obtained by subtracting 9 bits from an address bit width, thus a delay time required for the carry can be shortened.

As an actual circuit, a "page activate" signal AND-operated by a signal e47 in the tables of FIG. 15A through FIG. 15P corresponds to this control portion, and is separated to a result H register 44H at a higher portion of the result register 44 to supply the page specifying to the E bus independently. While, the lower 9 bits are that, the address value is supplied directly from the instruction code latch. This operation is controlled by a control signal AND-operated by the signal e63.

In the JSR instruction, in order to make it possible to select the stack register storing the return address, the lower 3 bits are used for specifying the stack register, and 10 bits from the bit 3 to 12 are used for specifying the absolute address of the subroutine provided with offset in octal. Though the subroutine arrangement is restricted in a 13-bit address width or an 8 K-word space, in case of small-scaled control program, it is sufficiently practical even with this restriction. In other words, the microcomputer of the present invention is designed for high speed at the sacrifice of flexibility of the general purpose program to some extent.

The JSR instruction is executed unconditionally, and the address of the lower 13 bits is supplied directly to the program counter 41 from the instruction code latch via the E bus through a circuit gated by the signal e64 in FIG. 7. Simultaneously, the effective address held hitherto is stored in the specified stack register from the result register 44 via the F bus by the control signal e66. Designation of the storage stack register is a signal path of 3 bits of bit 0 to 2 of the instruction latch which selects the "FROM stack (4)" in FIG. 12A and FIG. 12B by a control signal e49. At this time, the least significant 1 bit is fixed at "1".

As described above, though the instruction codes are constituted by the operand field and the instruction identification field, the control signal eXX in the tables of FIG. 15A through FIG. 15P is generated by decoding the instruction identification bit field and a circuit output which counts the number of cycles. It is to be described later with respect to countermeasures on the conditional branch decision, which is a third feature of devices related to the instruction set.

These are the devices for high-speed execution viewed from the point of instruction set adopted in this embodiment.

Next, a concept of designing the instruction codes of the instruction set of this embodiment is described. In the microcomputer of the present invention, one instruction/one word is a basic concept, and further, the following points are taken into consideration.

(1) to allocate more operand bits for immediate setting, (2) to allocate more operand bits to the branch instruction, (3) to manage without bit shifting of the operand bit and immediate being used to the utmost, (4) to fix specified bit of the source register address, (5) to fix positions of specified bit of the destination register address and specified bit of the indirect branch register address as much as possible, (6) to batch control bits of operation types, and (7) to allocate the instruction which exerts a little bad effect on execution of the program to the instruction code of all bit "H".

FIG. 16 is a table, wherein instruction identification bits of the instruction sets in the tables shown in FIG. 15A through FIG. 15P are extracted and adjusted.

In FIG. 16, only the bits with entry of "1" or "0" are the minimum necessary bits for identifying the instructions.

In order to achieve above-mention d objects (1) to (3), the identification bits are totally concentrated on the bit 0 and 1, and the lower bit 14 and 15. That is, in order to achieve the object (3), the 8-bit immediate of the SET instruction and the lower 9 bits of the branch destination of the BRA, BRC instructions have their bits aligned, and the lower 8 or 9 bits are necessary. And hence, it is logical to use bit 8 to 13 for storage destination register specifying of the SET instruction, and it is convenient to realize the MOV instruction when, conversely, the source register specifying of (4) is on the lower bit side.

To fix the source register specifying of (4) is meant to specify the source register independently of the instruction decoding, and is for shortening the instruction execution time. The draw out of operand bits shown in FIG. 12A and FIG. 12B is realized rapidly by setting the operation, which is most severe in time-wise, on the gate side of a default value (shown by else in the figure). Since the source register specifying is in a first of instruction execution procedures, the condition of (4) is important. When considering only the MOV instruction, the source register specifying may be at any position of the lower 8 bits, however when also considering decoding of the other instructions such as the BRT, BRS, RES instructions, it is desirable to use the 6 bits of bit 3 to 7. As the operation type specifying code, the same position as the destination register specifying bits, or the 5 bits of bit 8 to 12 are used.

With respect to the point of (7), the instruction with a little bad effect is subjected to code allocation by allocating the MOV instruction. This is because that, when reading the memory, in respective cycles, it is advantageous for high-speed reading to pre-charge the data bus 50 to "H" from the relationship with the memory read circuit, and in the read cycle in the period T2, the instruction code of the all bit "H" is read. By enterin many "0"s in the identification bits of the instruction such as the RES instruction or the STP instruction, in which a large effect of malfunction is anticipated, branch instruction and so on, the possibility of malfunction in the period T2 can be lessened.

The result of designing the instruction code by taking into consideration of the above points is an example of the instruction sets shown in the tables of FIG. 15A through FIG. 15P. In this embodiment, usable codes are not used completely, and the undefined instruction decoding is omitted to reduce the circuits.

Next, one embodiment (hereinafter, referred to as another embodiment of the first embodiment) of the microcomputer comprising a condition decision circuit as the invention according to claim 5 is described.

FIG. 19 is a block diagram showing a configuration of the condition decision circuit of another embodiment of the first embodiment of the microcomputer of the present invention.

In FIG. 19, 8-bit registers designated by numerals 101-0 to 101-14 are register groups which can be selected as condition decision targets. The numerals 101-0 to 101-14 are respectively connected to an SEQ-T bus by switches 102-0 to 102-14, and are respectively controlled by signals T00 to T14. The signals T00 to T14 are obtained by decoding a "Select Reg (4)" signal 108, and as previously described, the condition decision target register can be selected by the BMS, BMC and STM instructions.

In such a manner, outputs of respective bits of one register selected from the registers 101-01 to 101-14 are respectively supplied to inputs of EXNOR gates 104-0 to 104-7. The other inputs of the EXNOR gates 104-0 to 104-7 are connected to outputs of compare registers 105-0 to 105-7, and coincidence of the two is decided for every bit.

Numeral 107-0 to 107-7 designates a mask register. A branch condition deciding signal synchronizing latch 106 masks outputs of the EXNOR gates 104-0 to 104-7 by a circuit 100 and AND-operates entire 8 bits for branch condition decision, and further, synchronizes the output of the circuit 100 finally with the auxiliary clock φL, and decides to control whether or not the BRC instruction branches at the timing T3.

The mask register 107-0 to 107-7 includes data sets and a data clear circuit, and functions to set only the specified bit directly by a control signal e70 and to clear all of the other bits. This function is used in response to the aforementioned BMS, BMC instructions. The bit is specified by a circuit 108 which generates signals B0 to B7. As inputs of the circuit 108, a "bit decoder (3)" and a bit handling control signal e41B are used. For example, when the bit 1 is selected, only a signal B1 becomes "L", and signals B), B2 . . . B7 other than the signal B1 become "H" and the other bits are cleared by the signal e70. Herein the above-drawn bars indicate that these signals are inverted signals.

The register groups constituted by the registers 101-1 to 101-15 are that, the bit set and bit clear are effected by the circuits shown in FIG. 19 besides described above. That is, by specifying the circuit 108 previously described and a "Destination Register (6)" 109, only the specified bit can be changed to a level inputted from an SEQ-B bus via two switches 110. At the time of executing the bit operation instruction, since the CPU of the microcomputer of the present invention forcibly inputs values of "FF" and "00" to the SEQ-B bus respectively at the bit set instruction and the bit clear instruction as the output of the ALU 22, the target bit of the target register can be set by the SEB and CLB instructions.

The BMS and BMC instructions are executed by these circuit functions. That is, the specified bit of a branch condition deciding signal synchronizing latch 106 is specified by a "Bit Decoder" signal and set by making the signal e70 active. An address of the compare register 105 is specified forcibly to the "Dest Reg" 109 by the signal e44B (refer to FIG. 12A and FIG. 12B), from the ALU 22 all "H" or all "L" data is inputted to the SEQ-B bus to store a value in the compare register 105 (refer to FIG. 22, FIG. 15A through FIG. 15P), and store an address specifying the register to be compared in the "Select Reg Latch" 103 at the timing of the signal e69 (refer to FIG. 12A and FIG. 12B).

As the embodiment of the target register groups (101-1 to 101-15) of the condition decision circuit, among the register sets shown in FIG. 20A through FIG. 20F, particularly, the registers whose "SEQ adrs" are 15 addresses from address 01 to OF are set. More particularly, functions of every bit of the registers are described in FIG. 21A through FIG. 21L.

For example, when the bit to be specified is set beforehand by the BMS and BMC instructions by allocating the timer overflow or interruption request bit to the register groups (101-1 to 101-15), by composing such program as "QLOOP:BRC LOP", in case of occurrence of overflow, is possible to slip out from the wait loop in the next cycle. This means that, a very rapid response speed routine can be realized by composing a program waiting for incident occurred in advance.

Tables of special functional registers shown in FIG. 20A through FIG. 20F and FIG. 21A through FIG. 21L are particularly described in the following. This embodiment is designed to fit application in realizing exclusive functions for processing a communication protocol by using the microcomputer of the present invention described above.

FIG. 20A through FIG. 20F are originally a sheet of tables which are arranged in order from top to bottom.

FIG. 21A through FIG. 21L are originally a sheet of tables. FIG. 21A, FIG. 21B, FIG. 21C, FIG. 21D, FIG. 21E and FIG. 21F are arranged in order from top to bottom, and FIG. 21G, FIG. 21H, FIG. 21I, FIG. 21J, FIG. 21K and FIG. 21L are arranged in order from top to bottom, and the former sheets of table are on the left hand side, and the later sheets of table are on the right hand side.

In the microcomputer of the present invention, making a good use of its high-speed processing function, even a frame protocol is processed in a multi-master-bus communication system.

Specifically, it is so constituted that even the processings of arbitration, data retry, frame retry and the like can be coped with by programs and softwares. In case of program only, for portions with slow processing speed, an exclusive circuit is added to compensate by hardwares. A microcomputer provided with a communication function and a control function integrated on a chip can be realized, by adopting an on-chip configuration in which two microcomputers are provided on one chip, using the high-speed microcomputer of the present invention as one of the microcomputers for exclusive communication processing as a sub-MCU, and using the conventional microcomputer as another microcomputer to program the functions such as a man-machine interface or mechanical control.

FIG. 20A through FIG. 20F are tables of register groups arranged in a register space in the CPU of the microcomputer of this embodiment.

The register space is set as the space of maximum 64 addresses specified by the 6-bit register addresses. The register to be handled can be specified by the 6-bit code specifying the source register, destination register and so on in the instruction code. In the figures, a column of "SEQ adrs" corresponds to the register address. A column of "CPU adrs" is the address used at the time of accessing from the main CPU side, and "hidden" in the column represents that it is not accessible from the main CPU. Local addresses "local adrs" are further provided on the main CPU side to save the address space. By using the registers which are accessible from the both CPU as means for giving and receiving data, a loosely coupled dual processor system is realized.

In the following description, the register address on the sub-CPU side of the "SEQ adrs" column is described unless other wise provided.

Though the register space is set to 64 addresses, only the temporary register arranged in the address "3F" is special, and as to be described later, only the writing side of one register data is also allocated to the addresses "1E" and "1F" so that the high order bytes and the low order bytes can be permuted. Schematically, those are registers designated by encircles numerals 12 and 13 in FIG. 27A and FIG. 27B to be described later, and though only the address "3F" is read at the read time, at the write time, in case of register designated by encircled numeral 13, though data is written from a usual high-order byte bus SEQ-D when the address "3F" is specified, the data is written from a low-order byte write bus SEQ-B when the address "1F" is specified.

The mask register 106 for conditional branch instruction is allocated to the address "0", and the compare register 105 for conditional branch instruction is allocated to the address "10". In arrangement of the functional registers responsive to the other application, the other 59 addresses are used.

The 32 registers of the addresses "00" to "1F" are the byte-size registers, whereby, at the time of executing the operation instruction and the like in connection with the instruction code, the byte operation is selected automatically. Among these, the 16 registers of the addresses "0" to "0F" are the registers which are specially capable of conditional branch decision. The 32 registers of the addresses "20" to "3F" are the word-size registers. Among these, the 14 registers of the addresses "30" to "3D" are also connected to the program counter via the SEQ-E bus and SEQ-F bus.

In these registers, there are following types to be described.

(1) A register group of data bus box type byte unit, a word unit or a FIFO type, which give and receive data to and from the main CPU. Depending on the register, a data transfer direction is decided beforehand from the main CPU to the sub CPU or vice versa, and having connections by hardware.

Figure 27A:
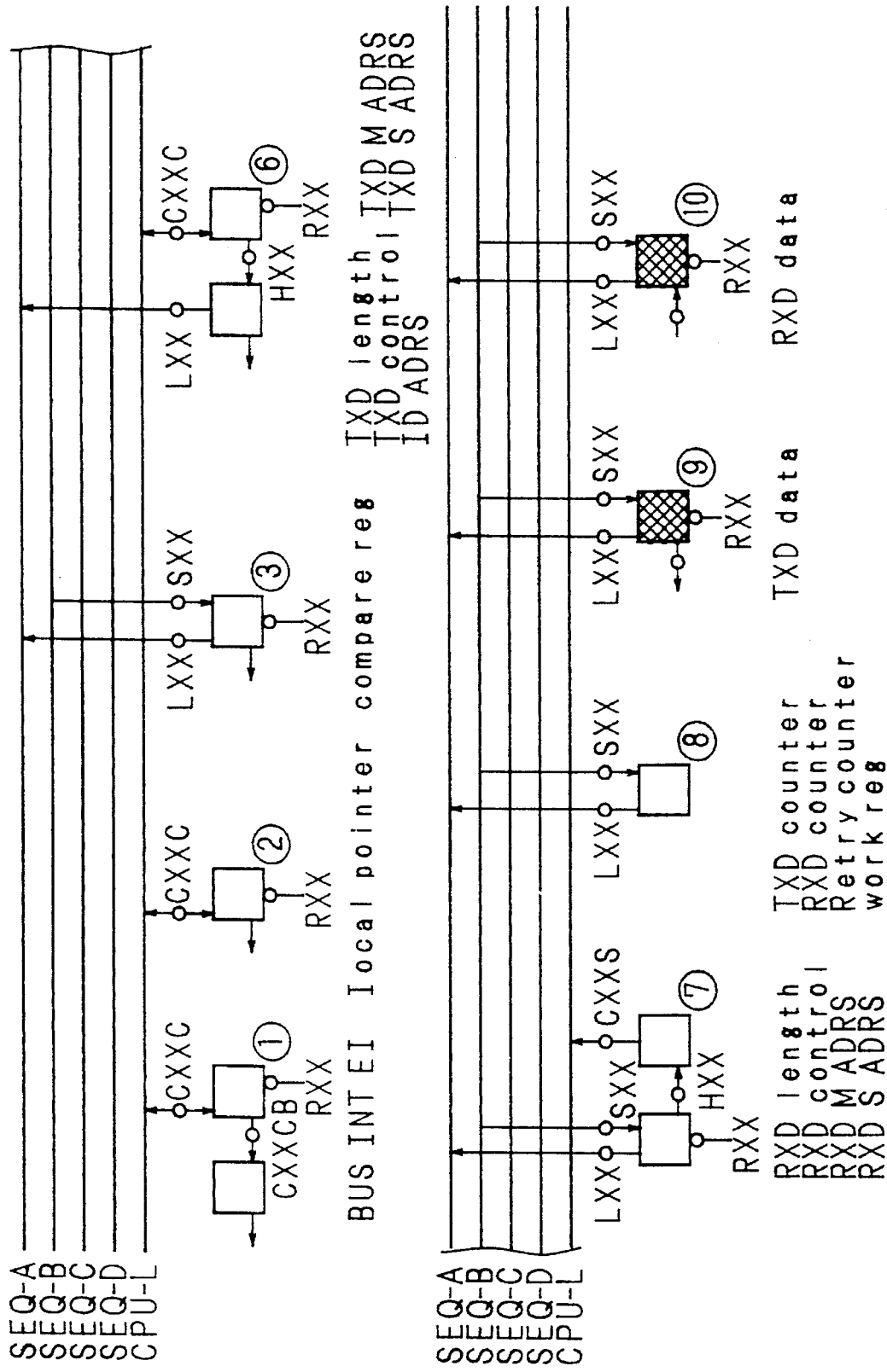
FIG. 27A is a schematic view showing an example of cell functions of various control bits for facilitating ASIC expansion as still another embodiment of a first embodiment of a microcomputer according to the present invention.

Schematically, the registers designated by encircled numerals 6 and 7 in FIG. 27A and FIG. 27B have such function. In the figure, CPU-L designates a local bus connected to the main CPU, and gated by a signal CXXC or a signal CXXS to give and receive data between the latch. The register designated by encircled numeral 6 is the one from the main CPU to the sub-CPU, and the register designated by encircled numeral 7 is the one from the sub-CPU to the main CPU, and these registers are in a double-latch configuration to synchronize the write timings of the two CPUs. A data bus connecting the double latches is gated by a control signal HXX to prevent occurrence of data change on the reading side due to slip out of the data at writing. Though the reading side latch is only for read, the writing side latch can also read.

(2) A timer functional register: timer 1/timer 2 of addresses "2A" and "2B", (3) Transmitting and receiving data functional register: TXD data, RXD data etc. of addresses "1A" to "1D", (4) Interruption control register: SEQ int req, SEQ int enable of addresses "0A" and "0B", (5) Operation flag register: ALU flag of address "0E", and (6) Functional circuit control register: addresses "01" to "09".

Refer to FIG. 21A through FIG. 21L on detailed functions of respective bits.

To these functional registers, in the case of FIFO, the bits indicating the status such as a data full, a data empty and so on, or the control bit of FIFO clear are allocated.

In "type" columns of FIG. 21A through FIG. 21L, symbols associated with the type of registers used in FIG. 26A through FIG. 26D, FIG. 27A and FIG. 27B are shown. Depending on respective functions, it serves as the bits for giving and receiving data to and from the main CPU and controlling the functional blocks and the status read. The appropriate register is selected as required by the application, for example, not only accessed from the register bus of the microcomputer, but generating a one-shot pulse at writing, or outputting a level signal to control the functional blocks, or fetching intact the level signal not from the latch but from the functional blocks.

To save a code length of the instruction code, not too many registers are selected at selection of the target register of the condition decision circuit. However, when the field of application of the microcomputer is specialized to design the appropriate functional register beforehand, the condition decision circuit which responds appropriately and rapidly responsive to respective fields can be designed easily.

Figure 22:
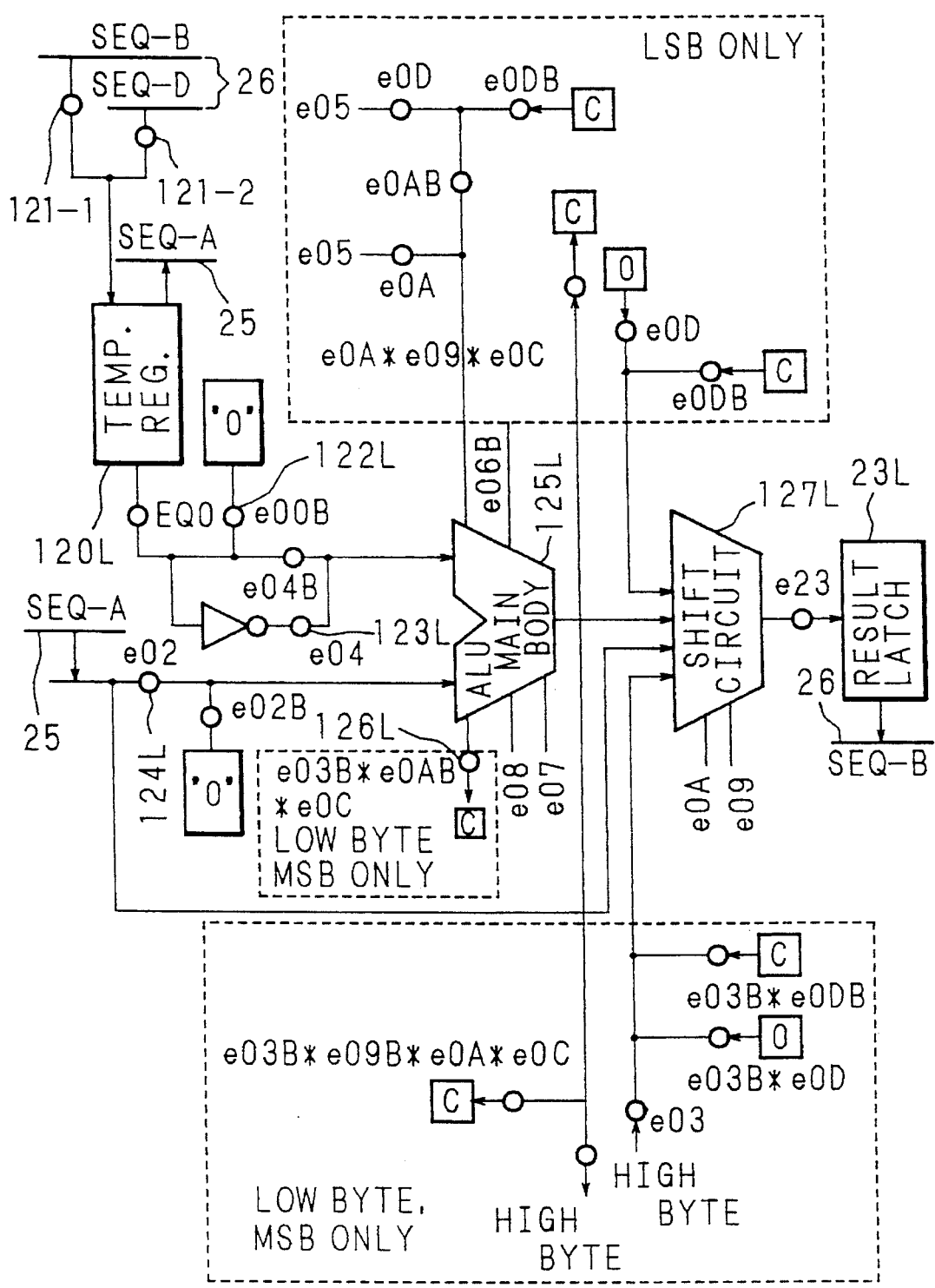
FIG. 22 is a block diagram showing a configuration of a functional block at a lower side portion of an ALU of a first embodiment of a microcomputer according to the present invention.
Figure 23:
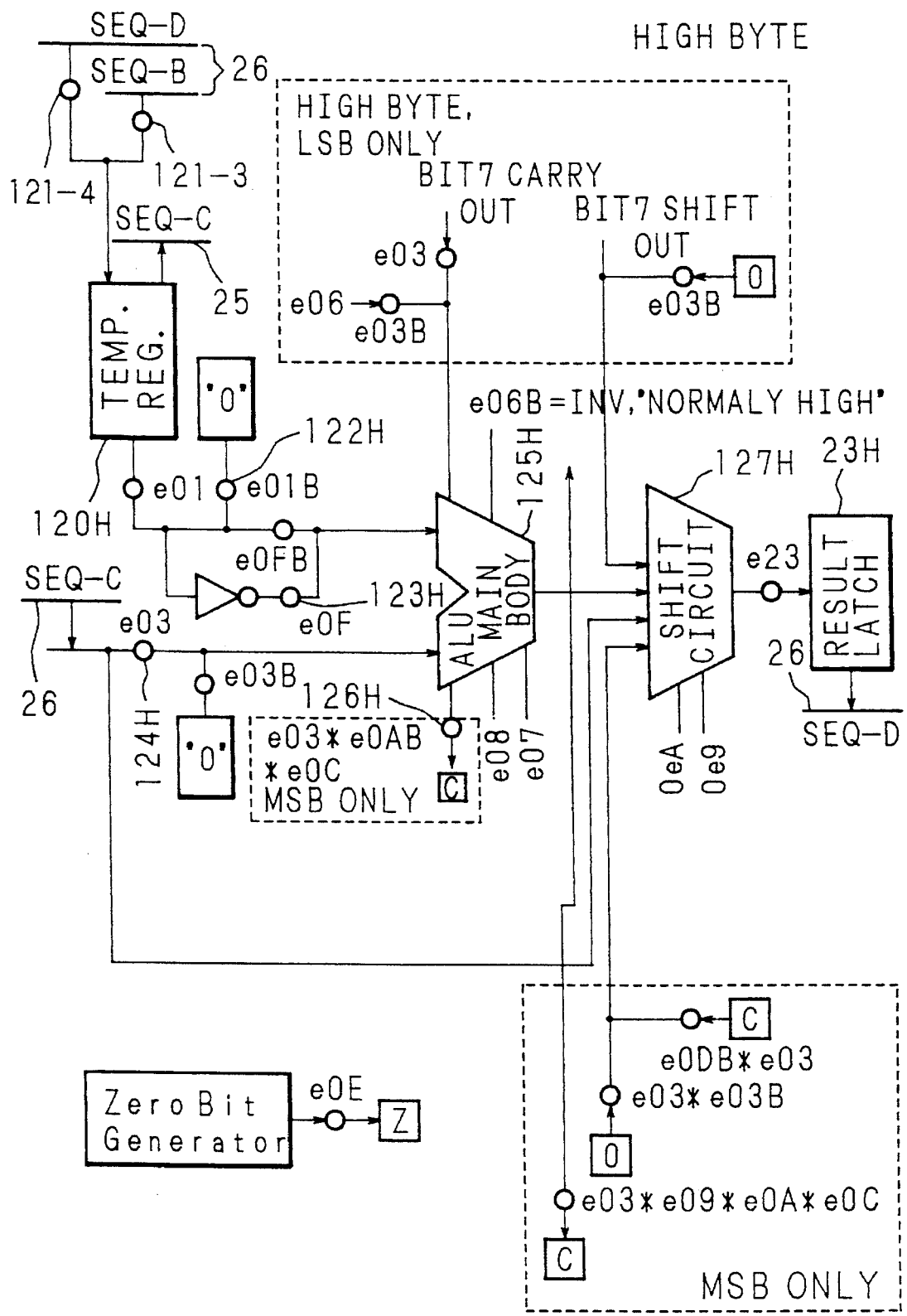
FIG. 23 is a block diagram showing a configuration of a functional block at a higher side portion of an ALU of a first embodiment of a microcomputer according to the present invention.

Next, referring to the block diagrams shown in FIG. 22 and FIG. 23, an example of configuration of the ALU 22 of another embodiment of the first embodiment of the microcomputer of the present invention is described. FIG. 22 is the block diagram showing the configuration for lower 8 bits of the ALU 22, and FIG. 23 is the block diagram showing the configuration for higher 8 bits of the ALU 22.

At first, before describing the operation of the ALU 22 main body, the operation of the temporary register 21 used in this embodiment is described.

In FIG. 22, numeral 120L designates the 8 bits on the lower side of the temporary register 21. When a register specifying address is "3F", data is supplied from a SEQ-B which is the lower 8 bits of a register bus 26 by an input switch 121-1. In this case, the higher 8 bits are also written into the higher side 120H of the temporary register 21 simultaneously. An input switch 121-2 has a special function. When the register specifying address is "1E", receiving a data input from an SEQ-b which is the higher 8 bits of the register bus 26, and is capable of inputting a high order byte on the bus to the temporary register 21 as data of a low order byte.

In FIG. 23, symbol 120H designates the 8 bits on the higher side of the temporary register 21. When the register specifying address is "3F", data is supplied from the SEQ-D bus which is the higher 8 bits of the register bus 26 by an input switch 121-4. In this case, the lower 8 bits are also written into the lower side 120L of the temporary register simultaneously. An input switch 121-3 has a special function, when the register specifying address is "1F", receiving a data input from the SEQ-B which is the lower 8 bits of the register bus 26, and is capable of inputting the low order byte on the bus to the temporary register 21 as the high order byte data.

Though the temporary register 21 is substantially a register having a 16-bit length, it includes 3 addresses of "3F", "1E" and "1F", thereby, three kinds of handlings of usual data write, data transfer to the low order byte from the high order byte and to the high order byte from the low order byte are possible. Particularly, since these handlings are possible without increasing the special instruction code, it is possible to simplify the instruction decoder circuit and is advantageous in facilitating the design when considering the combination of instruction codes.

Now, returning to FIG. 22 and FIG. 23 for further description, symbol 122L and 122H designate switches which supply "0" to inputs of the ALU main body, 125L, 125H on the temporary register 21 side, and are respectively controlled by signals e00B and e01B and usually connected to the side supplying "0", but when the signals e00B and e01B change to "H", they are connected to the temporary register 120L, 120H side. Signals, different for higher and lower uses, are used as these control signals.

By switches designated by numerals 123L, 123H and an inverter, a function controlled by signals e04 and e0F to invert data to be supplied to the ALU main body 125L, 125H is constituted.

Summarizing the above, the data to be supplied to one input of the ALU main body 125L, 125H is the value of the temporary register 120L, 120H or "0", or its inverted value, and the temporary register 120H for high order byte and the temporary register 120L for low order byte can be controlled separately.

Numerals 124L, 124H designate switches which control data to be supplied to inputs on other side of the ALU main body 125L, 125H, and are controlled respectively by signals e02 and e03, whereby it is possible to select whether to input the data read from the register via the lines SEQ-A and SEQ-C, or to input "0" forcibly.

By two inputs obtained in the manner described above, operations are effected in the ALU main body 125L, 125H including a full adder. Addition (ADD), logical product (AND) and logical add (OR) are switched by signals e07 and e08. Logical negation (NOT) of data can be selected by a signal e06B, and exclusive logical add (EXOR) is executed by the signal e0F. Subtraction is realized by combining the inversion control of the low order side 120L and the high order side 120H of the temporary register 21 previously described and carry control to be described later. When the operation result of the ALU 22 is all bit "0", a zero flag is set.

Next, the carry flag control is described.

Though there are operation with carry and those without carry in the addition and subtraction, in this embodiment, it is possible to select either to input the carry flag by a signal e0DB or to input a signal e05 directly. In case of addition without carry, the signal e05 is made "L" to handle the addition, and in case of subtraction without borrow, the signal e05 may be made "H" to invert a data path from the temporary register 21 by the signals e04 and e0F for ADD operation. In the increment processing, the signal e05 may be made "H" to input "0" to one input of the ALU main body 125 by the signals e00B and e01B for ADD operation. In the decrement processing, it can be realized by making the signal e05 "L" and inputting "FFFF" to one input of the ALU main body 125 by the signals e00B and e01B, e04, e0F. The carry flags at the time of addition and subtraction are set in the path of the switch 126L and 126H. In case of 8-bit operation, a signal e03B becomes "H" to validate the switch 126L, and in case of 16-bit word operation, the signal e03B stays at "L" to validate the switch 126H.

Shift operation is processed by a shift circuit 127. A data path is selected from four data paths; output of the ALU 22 is outputted intact by signals e09 and e0A, or data of the SEQ-A and SEQ-C are outputted intact as bypassing the ALU 22, or outputted by shifting 1 bit right, or outputted by shifting 1 bit left. In the shift circuit 127, at the time of respective shifts, combinations of the shift with carry, "0" insertion shift, right and left shifts, 8-bit shift and 16-bit shift are realized, and the switch groups of 128 responding respectively thereto are controlled to function. Output of the shift circuit 127 is controlled by a signal e23 and stored in an operation result latch 23L, 23H, and the outputs of the latch 23L, 23H always drive the register write bus line SEQ-B, SEQ-D.

Figure 24:
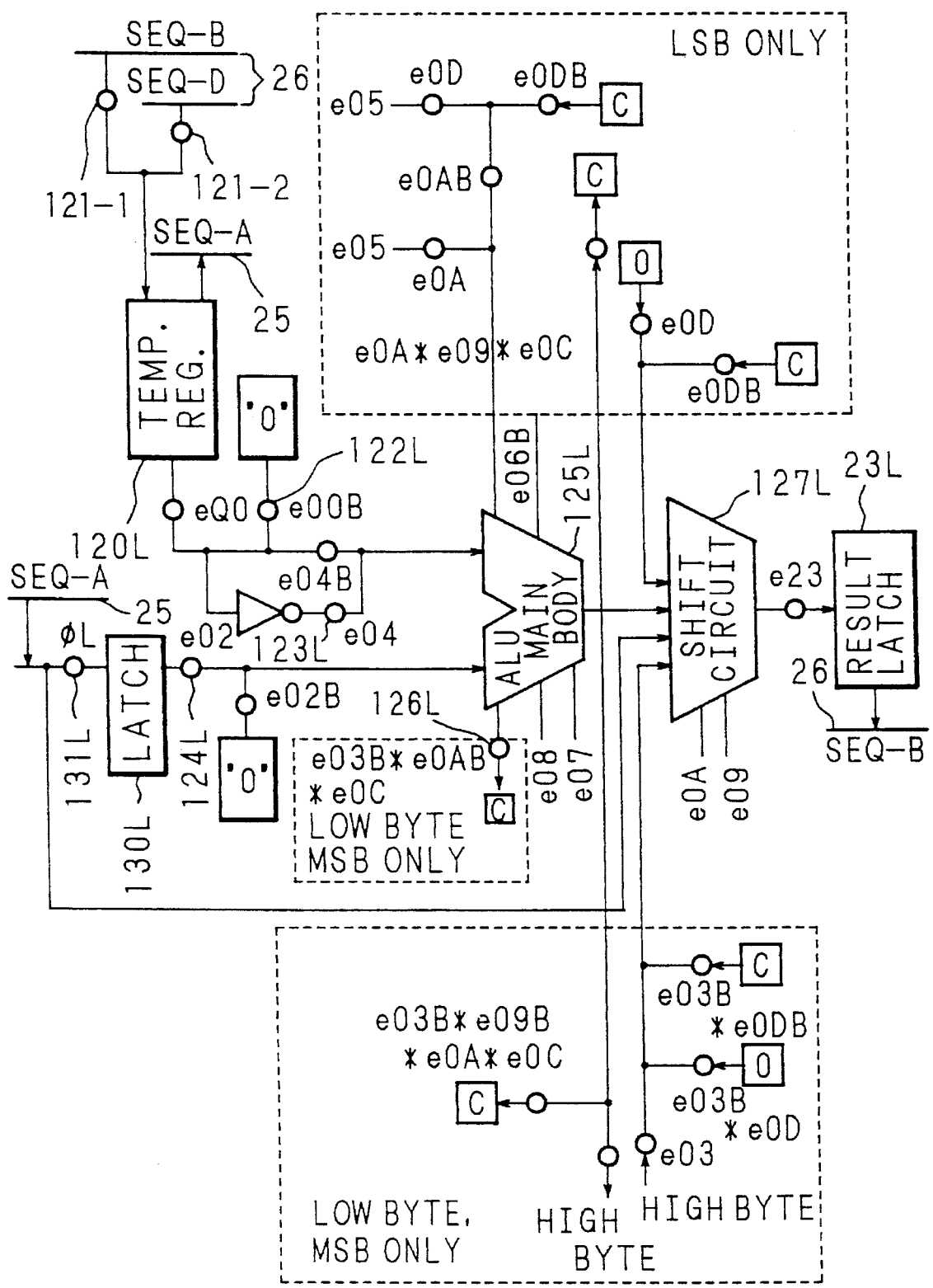
FIG. 24 is a block diagram showing another configuration of a functional block of a lower side portion of an ALU of a first embodiment of a microcomputer according to the present invention.
Figure 25:
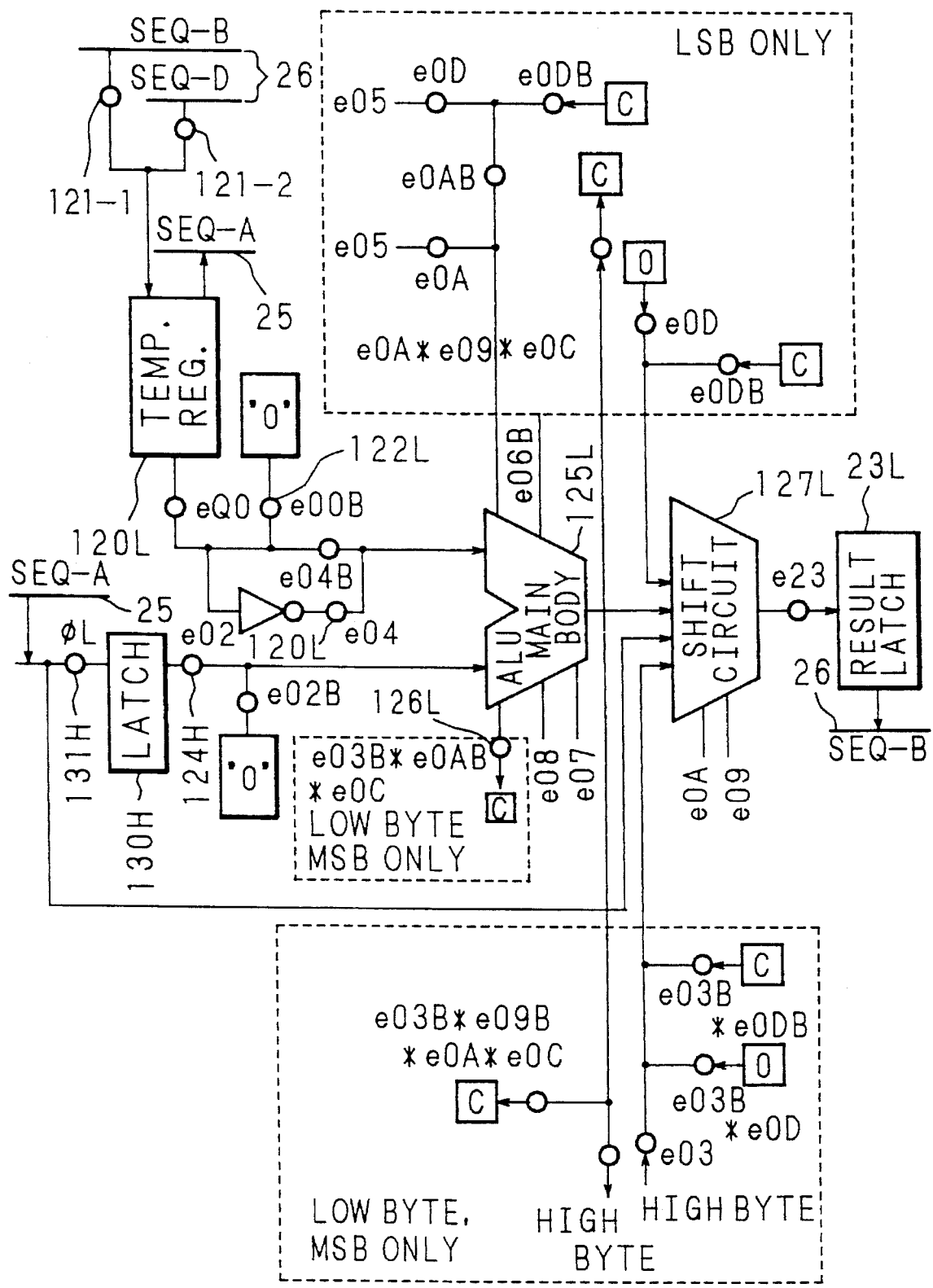
FIG. 25 is a block diagram showing another configuration of a functional block of a higher side portion of an ALU of a first embodiment of a microcomputer according to the present invention.
Figure 26A:
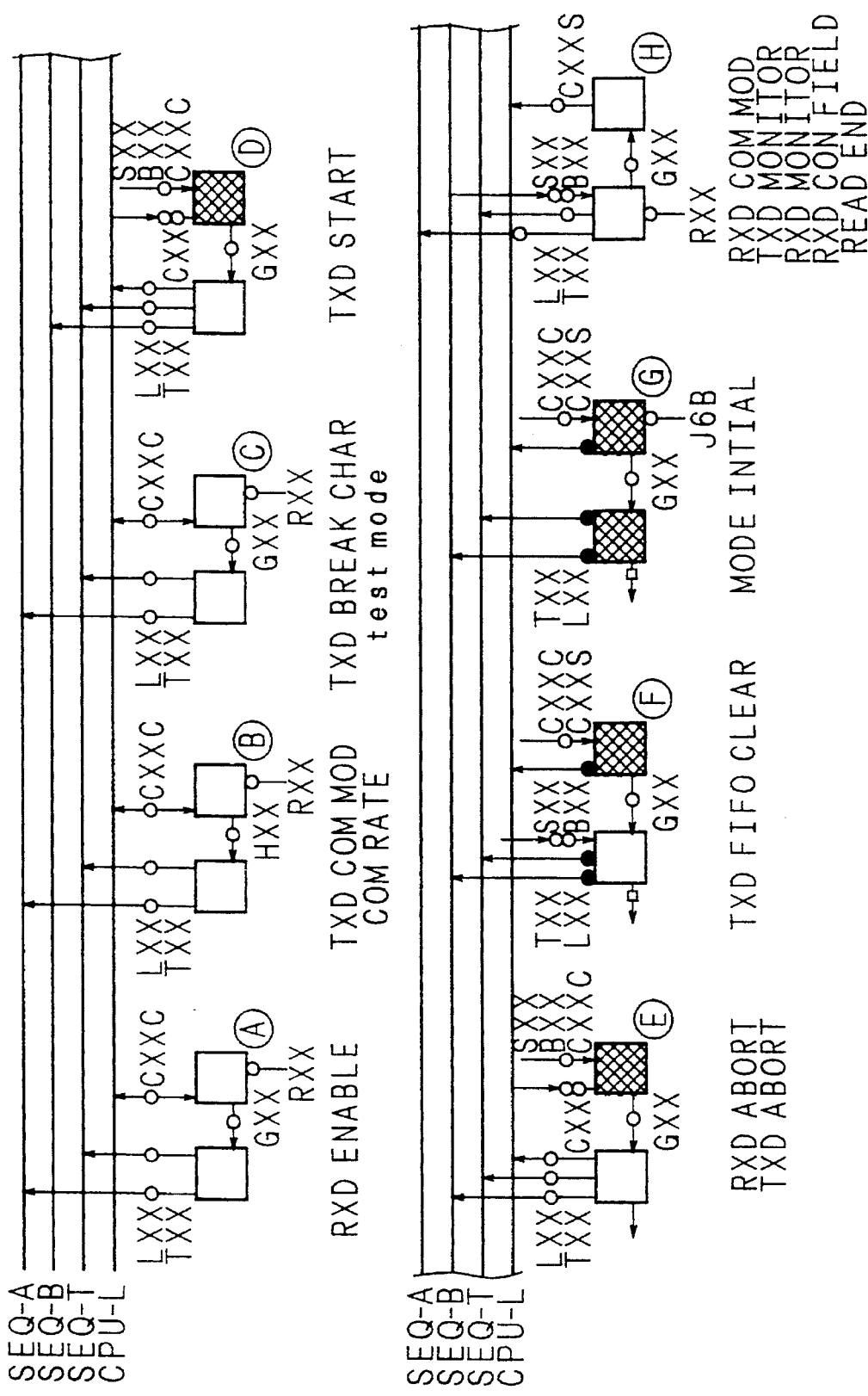
FIG. 26A is a schematic view showing an example of cell functions of various control bits for facilitating ASIC expansion as still another embodiment of a first embodiment of a microcomputer according to the present invention.
Figure 26B:
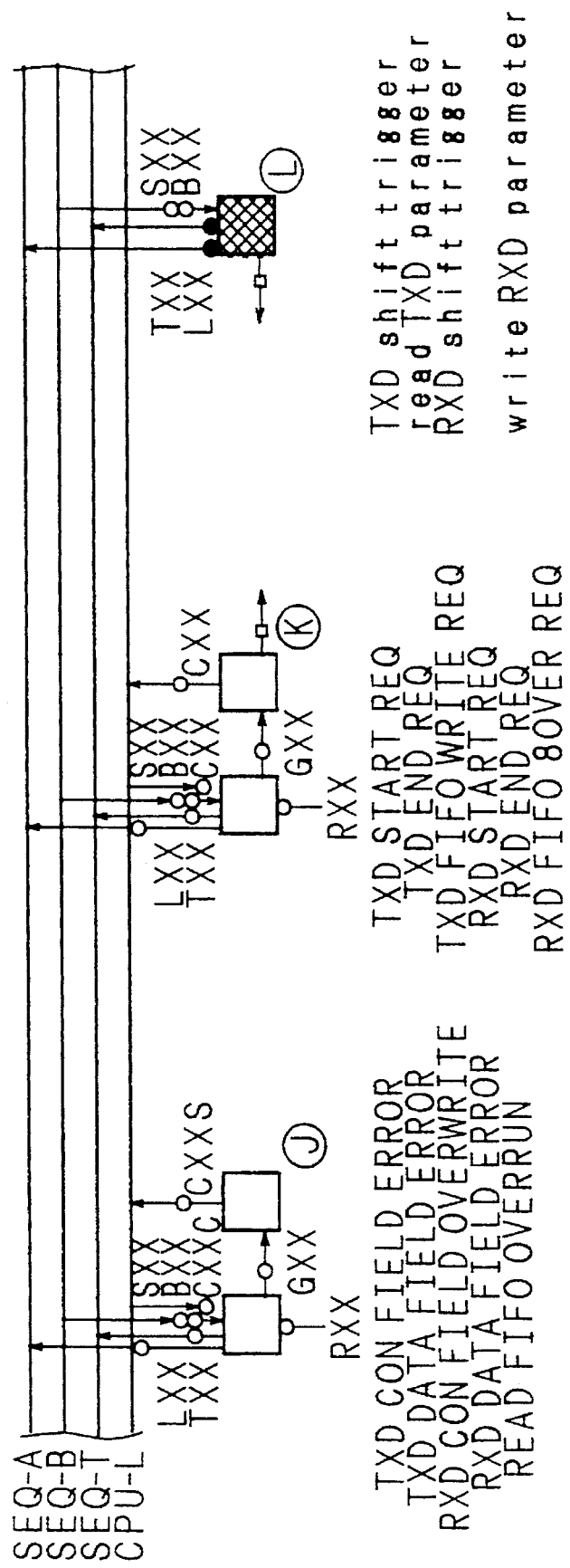
FIG. 26B is a schematic view showing a example of cell functions of various control bits for facilitating ASIC expansion as still another embodiment of a first embodiment of a microcomputer according to the present invention.
Figure 26C:
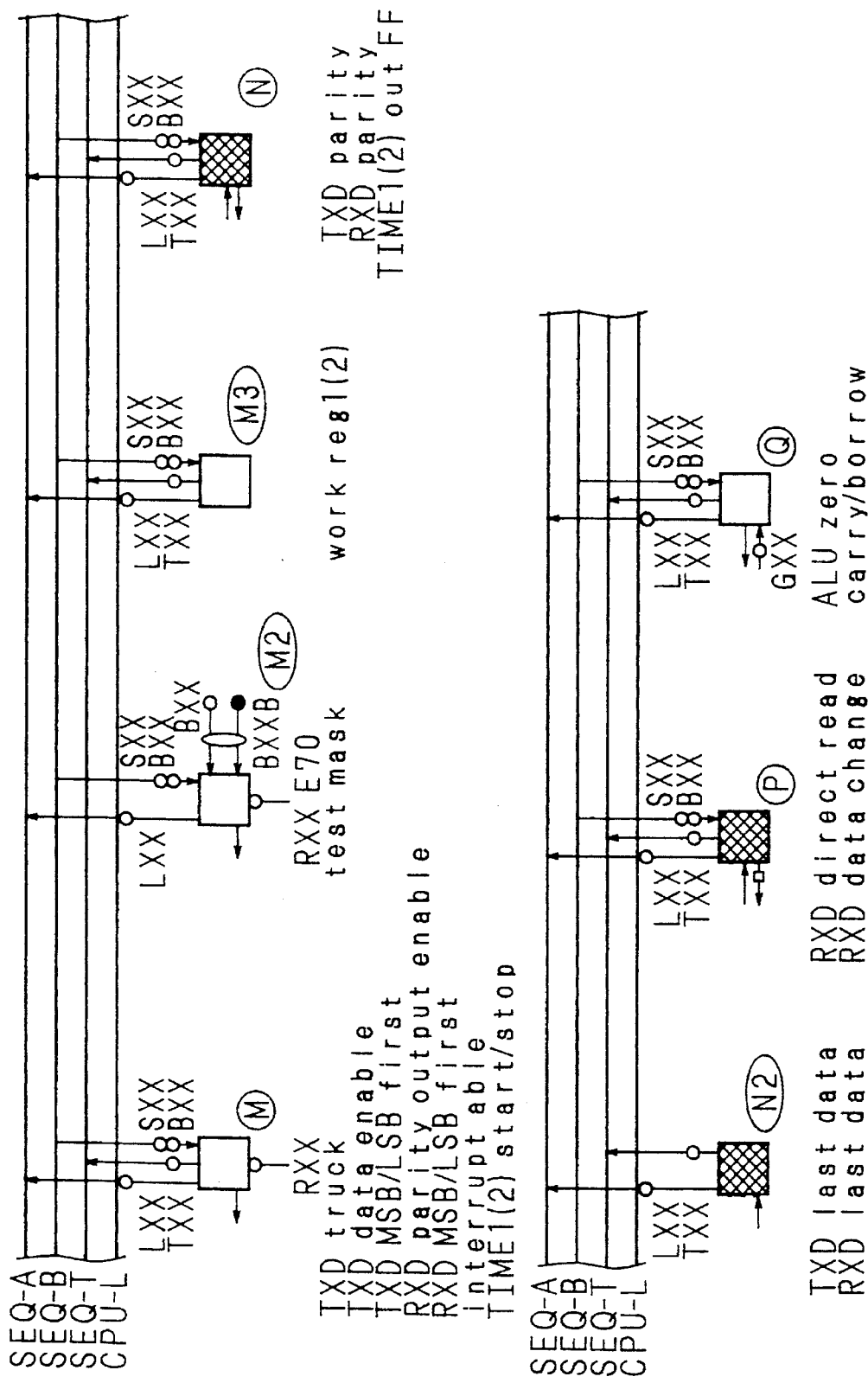
FIG. 26C is a schematic view showing an example of cell functions of various control bits for facilitating ASIC expansion as still another embodiment of a first embodiment of a microcomputer according to the present invention.

The ALU 22 responsive to the invention according to claim 13 is realized by adding latches 130L, 130H shown in FIG. 24 and FIG. 25 to a preceding stage of switches 124L, 124H in addition to the configuration shown in FIG. 22 and FIG. 23.

The latches 130L, 130H receive data of the buses SEQ-A and SEQ-C by input control switches 131L, 131H, and latch the data at the timing of the auxiliary clock φL. The timings of the various ALU control signals from signals e00 to e0F must be re-designed to become active successively in the periods T2 and T3, and the signal e23 which controls the result hold timing must also be changed so as to become effective in the cycle T3.

FIG. 26A through FIG. 26D, FIG. 27A and FIG. 27B are schematic views showing examples of cell functions of various control bits for facilitating ASIC expansion which is one embodiment related to the invention according to claim 17. Particularly, the cell shown here realizes various functions which are effective, when the microcomputer of the present invention is designed as the sub-CPU side of the dual CPU realized by on-chip configuration.

In FIG. 26A through FIG. 26D, FIG. 27A and FIG. 27B, the SEQ-A, SEQ-B and SEQ-T buses are already described.

A CPU-L bus is a data bus connected to the main CPU, and the register groups connected thereto are supposed to be used as interface registers with the main CPU.

Circles in the figure show switches connecting the registers and buses, and signals LXX, SXX and so on become effective when the target register addresses are accessed. The signals XX serves as respective register addresses. The signal GXX used in the type A register is the signal which is synchronized at the time of giving and receiving data, assuming the case where the two CPUs operate not synchronously. Empty square boxes show simple latches, and hatched square boxes mean functional circuits. By changing the combinations of the register groups responsive to the applications, the microcomputer of the present invention can be designed to suit the ASIC.

In the embodiment of the microcomputer of the present invention, the register cells are assumed to be built in the condition decision circuit of easy bit handling.

Figure 28:
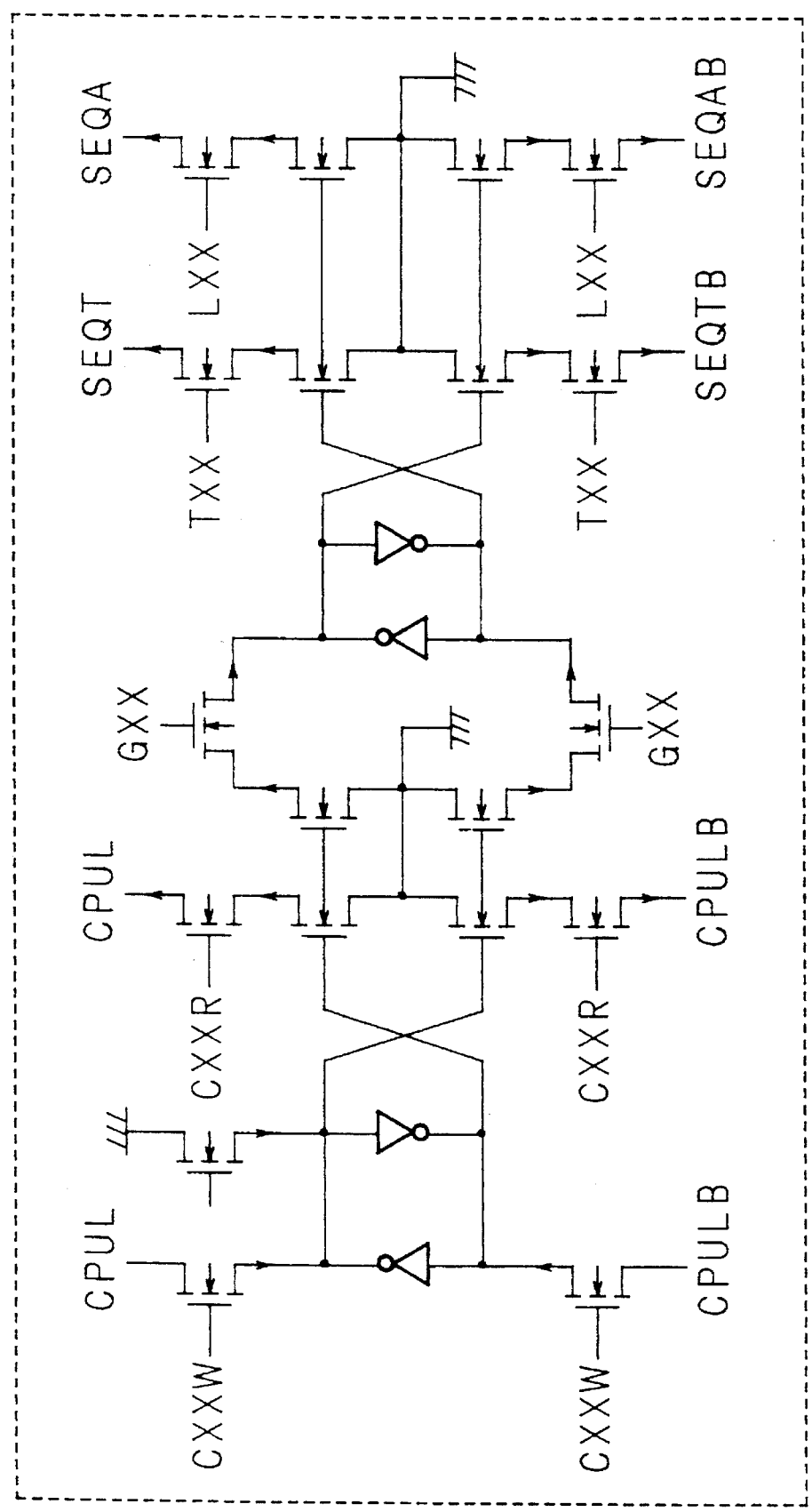
FIG. 28 is a circuit diagram showing a specific circuit of a cell of still another embodiment of a first embodiment of a microcomputer according to the present invention.

FIG. 28 is a circuit diagram showing an example of a specific circuit configuration of the cells shown in the above-mentioned FIG. 26A through FIG. 26D and FIG. 27A, FIG. 27B.

This circuit is characterized in that, the register buses such as SEQ-B, SEQ-A and so on are laid out by an aluminum wiring in a pair of TRUE (true) and BAR (false), and switches to the respective registers are realized only by the combination of N-channel transistors. Furthermore, though a write line to the registers is a direct level input of transmission gate type to the RAM-type latches, a read line is that, RAM latch data is once received by a gate input and subjected to impedance conversion before driving the SEQ-A line.

By such circuit system, it is possible to constitute such that, residual charges accumulated in the wiring capacity of the SEQ-A line at the read timing do not exert bad effects on the register level. That is, in some of the conventional techniques, though the read line is also a direct level output of the transmission gate type from the RAM-type latches, it is because that there was the possibility that the charges accumulated in the wiring capacity flow reversely to invert the register values.

Figure 29:
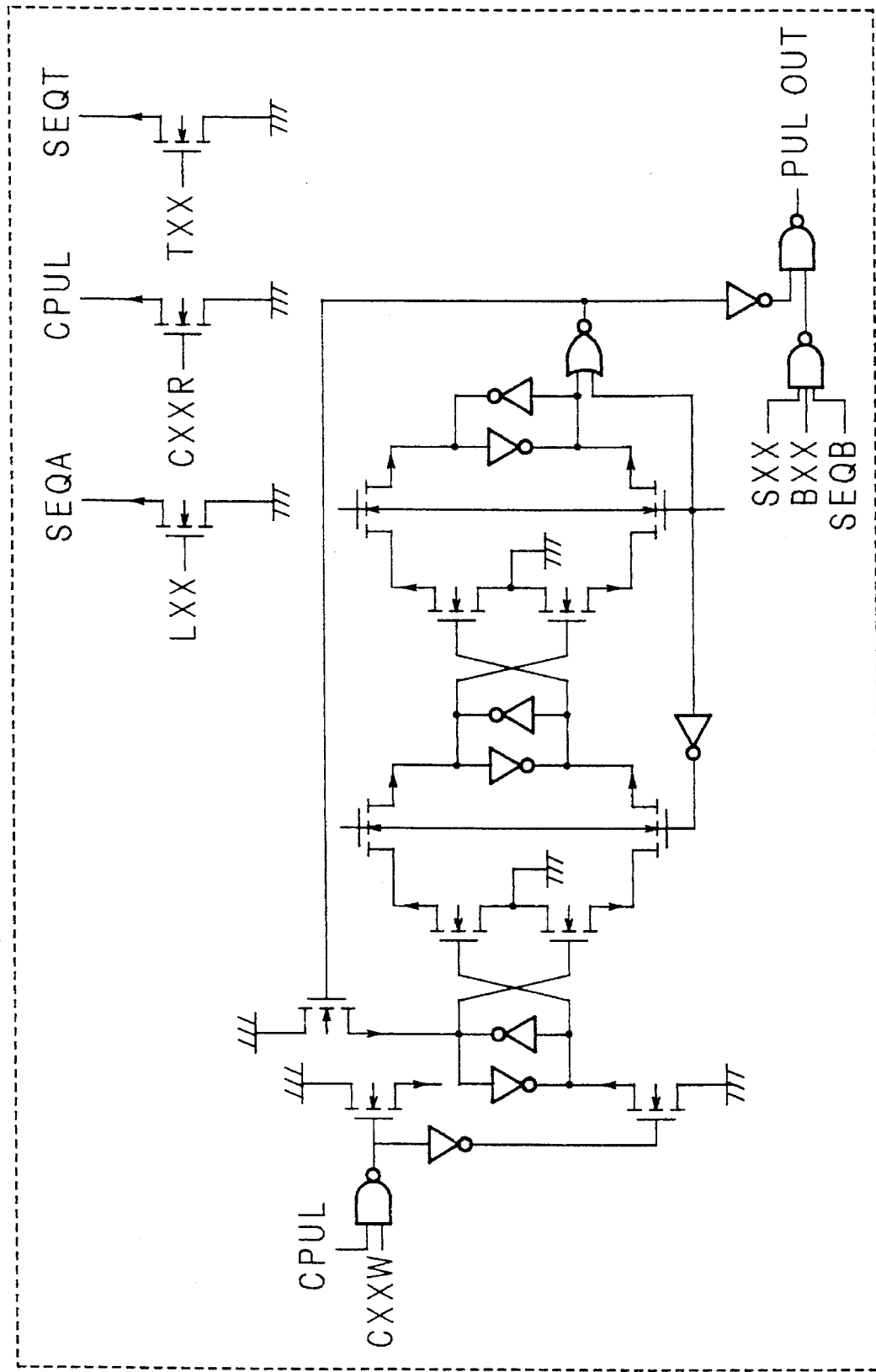
FIG. 29 is a circuit diagram showing a separate specific circuit of a fu ctional cell of still another embodiment of a first embodiment of a microcomputer according to the present invention.

FIG. 29 is a circuit diagram showing another example of configuration of the functional cells, wherein when "1" is written into the bit, a one-shot pulse of one cycle is generated.

Figure 30:
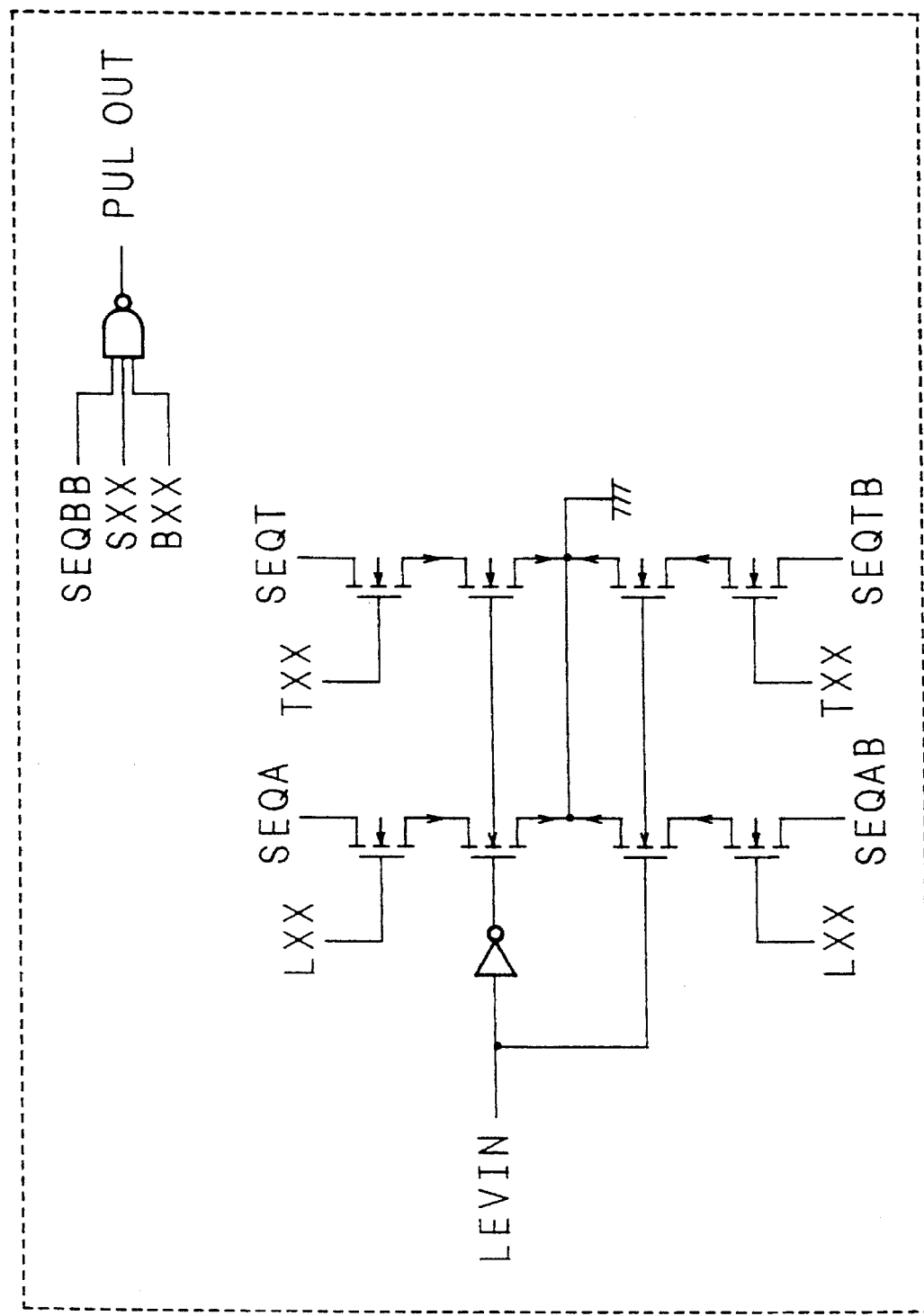
FIG. 30 is a circuit diagram showing a functional cell receiving a status signal outputted from a functional block of still another embodiment of a first embodiment of a microcomputer according to the present invention.

FIG. 30 is a circuit diagram showing an example of configuration of a functional cell receiving a status signal outputted from the functional blocks shown in FIG. 28 and FIG. 29, wherein even when layout positions of the functional blocks are spaced, their impedance isolation is accomplished by inputting the gate signal.

Now, in the timing design of the microcomputer of the present invention shown in FIG. 4, as particularly described hereinabove,, though it is possible to execute one instruction in one cycle, there is the possibility of lack in margin of the operation speed.

Specifically, in the period T2 shown in FIG. 4, since four kinds of handling from the instruction code fetch, instruction decode, loading the operand from the destination register, till operation are executed, circuit delays are accumulated. And hence, an upper limit of the operation speed is restricted by the period T2 as a bottle neck. Particularly, since it takes time to read data from the memory and to execute the operation, in the aforementioned embodiment aiming at the high speed, the processing capacity is not fully exhibited on the contrary.

Therefore, it is an object to realize a higher performance, by further dividing the processing to be executed in the period T2 of the above-mentioned embodiment, and in the following embodiment, fetching the instruction code and decoding a part of instruction in the period T2, loading the operand from the register and executing the operation in the period T3, and storing the operation result in the destination register in the period T4, thereby distributing the respective processing times to respective periods to equalize the load.

Output of the effective address in the period T1 is similar to the aforementioned embodiment. A feature of performing the branch destination address operation of the branch instruction in the periods T2 and T3 in the same way as the past, and executing even the branch instruction in one cycle is maintained also in this embodiment.

FIG. 31A and FIG. 31B show timing charts of a basic cycle of an instruction execution sequence of a CPU of a second embodiment of the microcomputer of the present invention.

In FIG. 31A and FIG. 31B show timing charts of a basic cycle of an instruction execution sequence of a CPU of a second embodiment of the microcomputer of the present invention.

In FIG. 31A and FIG. 31B, since timings of a basic clock $\phi$, an auxiliary clock $\phi H$, an auxiliary clock $\phi L$, a data read, an address output and an instruction code fetch designated by numerals 1 to 6 are same as the aforementioned first embodiment, their descriptions are omitted.

Figure 32:
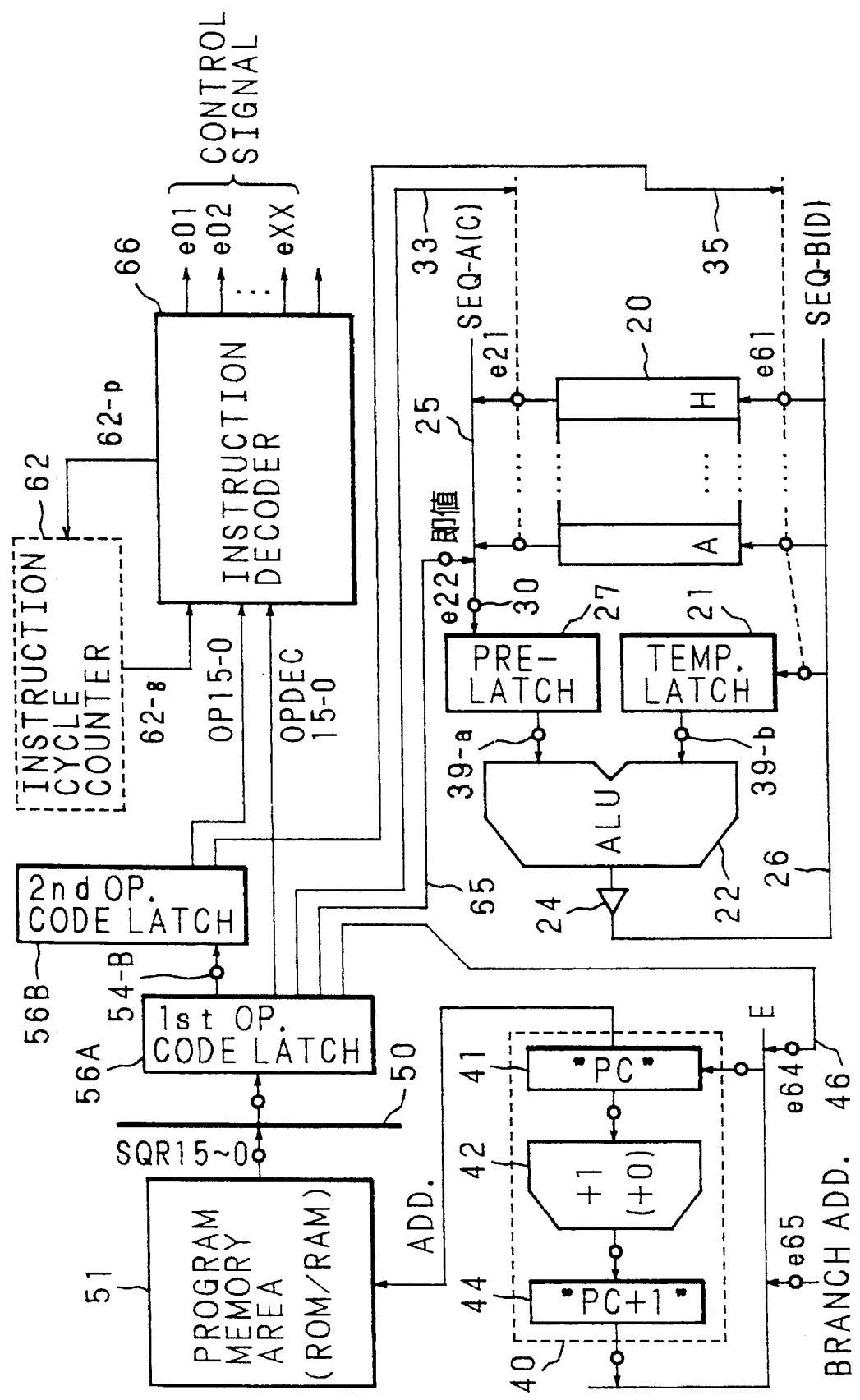
FIG. 32 is a block diagram showing an example of specific configuration of a second embodiment of a microcomputer according to the present invention.

Different points between this second embodiment and the aforementioned first embodiment are on and after numeral 7 (7-1, 7-2). In the following, referring to a block diagram of FIG. 32 showing an example of a specific configuration of the CPU of this second embodiment, the timing charts are described in order.

In this embodiment, an operand latch is constituted by two-stage half latches 56A, 56B, and distributed in an operation timing of a first instruction code latch designated by numeral 7-1, and an operation timing of a second instruction code latch designated by numeral 7-2 in FIG. 31A.

The first operation code latch 56A holds the value outputted to a data bus (SEQ 15 to 0) 50 from a program memory area 51 at every memory read timing in the period T2. In the succeeding period T3, the value held by the first operation code latch 56A is sent to and held by the second operation code latch 56B. However, the hold content of the second operation code latch 56B is that, in the instruction having the execution cycle of two cycles or more, the instruction code is continuously held as designated by symbol 7-b until the instruction has been executed.

Numerals 8-1, 8-2, designate timings which generate various control signals eXX for executing the instruction responsive to the outputs of the above-mentioned first and second operation code latches 56A, 56B. As shown in FIG. 32, since the control signals are generated at respective phases, a signal indicating which phase of phases respective instructions and an output signal of a cycle counter 66 in this embodiment are inputted in parallel.

Next, the operand fetch after the instruction decoding is executed. As shown by numeral 9-1, a register address of a source register holding the operand is made active in the periods T2, T3. Data is read in the period T3 at a timing designated by numeral 9-2. Since a signal of the timing 9-1 at which the register address is specified delays, accumulating from the memory read timing, an address signal is determined at time points of 20 to 40 ns in the period T2. Thus, by arranging the register data read in the next period T3, a timing margin can be considerably improved, thereby the high-speed processing is possible. This is the point different from the first embodiment.

Operand data read from the source register in the period T3 is held in a pre-latch 28 at one input side of the ALU 22 at a timing designated by numeral 10-1. A point of difference in configuration between the second embodiment and the aforementioned first embodiment is that, the pre-latch 28 is provided at one input side of the ALU 22 and the result latch 129 shown in FIG. 22 is deleted.

By the pre-latch 28, it is possible to hold the operand data continuously during the operation of the ALU 22 in the periods T3 and T4. Thus, the operation time substantially allowed for the ALU 22 is more than double as compared with the first embodiment, and a speed margin can be enlarged.

The operation result storing processing by the ALU 22 is executed at the timing designated by numeral 11-2 in the period T4, and a series of main processings of the instruction is completed. The storage register specifying is that, the register address is outputted in a period designated by numeral 11-1, and data is stored in the specified register after this value has been settled.

As stated above, since the register read and write are allocated to sections "H" and "L" of the clock in the periods T3 and T4, the "register read", "operation" and "write back" are executed at every brink of the basic lock φ by a simple pipeline processing and a high-speed processing is realized.

Control signals of read cycles of the source registers designated by numerals 9-1, 9-2 are generated from an output of the first operation code latch 56A, and control signals of operation of the ALU 22 designated by numeral 10-1, and the write back handling to the storage register designated by numeral 11 are generated from an output of the second operation code latch 56B. This point is to be described later.

A typical example of data operation in the second embodiment has been described above, and next, an outline of program control timing related to the program counter is described.

Though the control of the program counter 40 is designated by numeral 12, basically, it is similar to the first embodiment. At the time of executing the branch instruction, after the instruction decoding is executed in the period T2, the register storing the branch destination address is specified, and in place of a value "PC+1" designated by symbol 12b, as designated by numeral 12d, the branch destination address is loaded to the program counter at a timing designated by symbol 12c. In this way, for executing one instruction in one cycle, the timing of the branch instruction itself is not different from that of the first embodiment.

Control signal groups whose timings are designated by numeral 13 differ partly from the first embodiment. In the second embodiment, a timing signal such as signals e0X to e8X is a basis. What is important here is that, the signal e2X which was active in the period T2 in the first embodiment is active in the period T3 in the second embodiment, and takes part in data read of the register groups or immediate data as well as in the control of the next effective address storage in the program counter.

Similarly, the signal e6X which was active in the period T3 in the first embodiment is active in the period T4 in the second embodiment, and the write back to the register groups is controlled at this timing. It is to be understood that all of these are for enlarging the operation speed margin.

The signal e8X is used to control execution of the specific instruction, and usually the signals e0X to e6X are used for control.

A example of specific configuration of the CPU of the second embodiment whose control timing has been described with reference to FIG. 31A and FIG. 31B as above is shown in a block diagram of FIG. 32. In FIG. 32, respective numerals designate the same constituents as FIG. 6 to FIG. 10 showing the example of configuration of the first embodiment, and basically, since the constituents have the same configuration, hence only the different portions are described in the following.

The operation code latch 56 of the first embodiment shown in FIG. 10 is divided into two-stage latches of the first and second operation code latches 56A, 56B. Switches 54-A and 54-B which control their data latch timings are not simply turned on and off in an opposite-phase relationship, but the switch 54-B is controlled to continue the off state so as the instruction code being executed is continuously held by the second operation code latch 56B at the time of executing the multi-cycle instruction. While, the switch 54-A is held for half cycle till the next cycle in which operand values of, for example, the immediate 65, absolute branch address 46 and so on are necessary, by holding the value of the data bus SQR (15 to 0) 50, every time the memory value is read.

Though the instruction decoder 66 generates the control signals e01 . . . eXX by decoding on the basis of data OPDEC and the operation code held by the two operation code latches 56A and 56B, for executing the multi-cycle instruction, an instruction cycle counter 62 is provided in this embodiment. Control signal groups 62-p generated in the instruction decoder 66 are inputted to the instruction cycle counter 62 which includes a feedback loop 62-q.

A large difference between the configuration of the second embodiment shown in FIG. 32 and that of the first embodiment is that, as previously described, the pre-latch 28 is included on one input side of the ALU 22 and the result latch on the output side is deleted. A switch 30 is provided on the input side of the pre-latch 28 and a switch 39-a is provided on the output side thereof, a purpose of such configuration is, as described with reference to FIG. 31A and FIG. 31B, to read the register values in the period T3 and to hold the data in the pre-latch 28 till the period T4 in which the operation execution is continued.

Since another operand to be given to the ALU 22 is held in the temporary register 21, and the write back of the operation result is finished in the period T4, it is not necessary to provide the result latch 23, which is included in the first embodiment, in the second embodiment.

The switch 30 is turned on when the signal e2X becomes active in the period T3, and the switches 39-a, 39-b are turned on when the signal e4X becomes active in the periods T3 and T4.

Since other functions are substantially similar to the first embodiment, their descriptions are omitted.

As described heretofore, in the second embodiment, since the cycle necessary for the instruction execution steps is separated, substantially the operation margin is improved, and the execution speed as well as an executable low voltage limit are relatively enlarged. This is suggestive of realizing a high-speed processable microcomputer easily.

In the conventional microcomputer, when the input clock frequency increases, there is the possibility of producing an electromagnetic fault wave and the like, therefore, a cost of countermeasure can not be neglected in a general consumer's product which requires a low cost. Particularly, in the handy-type portable product popularized in recent years, when the fault wave are produced, it is restricted by law. In the meantime, the microcomputer is installed not only in the electrical appliances but also in many products, thus its demand is large when the high speed processing is possible by a low frequency (several MHz).

The present invention is directed to such demand, and is possible to provide the microcomputer having a higher processing speed by the same frequency.

In the microcomputer of the invention, since the register operation is basically executed in one cycle of a system clock, the processing is performed very rapidly. Also, a special recognition circuit is not required to protect data and a target CPU can be constituted by a simple instruction decoder.

In the microcomputer of the invention, since even an exceptional processing can be processed in the same way as the other general instruction on and after the instruction decoder, the same designing technique is applicable on the instruction decoder. Thus, the design is unified for cost reduction.

In the microcomputer of the invention, the instruction code being executed over several cycles is decoded to generate control signals. Particularly, in case of adopting a down count method, when a plural number of data are handled in series, for example, such a case of transferring the plural data in series, it is easy to generate a signal which controls the handling of fetching source data at the time of even counts, and storing the data at the time of odd counts.

In the microcomputer of the invention, since a state, wherein the branch instruction condition decision is completed at the time of branch execution, is realized, an execution speed of the branch instruction is improved.

In the microcomputer of the invention, the instruction for executing the conditional branch effectively by the minimum necessary instruction, without wasting time for preparation period in using the branch instruction can be supported.

In the microcomputer of the invention, since the status register and the like in the functional block can be used directly as the condition of the conditional branch, when necessary, a specific bit is specified beforehand so as to monitor the bit state in respective cycles, and when there is any change in the state, it is recognized immediately to branch to a new routine, so that a high speed processing is possible.

In the microcomputer of the invention, a circuit for the above-mentioned conditional branch instruction execution is realized effectively.

In the microcomputer of the invention, handlings of loading, operating and storing the operation result of one register can be effected in one cycle, and it is possible to gain a margin on the register load timing by disposing the temporary register.

In the microcomputer of the invention, an effective controlling method is realized for facilitating the execution of 8-bit length operation or handling occurred frequently.

In the microcomputer of the invention, not only a shift operation circuit is realized, but also a circuit configuration, which is convenient in realizing the ADD & Shift operation effective for multiplication and division at one instruction per one execution cycle, can be provided.

In the microcomputer of the invention, the relationship between the ALU configuration and the instruction code is defined, thereby a simple ALU can be constituted.

In the microcomputer of the invention, an instruction set of a CPU of a register machine based on a 16-bit instruction length is provided as its instruction set, thereby, the CPU operation basically realizing one instruction per one cycle can be designed.

In the microcomputer of the invention, the invention is particularly effective in a field of micro-controller necessitating a rapid control, and by arranging a functional register in the CPU register group having the fastest access, it is possible to control respective functions and to monitor the states at the machine cycle speed.

In the microcomputer of the invention, at the time of developing an ASIC micro-controller, an effective designing method in realizing the design of peripheral functions suitable for the field rapidly is provided.

In the microcomputer of the invention, an object is achieved by adding an arithmetic unit additionally to improve its own performance of the CPU.

In the microcomputer of the invention, as compared with the invention according to claim 1, since a cycle necessary for the instruction execution step can be separated, an operation margin can substantially be enlarged. Also, since the execution speed as well as a limit of operable low voltage are relatively enlarged, the microcomputer having a high-speed processing capability is realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A microcomputer, comprising:
   a condition decision circuit, having:
   a register group including a plurality of registers, one of which is specified by execution of a conditional branch instruction, and to which a predetermined value in the code of said conditional branch instructions is set;
   a comparing register which stores the operation result of the instruction execution;
   compare means for comparing a value of the register specified by the conditional branch instruction in said registers group and a value of said compare register bit by bit; and
   a mask register which, by masking values of only necessary bits of the register specified by the conditional branch instruction in said register group, forces a condition decision signal, representing whether or not the branch condition of the conditional branch instruction is satisfied, to a state representing that the branch condition is satisfied.

2. A microcomputer as set forth in claim 1, wherein said condition decision circuit executes specifying the register, specifying bits to be compared, and discriminating signal values.

3. A microcomputer as set forth in claim 1, wherein
   the plurality of registers of the register group are designated as condition decision targets of said condition decision circuit, said register group being utilized for controlling a peripheral functional circuit, operation result flags and an interruption request bit group.

4. A microcomputer as set forth in claim 1, comprising:
   means (106) for synchronizing said condition decision signal with a basic clock.

5. A microcomputer as set forth in claim 1, wherein an unconditional branch is executed by providing a 1-bit control code, via the instruction code, directly to said condition decision circuit.

* * * * *